(12) United States Patent
Sauer

(10) Patent No.: US 12,397,895 B2
(45) Date of Patent: Aug. 26, 2025

(54) STRUCTURAL FEATURES OF A VEHICLE HAVING UTILITY TO TRANSPORT HIGH VALUE THINGS

(71) Applicant: United Therapeutics Corporation, Silver Spring, MD (US)

(72) Inventor: Ty Christopher Sauer, Sanford, NC (US)

(73) Assignee: United Therapeutics Corporation, Silver Spring, MD (US)

( * ) Notice: Subject to any disclaimer, the term of this patent is extended or adjusted under 35 U.S.C. 154(b) by 591 days.

(21) Appl. No.: 17/244,458

(22) Filed: Apr. 29, 2021

(65) Prior Publication Data

US 2021/0339842 A1 Nov. 4, 2021

Related U.S. Application Data

(60) Provisional application No. 63/017,302, filed on Apr. 29, 2020.

(51) Int. Cl.
*B64C 1/06* (2006.01)
*B64C 1/00* (2006.01)
*B64C 25/06* (2006.01)
*B64D 27/40* (2024.01)
*B64U 50/14* (2023.01)
*B64U 60/50* (2023.01)
*B64U 101/60* (2023.01)

(52) U.S. Cl.
CPC ............. *B64C 1/061* (2013.01); *B64C 25/06* (2013.01); *B64U 50/14* (2023.01); *B64U 60/50* (2023.01); *B64C 2001/0045* (2013.01); *B64D 27/40* (2024.01); *B64U 2101/60* (2023.01)

(58) Field of Classification Search
CPC ... B64C 2001/0045; B64C 1/068; B64C 1/00; B64C 2211/00; B64C 2001/0072; B64U 20/00; B64U 20/65
See application file for complete search history.

(56) References Cited

U.S. PATENT DOCUMENTS

| | | | | | |
|---|---|---|---|---|---|
| 1,728,557 | A | * | 9/1929 | Lucich | B64C 17/06 244/104 R |
| 1,749,272 | A | * | 3/1930 | Bird | B64C 39/00 244/55 |
| 1,866,680 | A | * | 7/1932 | Stout | B64C 1/00 244/119 |
| 3,604,660 | A | * | 9/1971 | Marley | B64C 27/32 244/17.11 |

FOREIGN PATENT DOCUMENTS

RU 2650257 C1 * 4/2018

\* cited by examiner

*Primary Examiner* — Nicholas McFall
*Assistant Examiner* — Eric Acosta
(74) *Attorney, Agent, or Firm* — Pilloff Passino & Cosenza LLP; Martin J. Cosenza

(57) ABSTRACT

An assembly, by way of example, an aircraft, including an aircraft motor apparatus including at least one motor located within a protective structure, the protective structure having movable sub-structure components, wherein the portion of the aircraft motor apparatus is configured to move the movable sub-structure components to increase or decrease airflow through the protective structure.

30 Claims, 66 Drawing Sheets

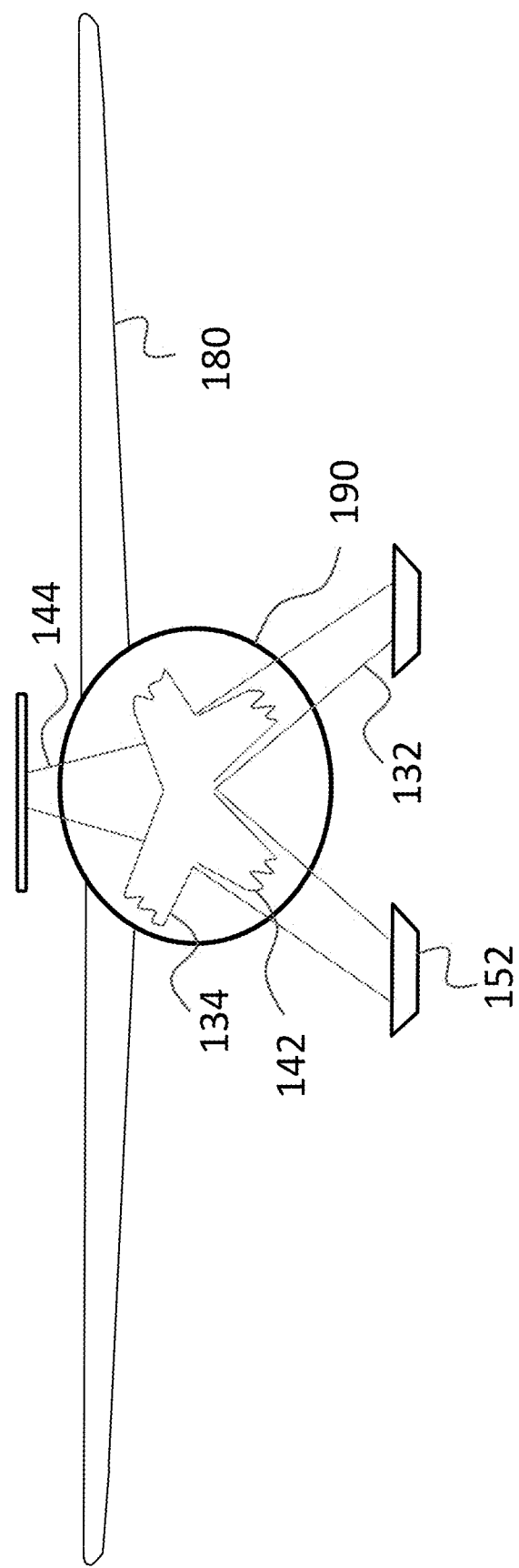

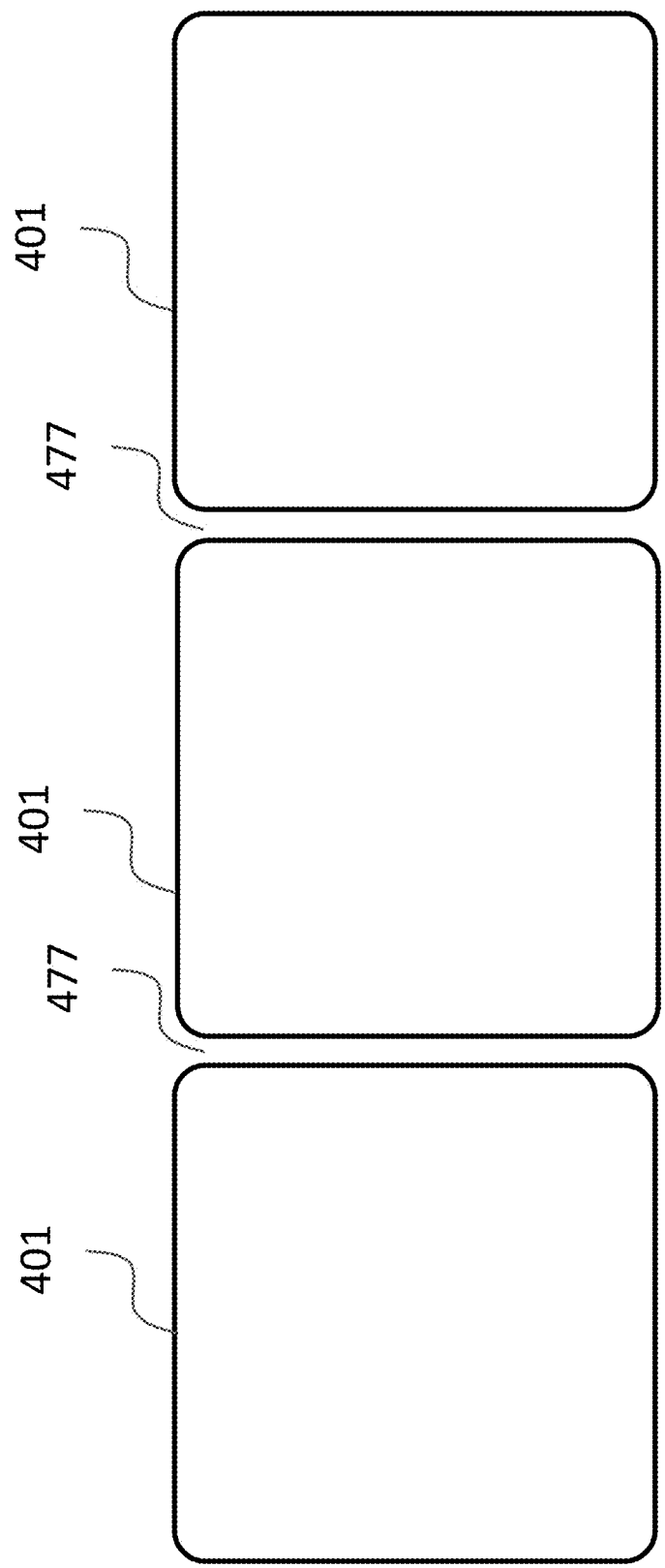

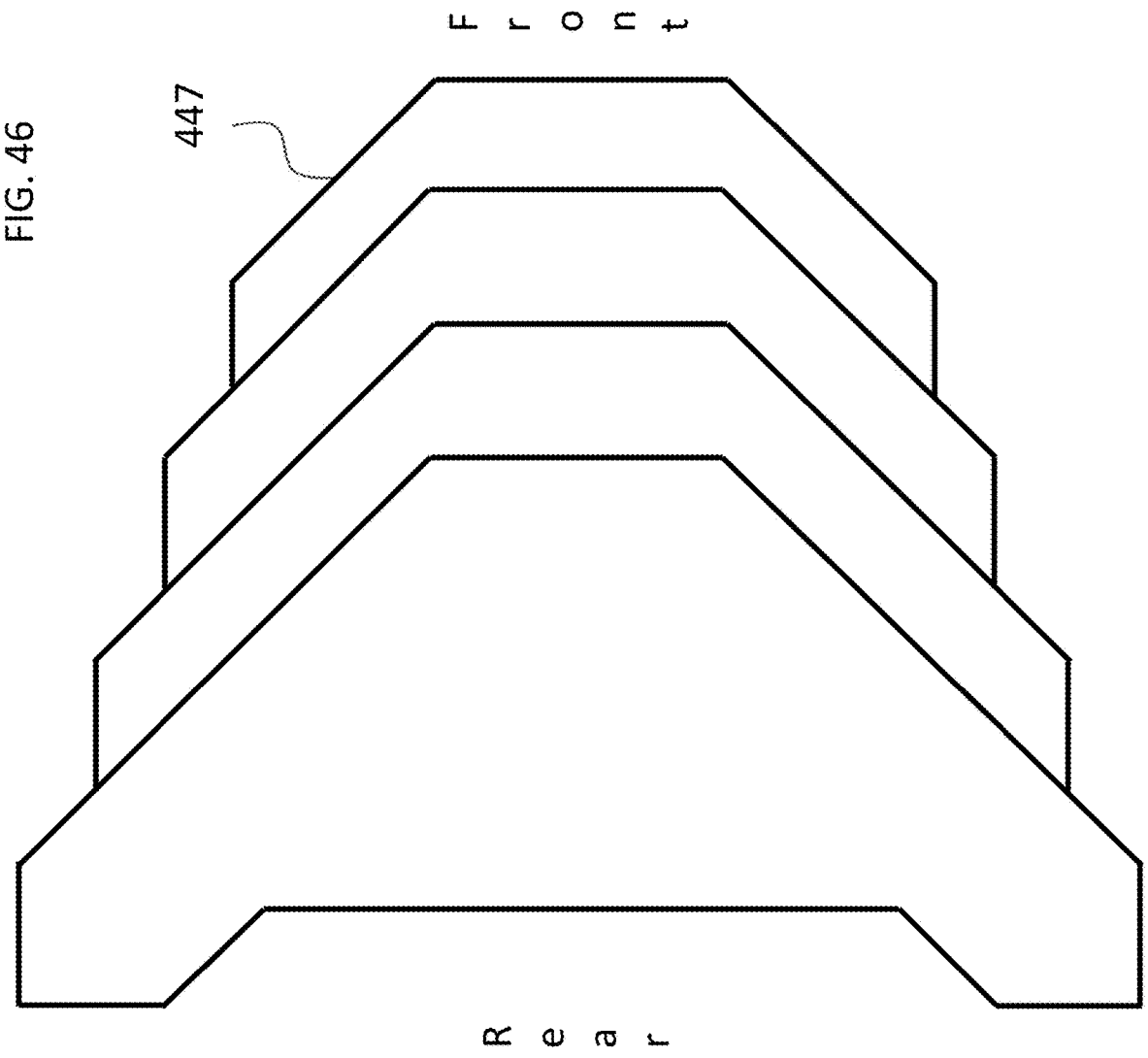

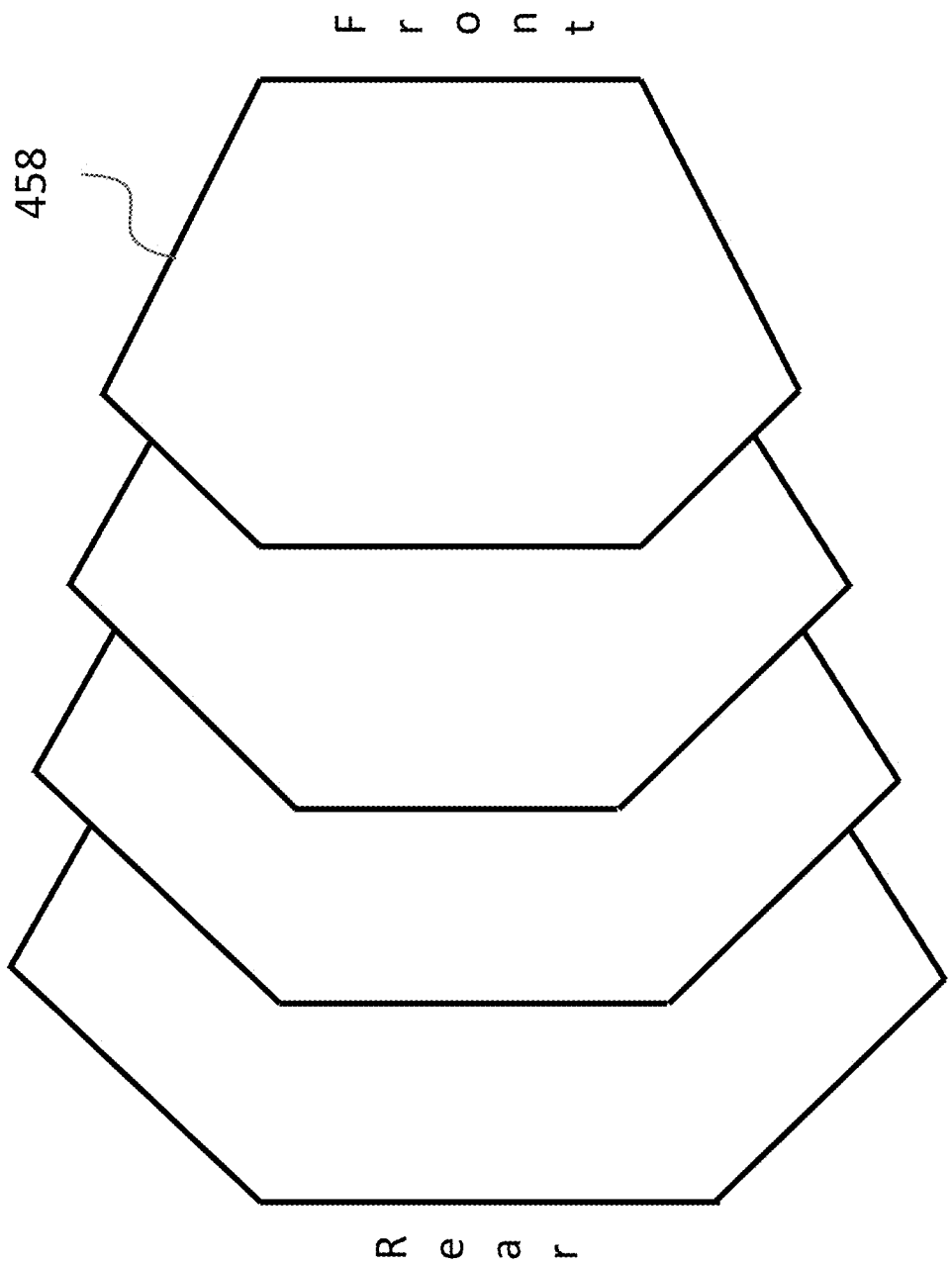

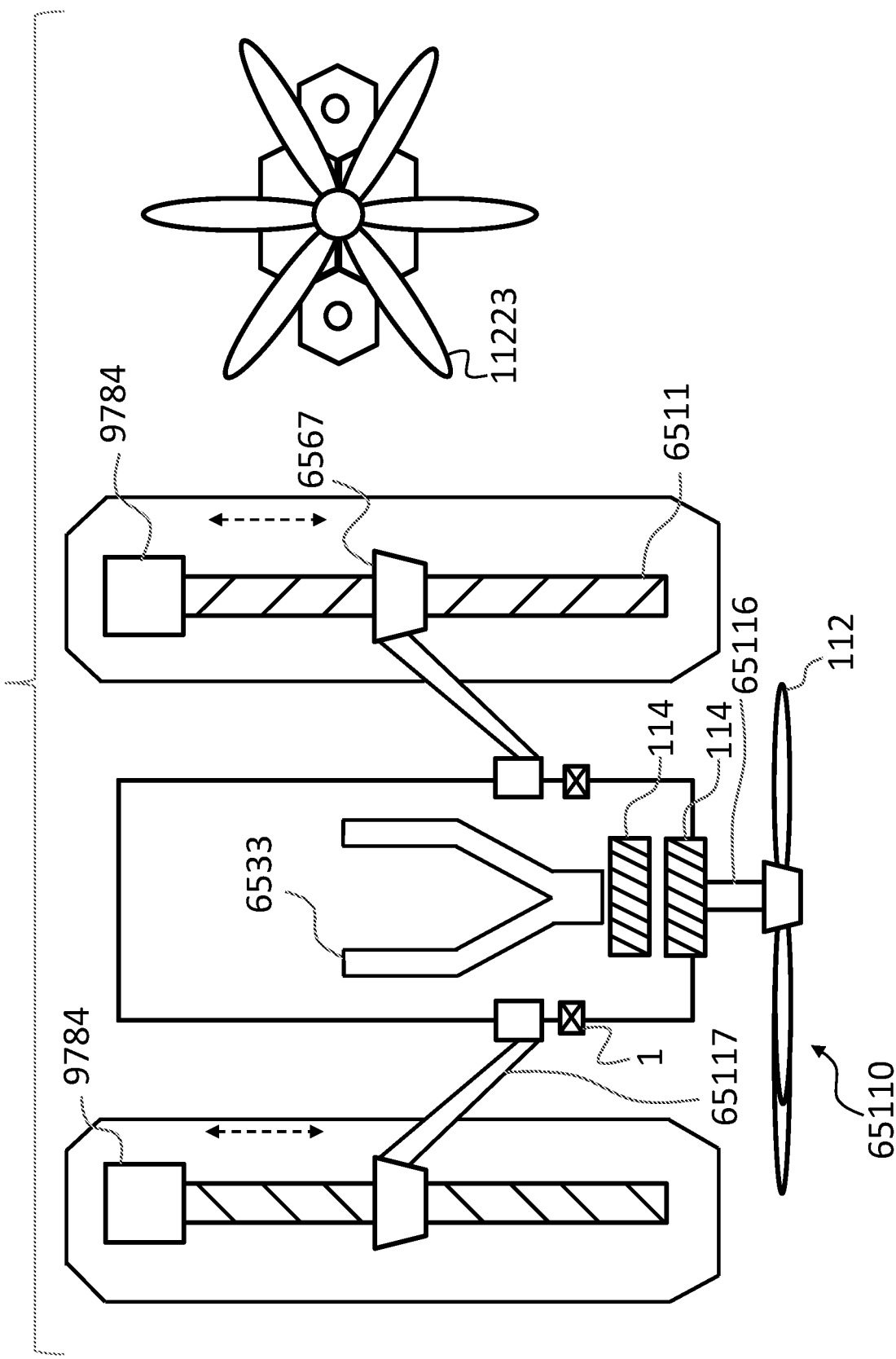

STRUCTURAL FEATURES OF A VEHICLE HAVING UTILITY TO TRANSPORT HIGH VALUE THINGS

The present application claims priority to U.S. Provisional Patent Application No. 63/017,302, filed on Apr. 29, 2020, naming Ty Christopher Sauer as an inventor, entitled the same as the above, the entire contents of that application being hereby incorporated by reference herein in its entirety.

BACKGROUND

The teachings detailed herein are generally directed towards aircraft, and more particularly directed towards vertical and/or short takeoff and landing aircraft. The teachings detailed herein are directed towards both piloted aircraft and remotely piloted and drone aircraft. The teaching detailed herein are also directed towards movement of cargo and/or passengers. The teachings detailed herein are also directed towards movement of cargo and/or passengers within urban areas, or at least where a destination and/or an origin is within an urban area, although the teachings detailed herein are also directed towards movement of cargo and/or passengers in areas that are not urban areas and/or where destination and/or an origin is outside of an urban area.

SUMMARY

In an exemplary embodiment, there is a device, comprising an aircraft power plant cowling including a plurality of segments, wherein the power plant cowling is configured such that the plurality of segments can move from respective first positions to respective second positions, the second positions enabling greater airflow into and/or out of the interior of the cowling relative to the first positions.

In an exemplary embodiment, there is an assembly, comprising an aircraft motor apparatus including at least one motor located within a protective structure, the protective structure having movable sub-structure components, wherein the portion of the aircraft motor apparatus is configured to move the movable sub-structure components to increase or decrease airflow through the protective structure.

In an exemplary embodiment, there is an assembly, comprising an aircraft structure including a first sub-structure and a second sub-structure, wherein when viewed from a top perspective, the first sub-structure is in the form of a general "Y" shaped configuration, and the second sub-structure is in the form of a general "X" shaped configuration.

In an exemplary embodiment, there is an assembly, comprising at least two separate power plants spaced apparat from one another on opposite sides of the assembly an aircraft structure including a first sub-structure, wherein the first sub-structure is a distinct structure that supports the at least two power plants such that there is direct support by the first sub-structure between landing structure of the assembly and the two power plants when the aircraft is in a landed configuration.

In an exemplary embodiment, there is an assembly, comprising an aircraft fuselage including a cockpit, wherein the cockpit is configured for at least one of egress from a front of the cockpit or ingress and egress from the front of the cockpit.

In an exemplary embodiment, there is an assembly, comprising a rotary wing aircraft including a cockpit, wherein the cockpit is breakawayable from the remainder of the assembly.

In an exemplary embodiment, there is an assembly, comprising at least two separate power plants spaced apparat from one another on opposite sides of the assembly and an aircraft fuselage, wherein the assembly is configured to move respective power plants of the at least two separate power plants away from the aircraft fuselage in the event of a crash landing event.

In an exemplary embodiment, there is a method, comprising obtaining access to a rotary wing aircraft, and at least one of controllably taking off or controllably hard landing a rotary wing aircraft in a nose up orientation, wherein the action of controllably taking off is executed by utilizing a least two forward tilt rotors such that the nose lifts off from the ground before the tail portion, and thrust from an ducted fan is directed at a different angle than that of the forward tilt rotors such that the ducted fan provides vectored thrust, and the action of controllably hard landing is executed by inducing higher drag on a nose section than the tail section.

In an exemplary embodiment there is an assembly, comprising an aircraft fuselage including a cockpit, wherein the cockpit is at least one of breakawayable from the remainder of the fuselage or configured for ingress and egress from a front of the cockpit.

In an exemplary embodiment, there is an apparatus, comprising an aircraft fuselage, an aircraft wing, at least two forward tilt rotors and at least one rear ducted fan.

BRIEF DESCRIPTION OF THE DRAWINGS

Embodiments are described below with reference to the attached drawings, in which:

FIG. 5 is a cross-sectional view showing an exemplary vehicle according to an exemplary embodiment;

FIGS. 20-24 present exemplary embodiments of the two substructures;

FIGS. 40-43 present views of exemplary nacelles according to exemplary embodiments, along with some components associated there with;

FIGS. 43A-47 present exemplary segments that can be utilized in some embodiments to vary the amount of airflow flowing into a nacelle;

FIGS. 59-65 present additional exemplary embodiments.

DETAILED DESCRIPTION

Figure 1:
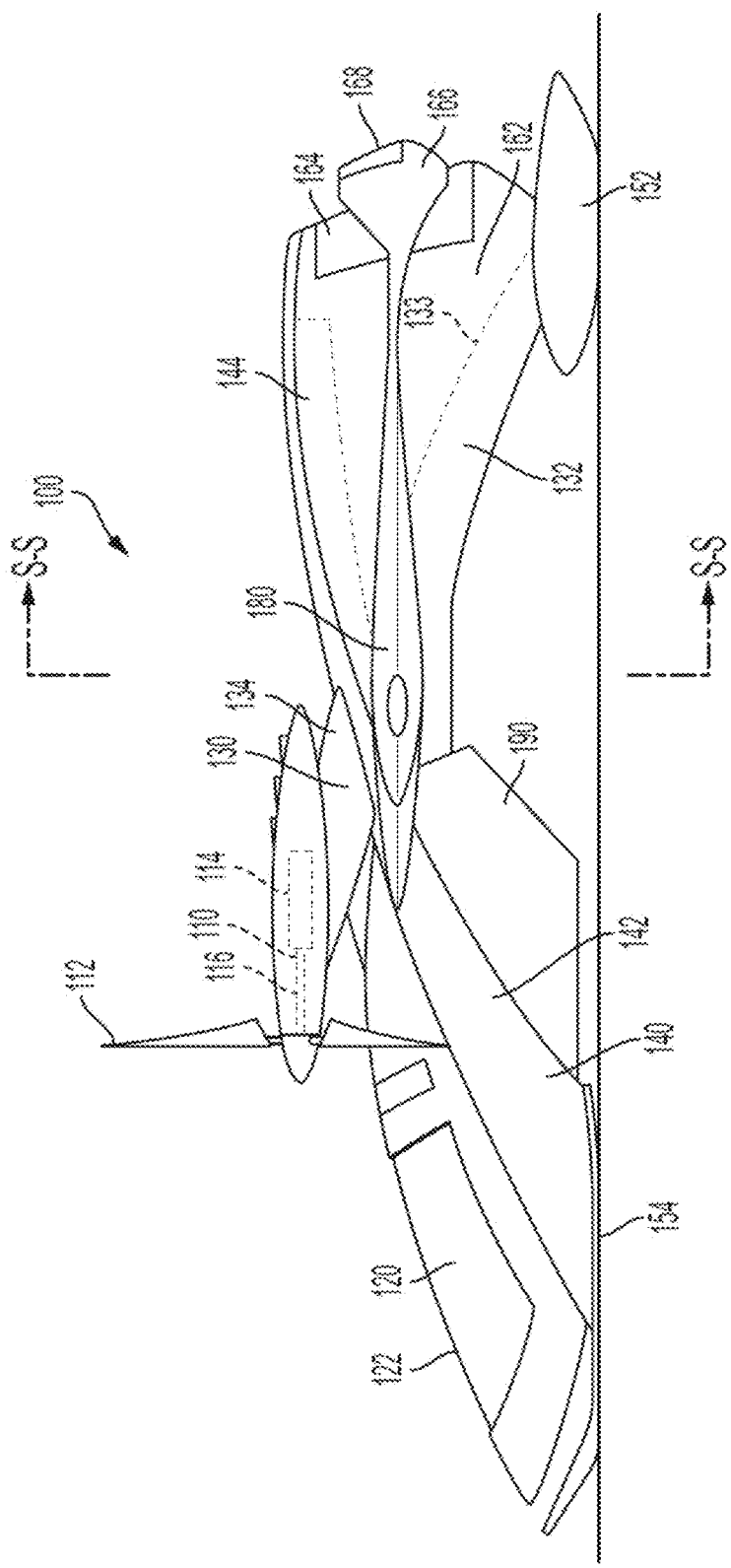
FIG. 1 is a side view of an exemplary vehicle according to an exemplary embodiment.

For ease of description, the techniques presented herein will be directed towards electric powered human piloted and/or crewed and/or staffed hybrid rotary wing aircraft in general, and tilt-rotor species thereof in particular, that includes at least one ducted fan (hence it is a hybrid) used for cargo and/or human transport. In this regard, unless otherwise specified or unless the art does not enable such, any disclosure herein corresponds to an embodiment of utilizing that disclosure, singularly or in collection with two or more or all of the teachings herein, in the aforementioned rotary wing aircraft. That said, embodiments herein are not limited to such. Embodiments can include the utilization of one or more or all of the teachings detailed herein in rotary wing aircraft that are not piloted and/or crewed and/or staffed (e.g., autonomous vehicles, drones, semi-autonomous vehicles, remote controlled vehicles, etc.) and/or non-electric powered aircraft (e.g., petroleum based product fueled engines, such as turboshaft engines, piston engines, etc.) providing that the art enable such, unless otherwise specifically noted. Embodiments can also include the utilization of one or more or all of the teachings detailed herein in non-rotary wing aircraft, such as hovercraft or thrust aircraft (jet engines used in the manner of the F-35 or the AV-8B (AKA, Harrier), by way of example only and not by way of limitation, or tilting jet engines, etc.), or hybrid aircraft, or even fixed wing aircraft, again providing that the art enable such, unless otherwise specified.

Exemplary embodiments include embodiments where the aircraft is utilized and otherwise configured solely for transport of "goods" and things other than people, with the exception of transporting people for health reasons and life reasons (an ambulance as differentiated from for example, a taxi or a limousine—more on this in a moment). That is, it is a cargo aircraft. However, the cargo that the aircraft supplies in at least some exemplary embodiments is not of bulk goods and otherwise not of delivery for delivery sake. By analogy, a US mail vehicle that drops mail off to one's home may be considered a cargo vehicle, but the delivery of such is routine. Indeed, even delivery such as by UPS™ is somewhat routine in nature. Here, at least some exemplary embodiments are directed towards a more specialized courier service. This is not to say that the teachings detailed herein cannot be utilized for more routine delivery of goods, or otherwise matter. However, the teachings detailed herein can have particularly utility to specialize delivery scenarios, such as delivery scenarios where time is literally a matter of life and death. For example, organs that are utilized in organ transplants must be moved in a quick and reliable manner. In this regard, air travel, where feasible, will almost always be superior to land routes, at least with respect to temporal issues, over distances that are greater than a few miles (although as we know below, consider a scenario of moving something from one hospital to another hospital in an inner-city at rush hour in the middle of a rainstorm—the air travel route very well might be temporally superior vis-à-vis a distance less than a mile in some situations). Accordingly, the teachings detailed herein can, in some embodiments, the specialized for the movement of organs, or more particularly, the packages in which those organs are shipped/ transported (typically semi- or fully hermetically sealed ice chest like devices, with controlled climate features). In an exemplary embodiment, embodiments include an aircraft that is configured to transport one or more of a heart, a liver, a lung, a kidney, pancreas, intestine, middle ear, cornea, vascularized composite allografts, connective tissue, bone marrow, heart valves, bone, skin, etc., and, more specifically, the containers or otherwise "packaging" that enable the aforementioned organs or other organs to be transported from one location to another. In an exemplary embodiment, embodiments include an aircraft that is configured basically to only do that and nothing else. All of this said, other embodiments include aircraft that are configured to do that, but also configured to do other things.

As briefly noted above, in an exemplary embodiment, the teachings detailed herein can be utilized for transport of human beings in a health critical situation. In an exemplary embodiment, the aircraft can be configured to move a prone human being. That is, for example, to the extent that a human being can be transported by the aircraft, other than the pilot (and some embodiments include pilotless aircraft), the human being cannot be transported if the human being is sitting up in a manner approved for passenger transport by the FAA on Oct. 13, 2019, at least with respect to the human being that meets or exceeds the requirements for a 30 percentile human factors engineering female as of Oct. 13, 2019, who was naturally born in the United States and is currently a United States citizen.

Some exemplary embodiments include a cargo hold, while in other exemplary embodiments there is no cargo hold. Instead, the package or matter to be transported can be attached to the outside of the fuselage of the outside of the cockpit, or to a substructure or some other portion of the aircraft, providing that the packages are configured to withstand the rigors of flight. Indeed, in an exemplary embodiment, a cocoon-like device for the transportation of patients could be attached to the aircraft, which cocoon would be detached from the aircraft at landing. It is noted that the aforementioned examples are separate from the concept of a sling loaded cargo. In this regard, the attachment of packages or the like results in a rigid or semirigid attachment thereof to the remainder of the aircraft, whereas sling loading does not constitute rigid or semirigid attachment. This is not to say that the teachings detailed herein cannot be utilized for sling loading scenarios. Embodiments specifically implicate such. This is to say that the transport of cargo without a cargo hold can be executed in a manner that is different than traditional sling loading.

It is also noted that in some exemplary embodiments include scenarios where high-value or otherwise limited availability medical devices are transported from one location to another when an as needed basis. In an exemplary scenario, it may not be safe to move a patient, or alternatively, the patient is undergoing a routine at a current time that makes it impractical to move the patient at that time. In another exemplary scenario, the medical equipment is a limited availability medical equipment with limited numbers available in a given location (e.g., only one hospital has a given device in a city). In an exemplary embodiment, entities of pool their resources to purchase this piece of equipment, and the equipment is utilized by moving the equipment from one location to another on an as-needed basis. Regardless of the origins of the scenario, in an exemplary embodiment, a scenario has arisen where there is utilitarian value with respect to moving the medical equipment to the location of the patient as opposed to moving the patient to the location of the medical equipment. Accordingly, exemplary embodiments of the teaching detailed herein can include moving medical equipment and/or medical related material (e.g., organs) from one location to another within a geographic region (within 5, 10, 15, 20, 25, 30, 35, 40, 45, 50, 55, 60, 65 or 70 miles or more or any value or range of values therebetween in 1 mile increments) utilizing the embodiments herein and variations thereof.

The above said, said, alternate embodiments include an air taxi arrangement or otherwise air limousine arrangement, where one, two, three, four or more passengers, in addition to a pilot, if present, can be transported, in a manner that meets the FAA requirements as of Oct. 13, 2019.

Embodiments according to the teachings detailed herein include electric aircraft, such as electric tilt rotors. In an exemplary embodiment, the power plants detailed herein are electric motors. An exemplary embodiment, batteries can be located along the centerline of the aircraft or otherwise located about the centerline of the aircraft in a generally symmetrical manner vis-à-vis center of gravity's of the batteries, are located fuselage, or otherwise attached to the various structures detailed herein. Indeed, as will be described herein, there are substructures that have utilitarian value. In some embodiments, the substructures can be hollow. An exemplary embodiment can include placing battery components are power storage components in those structures. Still, it is noted that in some embodiments, the teachings detailed herein can be combined with conventional propulsion technologies, such as internal combustion engines and/or jet engines and/or turbo shaft engines.

Furthermore, in an exemplary embodiment, the aircraft can be a combined battery-powered and hydrogen fuel cell powered aircraft. In an exemplary embodiment, batteries can be utilized during normal study level flight, and hydrogen fuel cell output can be utilized during periods where increased power is utilitarian, such as, for example, during takeoff and/or landing. As will be detailed herein, in an exemplary embodiment, the teachings detailed herein utilize a ducted fan arrangement, which arrangement is utilized for takeoff in at least some instances, during steady level flight. In this regard, in an exemplary embodiment, the hydrogen fuel cells can be utilized to power the ducted fan system.

FIG. 1 presents an exemplary hybrid rotary ring aircraft 100 according to an exemplary embodiment, as it includes an ducted fan (more on this below). Aircraft 100 includes fuselage 190, which includes cockpit 120 and wing 180, the latter of which extends outward from fuselage 190. Aircraft 100 also includes two nacelles 110 which respectively house a power plant 114 (shown in dashed lines, as it is eclipsed by the skin of the nacelle), which in an exemplary embodiment can be an electric motor, while in other embodiments power plant 114 can be a turboshaft, and in other embodiments power plant 114 can be a piston engine, etc. Also, as will be described in greater detail below, in an exemplary embodiment, there are a plurality of electric motors/engines, etc., in nacelle 110. Powerplant 114 is connected to rotor 112 via shaft 116, and in some embodiments, there is an intermediate transmission between the one or more power plants 114 and the rotor 112. (The shaft 116 is also shown in dashed lines because it is eclipsed by the skin of the nacelle.) In an exemplary embodiment, the nacelle 110 tilts from the horizontal position shown to the vertical position (clockwise tilting). In an exemplary embodiment, the rotation can be by any amount, by way of example only and not by way of limitation, between 10° and 120° or more from the horizontal position. In some embodiments, the rotation can go from a location below the horizontal, such as for example, from −20° or more below the horizontal, etc. By tilting to the vertical position, this enables the rotor 112 to provide downward thrust in a manner analogous to that which occurs with a helicopter or the like. When the rotor is in the horizontal position as shown, this can provide maximum forward thrust so that the aircraft 100 can fly like a fixed wing aircraft. By way of example only and not by way of limitation, the principle is analogous to, and in some embodiments, the same as, that which exists in the MV-22B Osprey rotary wing aircraft. It is also noted that the rotors can be tilted at an angle between the vertical and horizontal to obtain both downward thrust and forward thrust.

Unlike the MV-22B Osprey, in this exemplary embodiment, the nacelles 114 are not supported by the wing 180, or at least not totally supported thereby. In this regard, an innovative feature includes a substructure 130 that includes legs 132 and 134, two of each, that extend from a location proximate a lateral center (e.g., when looking at the aircraft from the front, at a location at least about equidistant from the ends—the location can be at a bottom or a top or a middle of the aircraft, with respect to the vertical, but in many embodiments, it will be a the lateral center (from left to right, with respect to the horizontal)). In an exemplary embodiment, the substructure 130 is an "X" body, additional details of which will be described below. For the moment, it will be sufficient to understand that this X body substructure has a perspective nacelle at ends of the two top legs of the X body. The opposite legs of the X body have landing support structures 152 attached thereto, at the respective ends thereof.

Figure 2:
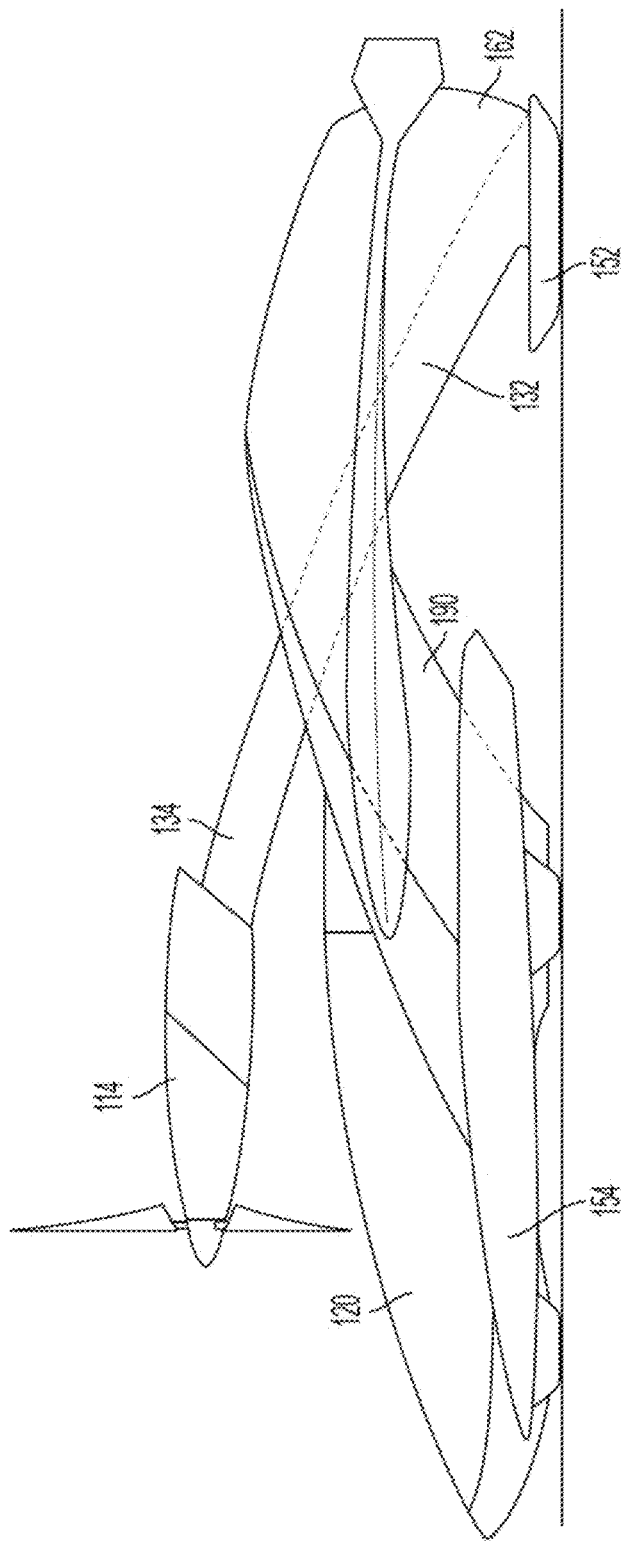
FIG. 2 is a side view of another exemplary vehicle according to an exemplary embodiment.

In this exemplary embodiment, the X structure is a generally shaped X. In this regard, as can be seen, the bottom legs of the X are wider than the top legs, at least when viewed from the side, owing to the fact that the bottom legs include partial stabilization surfaces 162 that are not present on the top legs, and the stabilization surfaces can be part of the structure of the X body. That said, in an alternative embodiment, the X body can be definitively separate structure from the stabilization surfaces, and the stabilization surfaces can be a sheath thereabout or can extend from the X body. By way of example only and not by way of limitation, FIG. 1 shows dashed line 133 which represents the X body underneath the skin of the control surface. As can be seen in the figures, the legs of the X body taper by a certain amount with respect to location from the point where the X meets, owing to the fact that the cantilever moment on the X body is reduced with location outward from the center of the X. That said, FIG. 2 shows an alternate embodiment of the X body where the legs 134 and 132 are uniform over their length, and as with the exemplary embodiment FIG. 1, the bottom legs are located within the stabilization surfaces 162.

Figure 3:
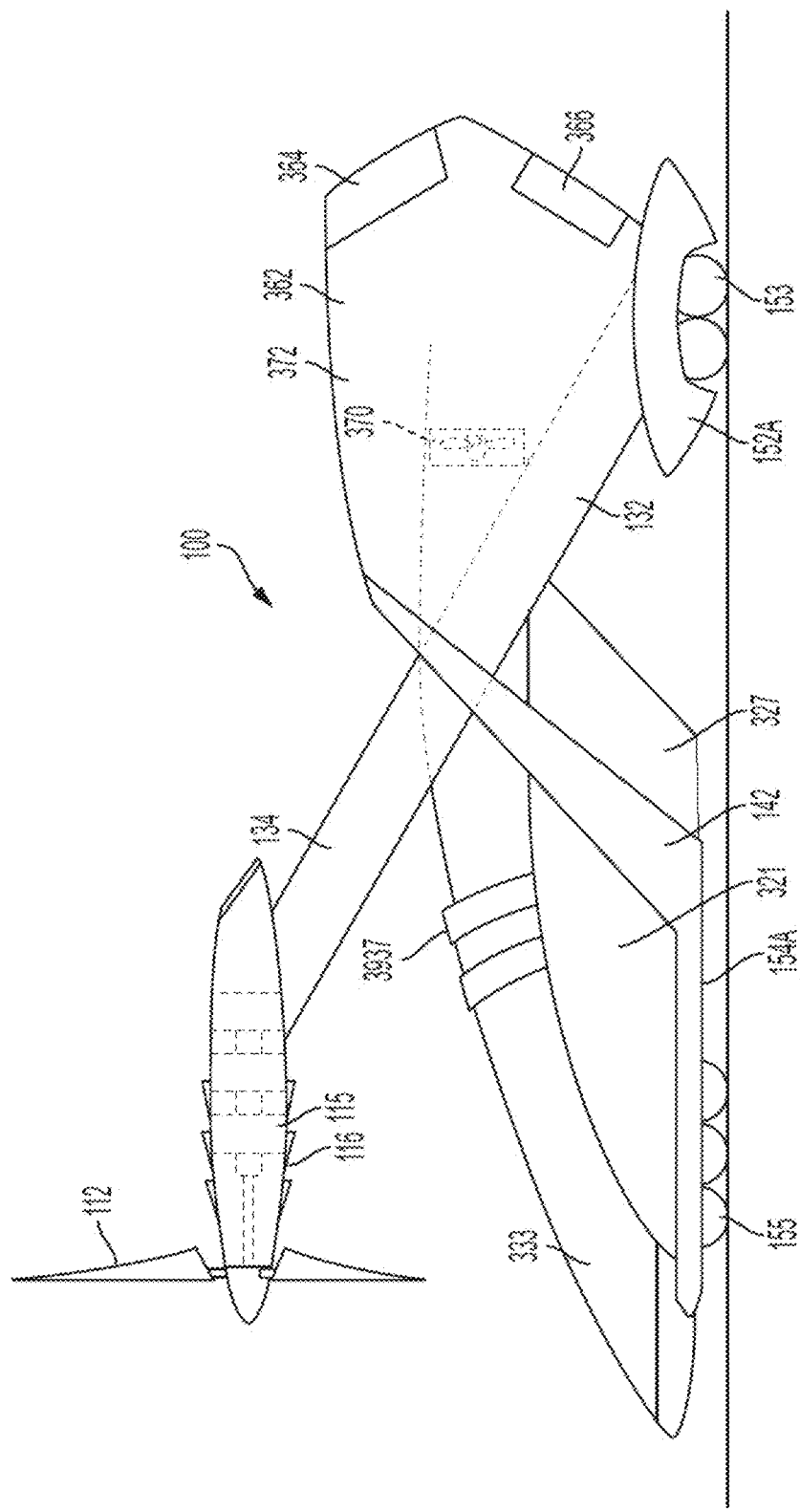
FIG. 3 is a side view of another exemplary vehicle according to an exemplary embodiment.

FIG. 3 presents a more detailed view of the X body, which can be seen is in the form of an X frame with uniform legs vis-à-vis the widths thereof from the side view. Here, the bottom of the legs 132 support a landing gear nacelle 152a which supports landing gear wheels 153. Here, there are two power plants in each nacelle, and there is a transmission 115 between the power plants and the drive shaft 116.

Figure 4:
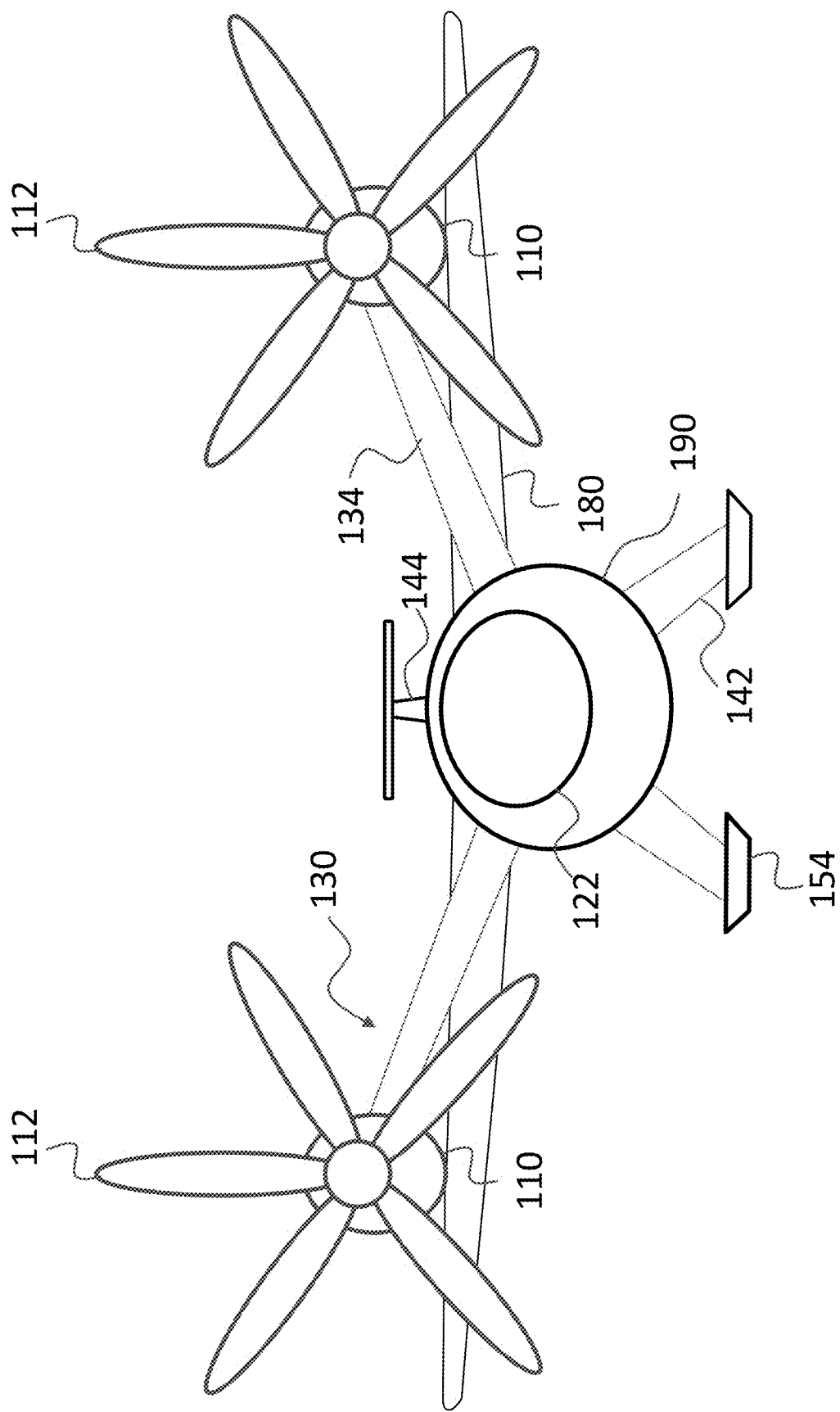
FIG. 4 is a front view of showing an exemplary vehicle according to an exemplary embodiment.

FIG. 4 presents a quasi-generic front view of the embodiment of FIG. 1. Here, the top two legs of the X body can be seen. FIG. 5 presents a quasi-generic cross-sectional view of the embodiment of FIG. 1, which depicts the bottom legs 132 of the X body of the substructure 130, as well as a portion of the top legs 134 until they are cut off by the cross-section as they extend forward.

FIGS. 4 and 5 also depict a second substructure 140. In FIG. 4, it can be seen that there are two legs 142 of a second substructure 140, which in an exemplary embodiment is in the form of a "Y" body. In an exemplary embodiment, the substructure 130 is connected directly to the substructure 140, while in an alternative embodiment, there is another substructure that connects the two substructures together. In this exemplary embodiment, the legs 142 are connected to respective landing pads 154, which constitute forward landing pads. As with the rear landing pads 152, in an alternate embodiment, a wheeled landing gear apparatus can be substituted for the landing pads 154. This can be seen in FIG. 3, where there is a nacelle 154a which supports wheels 155. Owing to the fact that the cross-sectional view of FIG. 5 faces backwards, and the relative position of the cross-section along the longitudinal axis of the aircraft, the legs 142 of the Y are not seen in this view.

FIG. 1 also shows the Y body, and like the X body thereof, a portion thereof is eclipsed by the skin of the aircraft. In this regard, there is a base portion 144 of the Y, which extends from the legs 142. FIG. 4 depicts the base portion of the Y 142 extending outside the aircraft skin for illustrative purposes. Briefly, in an exemplary embodiment, the base of the Y portion can support an ducted fan apparatus 370 (see FIG. 3, which depicts ducted fan apparatus 370 supported by frames 372, which are connected to the base portion of the Y, 362) or some other thrust producing device, which will be described in greater detail below, and/or in another exemplary embodiment, can support control surfaces and/or stabilization surfaces. Briefly, in this regard, embodiments herein include control surfaces. As can be seen in FIG. 1, stabilization surface 162 supports control surface 164. Also by way of example, extending from wing 180 there is a stabilization surface 166 which supports control surface 168.

Figure 5A:
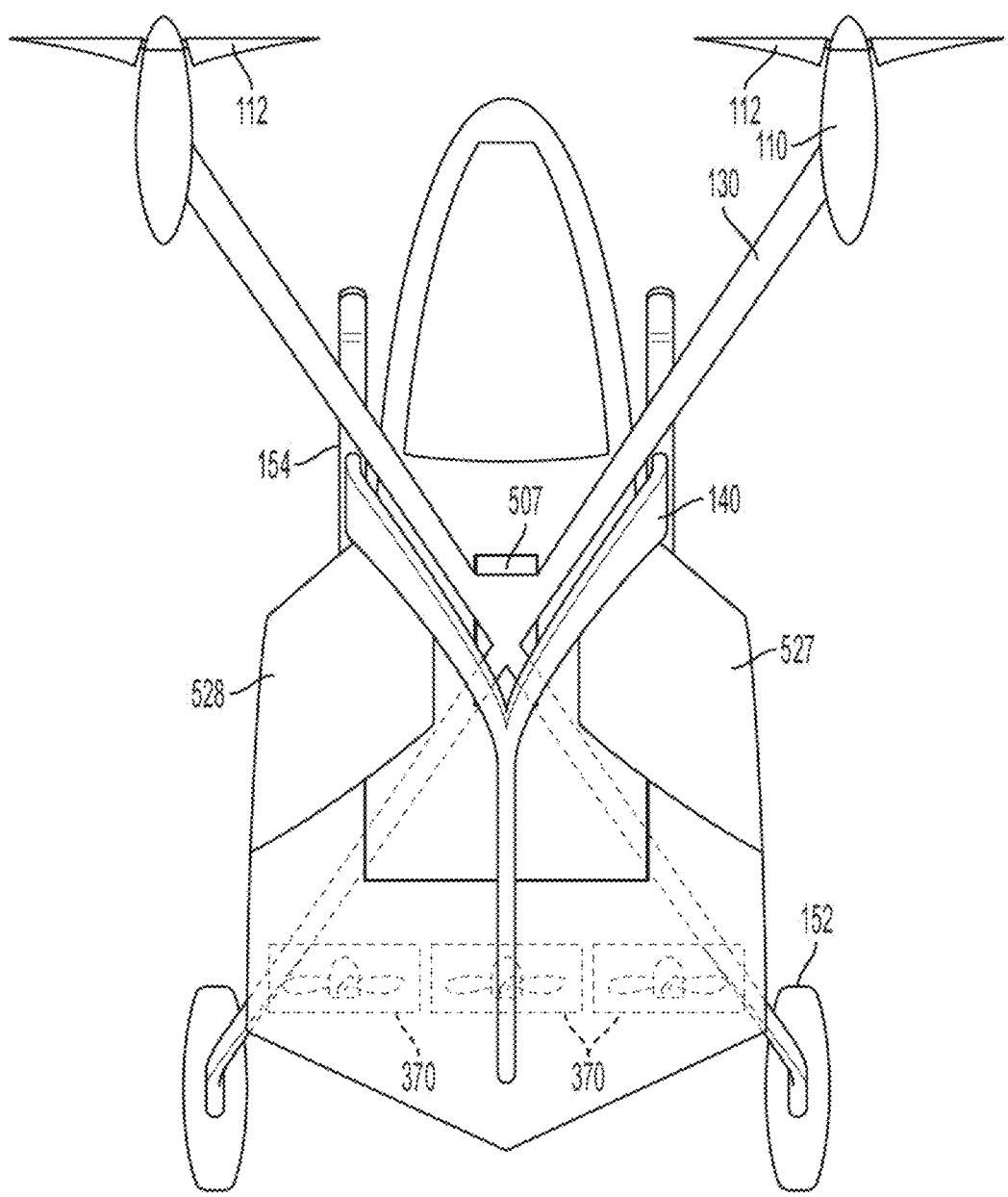
FIG. 5A is a top view showing an exemplary vehicle according to an exemplary embodiment.

FIG. 5A depicts a top view of an exemplary embodiment seen from the top, which depicts the X body 130 and the Y body 140 superimposed on the overall aircraft. Also seen are cargo bays 527 and 528. In an exemplary embodiment, these are established by structure of the aircraft in a traditional manner. In an exemplary embodiment, there are hatches on the outboard sides for the respective cargo bays to enable access therein. In an alternative embodiment, these represent detachable pods that can be attached and detached from the aircraft in a manner analogous to that detailed above. This embodiment can enable quick placement and/or quick retrieval of cargo or whatever payload is to be flown or has been flown by accessing such from the sides. That said, in an exemplary embodiment, the cargo/payload can be accessed from the bottom in addition to this or as an alternative.

FIG. 3, which depicts a side view of an exemplary aircraft 100, shows a dual or a tripartite cargo regime. Here, there is a forward cargo area 321, and a rear cargo area 327. With respect to the latter, in an exemplary embodiment, the area behind cargo area 327 is open. In this regard, the cargo area can be accessed by a hatch that faces rearward and/or underneath the aircraft. That said, in an exemplary embodiment, this can be a pod location where reference 327 represents an aerodynamic cargo pod. With respect to the former cargo area 327, in an exemplary embodiment, this can extend all the way through the aircraft (there could be two hatches, one on the inside, to allow access from either side of the aircraft, or that said, there can only be one hatch, but the cargo area extends from one side of the aircraft to the other). All this said, in an alternate embodiment, the forward cargo area 321 can be bifurcated into two separate cargo areas, one on the left side and one on the right side, thus establishing three cargo areas. There could be a wall separating the two, or other barriers can be located to establish two separate cargo areas. All this said, consistent with the embodiments detailed above where cargo area 327 is instead a pod, in an exemplary embodiment, reference 321 can represent one or more cargo pods which can be aerodynamically contoured, which cargo pods can be quickly attached and/or quickly released from the aircraft. In an exemplary embodiment, the legs 142 of the Y body and the landing apparatus 154A can be arranged to enable access to the cargo area 321 and the cargo area 327, and, the legs 132 of the X body and the landing apparatus 152A can be arranged to enable access to cargo area 327.

FIG. 5A depicts an exemplary embodiment where the aircraft is a wingless aircraft.

That said, in an exemplary embodiment, this configuration can also include a wing as is the case with all the embodiments detailed herein. It is specifically noted that simply because a view does not show a wing does not mean one is present, and vice versa. In many instances, the wing has been omitted for purposes of clarity.

FIG. 5A depicts an exemplary ducted fan system, where there are three fans 370, one or more of which is configured to permit or otherwise tilt to vary the direction of thrust. In this exemplary embodiment, all three can be configured to tilt so as to maximize thrust on takeoff. That said, in an exemplary embodiment, all three of the ducted fans can be configured to be fixed in a downward position to provide only lift instead of a lift and thrust combination, concomitant with the embodiment here where there is no wing, and thus lift behind the center of gravity during flight is utilitarian to balance out the lift that is created by the rotors 112 in front of the center of gravity.

Also as can be seen in this exemplary embodiment is an exemplary arrangement that utilizes a parachute 507, presented here in a parachute canister, that can deploy in the events of a bad day situation. Additional details of this will be described below.

Figure 7:
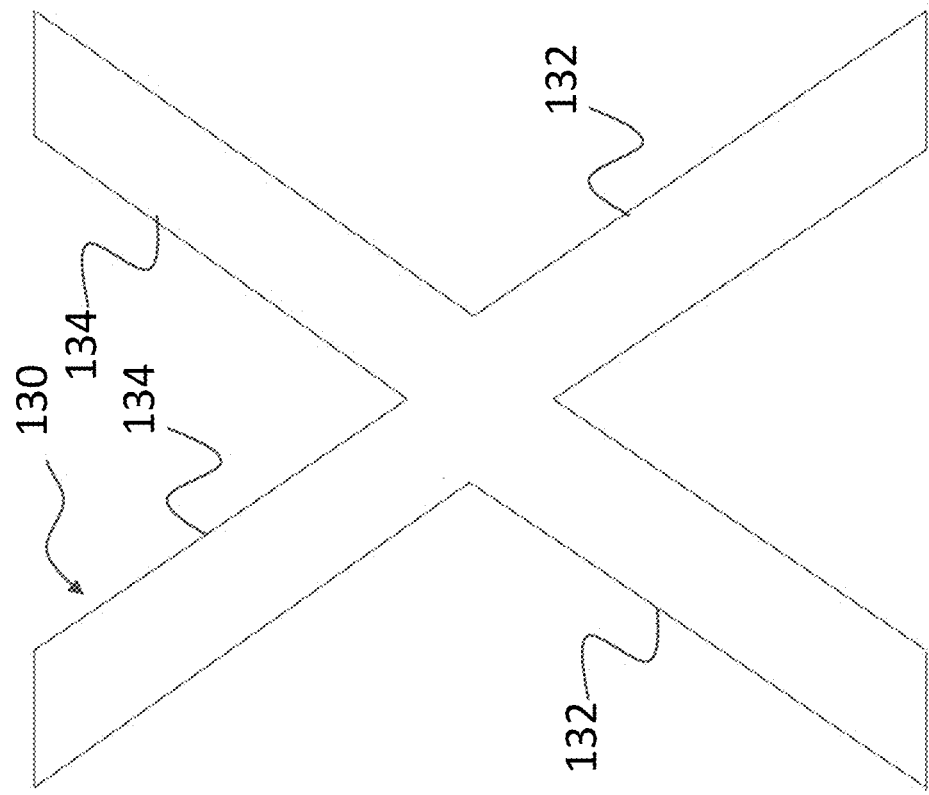
FIGS. 6-10 present conceptual views for purposes of explaining an exemplary embodiment.
Figure 6:
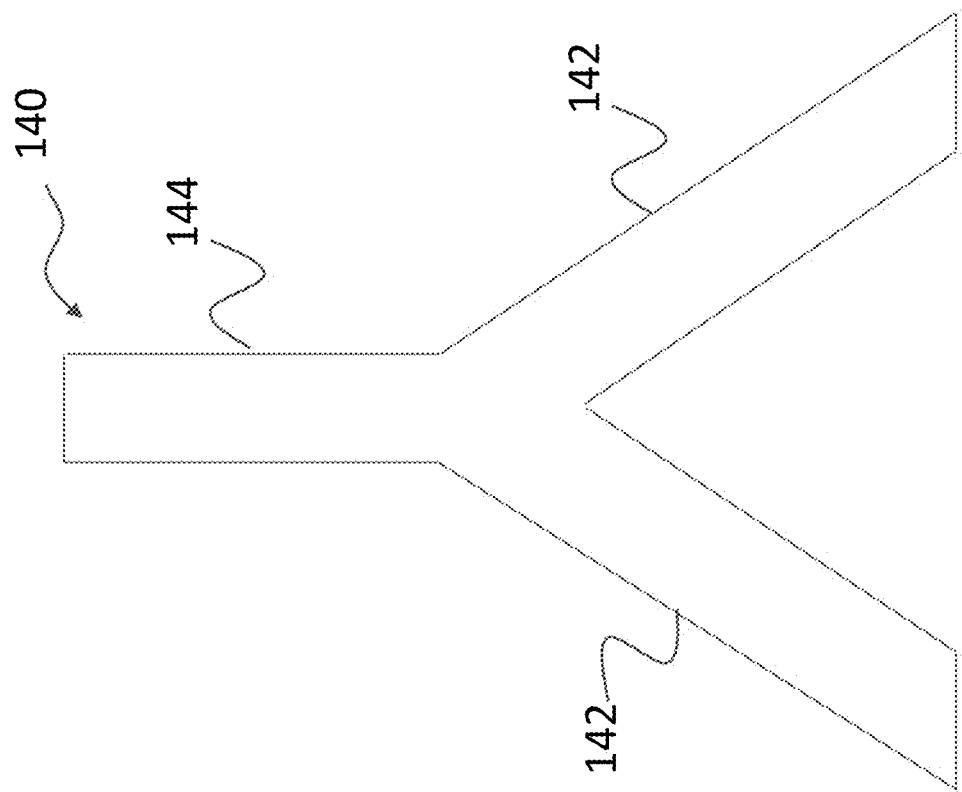
Figure 9:
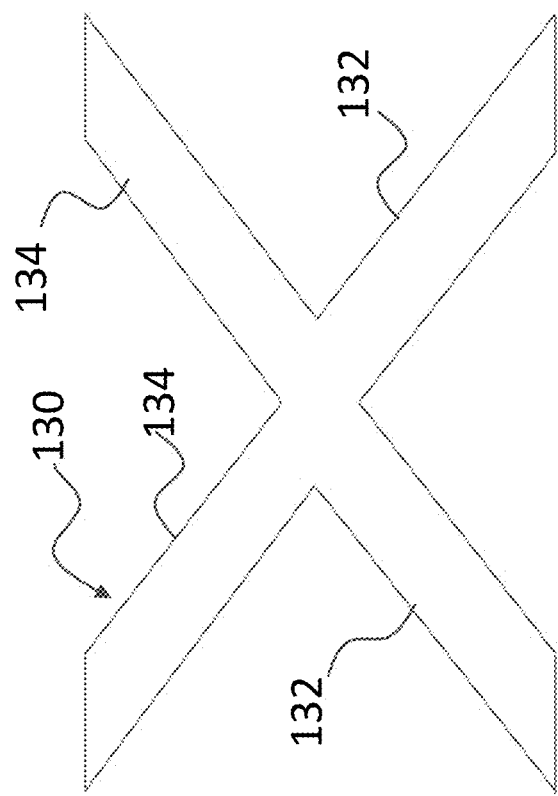
Figure 8:
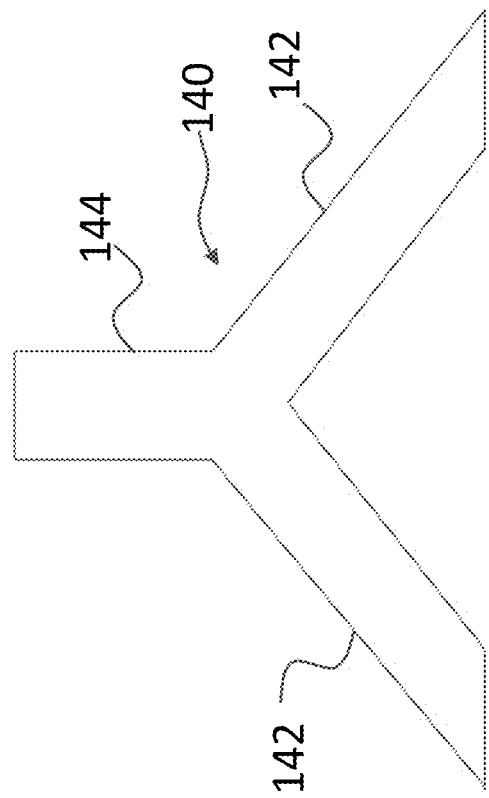

FIGS. 6 and 7 depict the substructures 140 and 130, respectively, when viewed looking normal to a plane of extension of the legs and bases thereof, in an exemplary embodiment. FIGS. 8 and 9 depict the substructures 140 and 130, respectively, when viewed looking down the longitudinal axis of the aircraft, according to an exemplary embodiment. As would be understood, the structures obtain a more squat profile owing to the fact that the structures are extending on a plane that is oblique relative to the longitudinal axis.

It is briefly noted that the embodiments of FIGS. 6 to 9 are conceptual in at least some exemplary embodiments. This is to convey the overall concept of the substructures.

Figure 10:
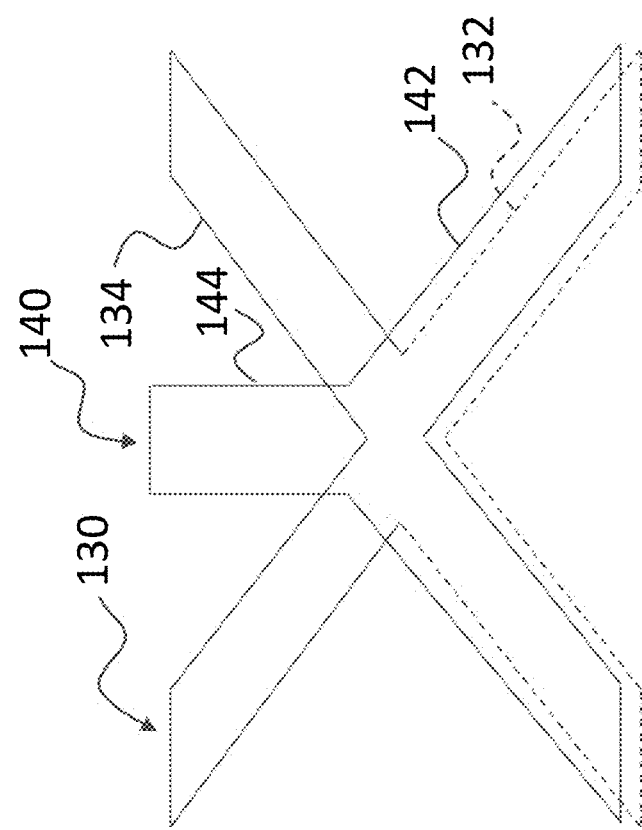

FIG. 10 depicts an exemplary embodiment of the superimposed bodies over one another as they would look in an exemplary embodiment when viewed looking down the longitudinal axis from the front of the aircraft. Here, the legs 132 are eclipsed a bit by the legs 142, as is represented by the dashed lines. It is briefly noted that while the embodiment depicted in FIG. 10 depicts the legs 132 extending to a level below that of the lowest extent of the legs 142, in an alternate embodiment, the extensions can be to the same level (the direction normal to the longitudinal axis—height) and in other embodiments, the legs 142 can extend to a level below that of the lowest extent legs 132. Such can be utilized, for example, to accommodate different types of landing gear and/or landing pads, etc. Any arrangement that can enable the teachings detailed herein can be utilized in at least some exemplary embodiments, providing that the art enables such.

While the above figures present an embodiment where the substructures have overall dimensions that are somewhat the same as one another (e.g., the width, the height, the thickness of the legs and bases, etc.) in other embodiments, the dimensions can be different. The thickness of the top legs could be different than the thickness of the bottom legs, and/or an average thickness of the top legs can be different than the average thickness of the bottom legs (mean, median, and/or mode). This can also be the case with the Y body as well.

Figure 11:
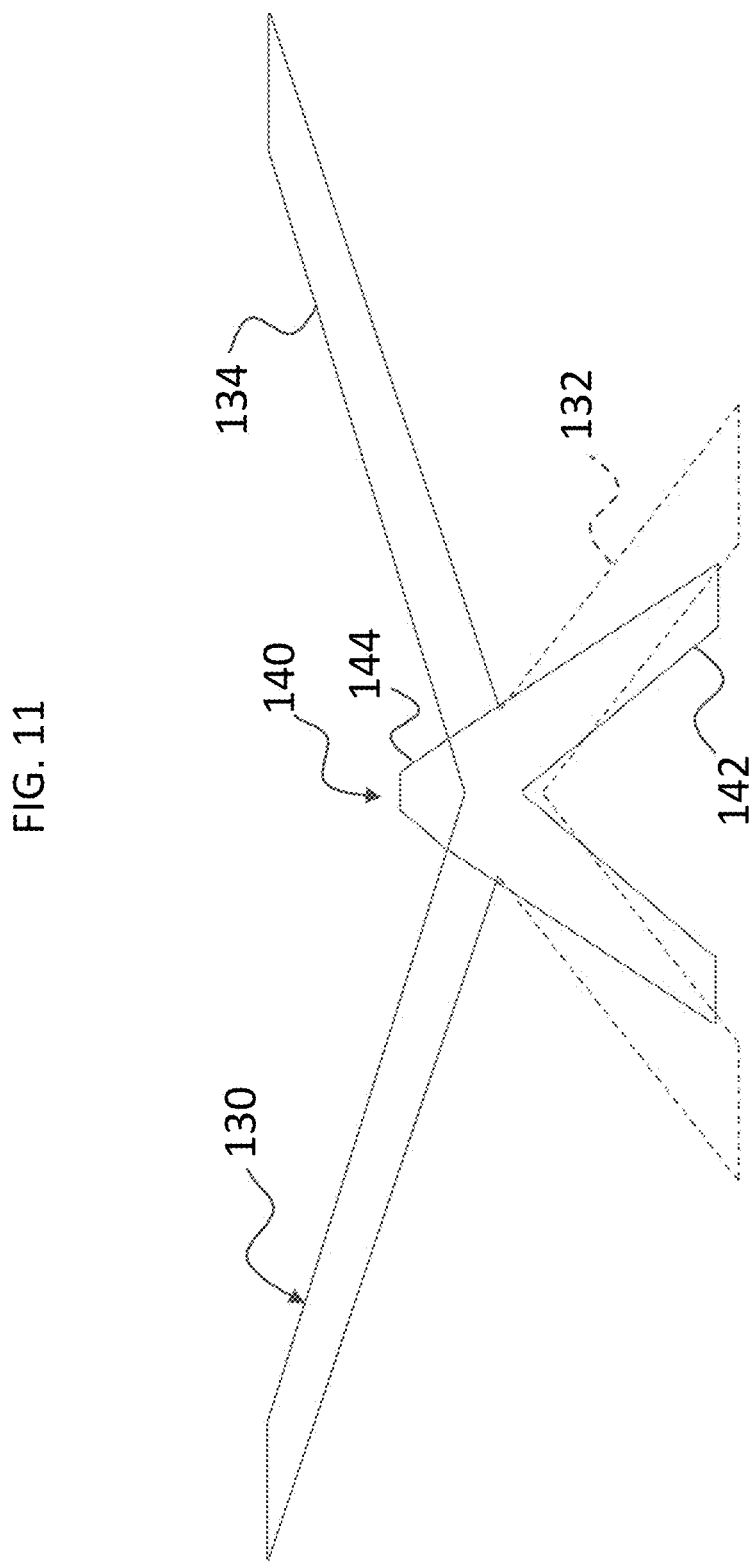
FIGS. 11-14 present additional exemplary views according to an exemplary embodiment of two substructures.

More specifically, while the above figures present an embodiment where the width and the thickness of the individual components of the X body are the same or at least generally the same. In other embodiments, the overall dimensions could be different. By way of example only and not by way of limitation, the top legs of the X body would extend further outward in the lateral direction then perhaps the bottom legs, or vice versa. By way of example only and not by way of limitation, there can be utilitarian value with respect to placing the rotors more outboard than the location of the landing pads 152 or otherwise the landing gear thereof, as is the case with the 22 Osprey, where a center of a given rotor is much more outboard than the maximum extent of the landing gear. FIG. 11 depicts an exemplary apparatus that comprises the first and second substructures having some of the features just detailed. Here, the legs of the Y body are closer than those of the X body, at the bottom. In this regard, there can be utilitarian value with respect to having the front landing pads closer together than the rear landing pads. That said, in an alternate embodiment, the opposite can be the case, owing to some of the embodiments detailed below where the rear landing pads absorb an initial shock of a safety landing, some additional details of which will be described below.

Figure 12:
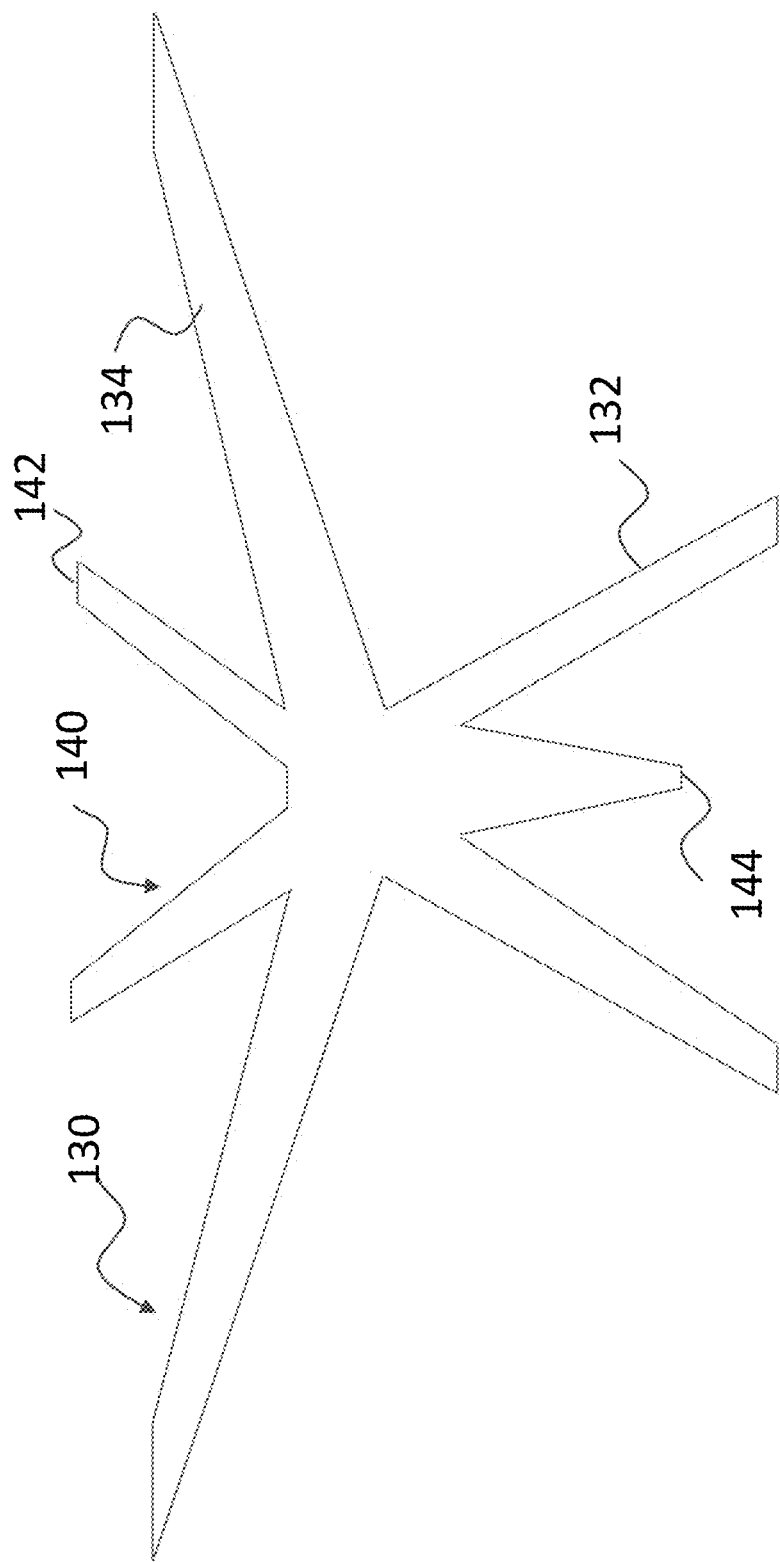

The embodiment of FIG. 11 also represents the feature where the base of the Y body is obliquely angled relative to the plane of extension of the legs of the body Y, and thus does not obtain a height concomitant with the height of the X body. In this regard, the base 144 of the body Y has a length of extension that is, in this embodiment, concomitant with the length of extension of the legs 142. However, the length of extension is more aligned with the longitudinal axis of the aircraft than the length of extensions of the legs. FIG. 12 depicts a top view (or a bottom view) of a general outline of a combination of the X and Y bodies—effectively the embodiment seen in FIG. 11, except from the top (or bottom). Here, the base 144 of the Y body can be seen extending backwards (whereas this length of extension is generally eclipsed in the view of FIG. 11, just as the extent of an aircraft fuselage is eclipsed by the front of the fuselage when looking dead on in front of the fuselage).

The embodiment of FIG. 12 also represents an exemplary embodiment where the legs and the base of the substructures are a single unitary component. In an exemplary embodiment, this can be achieved by welding the X body to the Y body to establish a single integral body (the X and Y bodies are the sub bodies), and in another exemplary embodiment, this can be achieved by forging the X body and the Y body as a monolithic structure (as opposed to welding). These as contrasted to bodies that are mechanically attached to one another, such as being directly bolted to one another, or being attached to one another via a third substructure. In this regard, in an exemplary embodiment, the bodies do not necessarily directly contact each other, but are instead connected by some other body or another structure. In an exemplary embodiment, the fuselage can be the substructure that holds the two bodies relative to one another. Still, for a more robust structure, a third body can be utilized, which body has structural attributes concomitant to those of the X and Y bodies.

It is noted that in some embodiments, the X and Y bodies can be solid components, while in other embodiments, there can be utilitarian value with respect to having the bodies be hollow bodies. In an exemplary embodiment, the bodies are manufactured from a plurality of components. Indeed, in an exemplary embodiment, the legs and/or base can be aluminum and/or composite beams (tubes, I beams, box beams, etc.) that are connected to each other by one or more chassis components (for example, a steel or more beefy structure can form the center of the "X"—to support the legs/hold the legs relative to one another). In an exemplary embodiment, the chassis component can be a single chassis that supports one or more or all of the legs of the X body and one or more of the legs and/or base of the Y body.

In an exemplary embodiment, the legs (and/or base—any attribute of a leg disclosed herein corresponds to a disclosure of such attribute associated with the base, and vice versa, unless otherwise noted, providing that the art enable such) can be riveted aluminum bodies and/or can be composite structures (graphite epoxy and/or fiberglass, for example) that are mechanically connected to one another. Welding can be used in some embodiments. Adhesive can also be used in some embodiments. In an exemplary embodiment, an entire body can be fabricated from a single layup of a composite structure (or can be forged from a single forging), and even both bodies can be fabricated from a single layup, providing that the art enable such and such can be economically produced. Still, it is envisioned that the bodies will be established by multiple components that achieve the lightest weight for a given desired strength.

Any set of components or single component that can enable the teachings detailed herein can be utilized.

Figure 13:
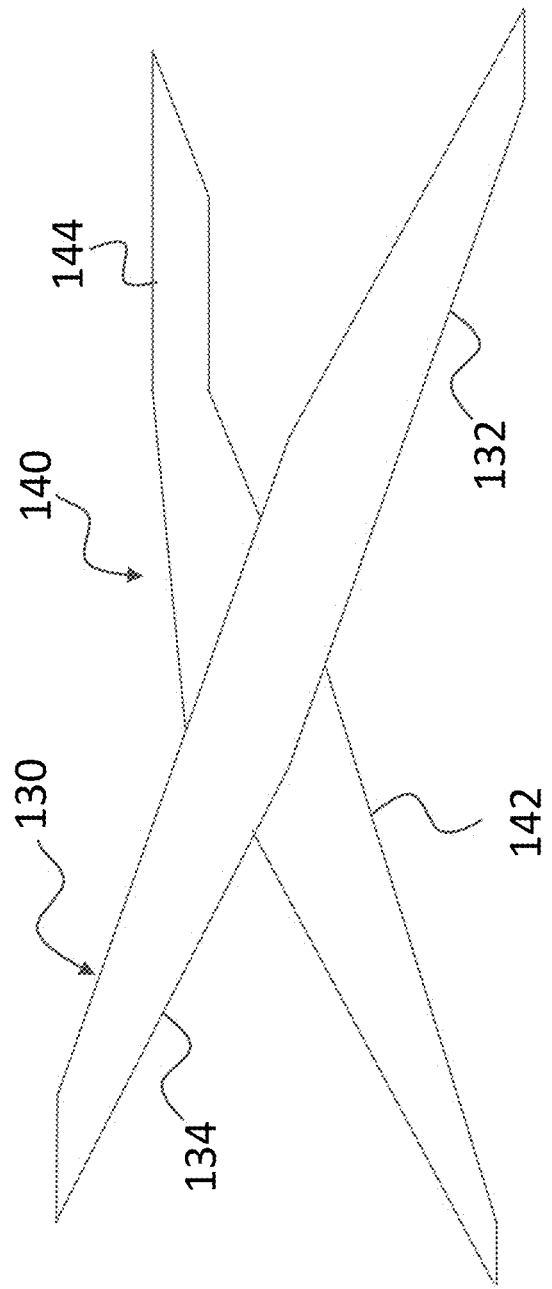
Figure 14:
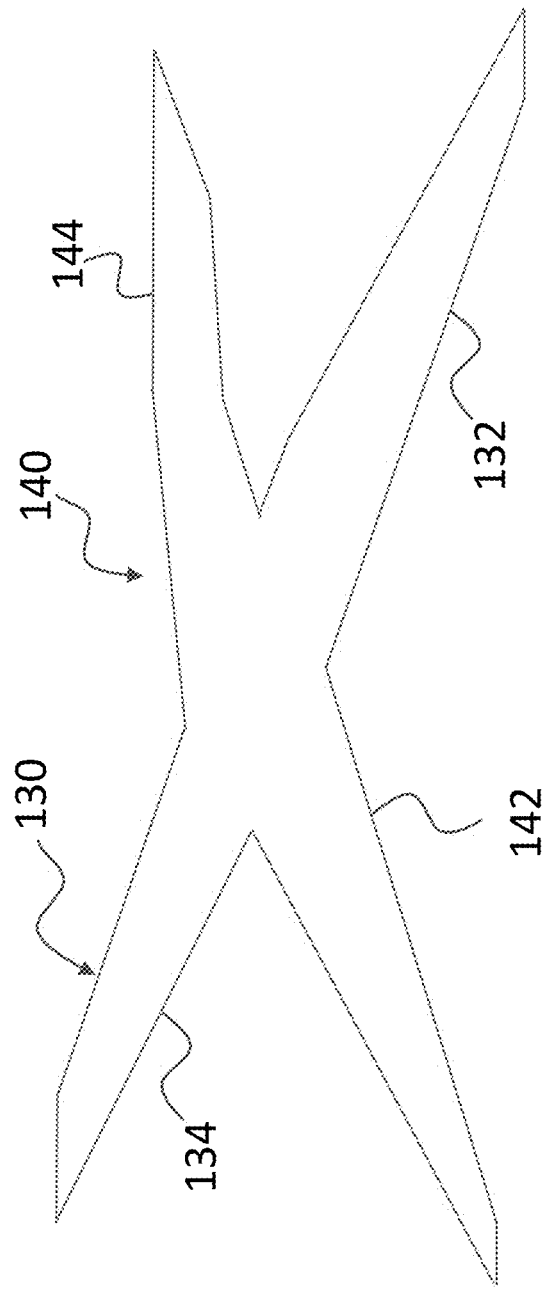
Figure 15:
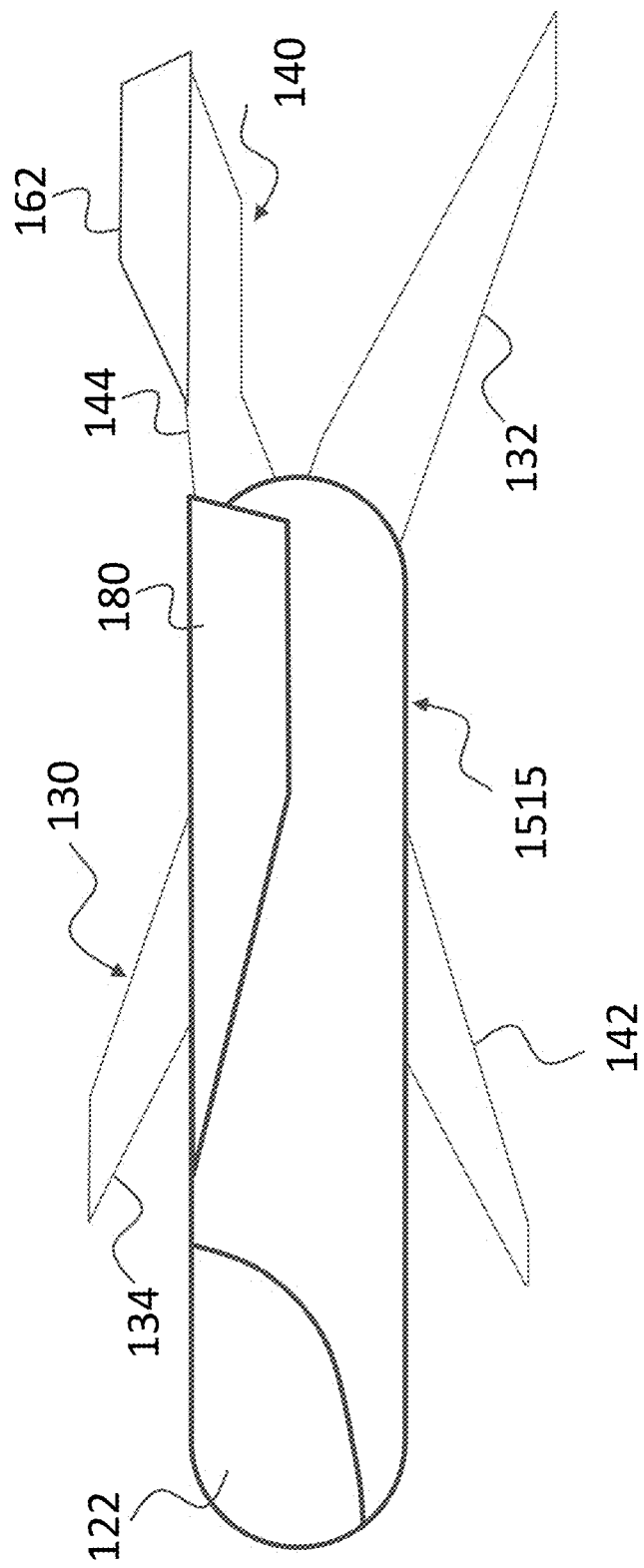
FIGS. 15 and 20 and 25 and 26 and 27 and 29-31 present side views of an exemplary aircraft according to an exemplary embodiment.
Figure 16:
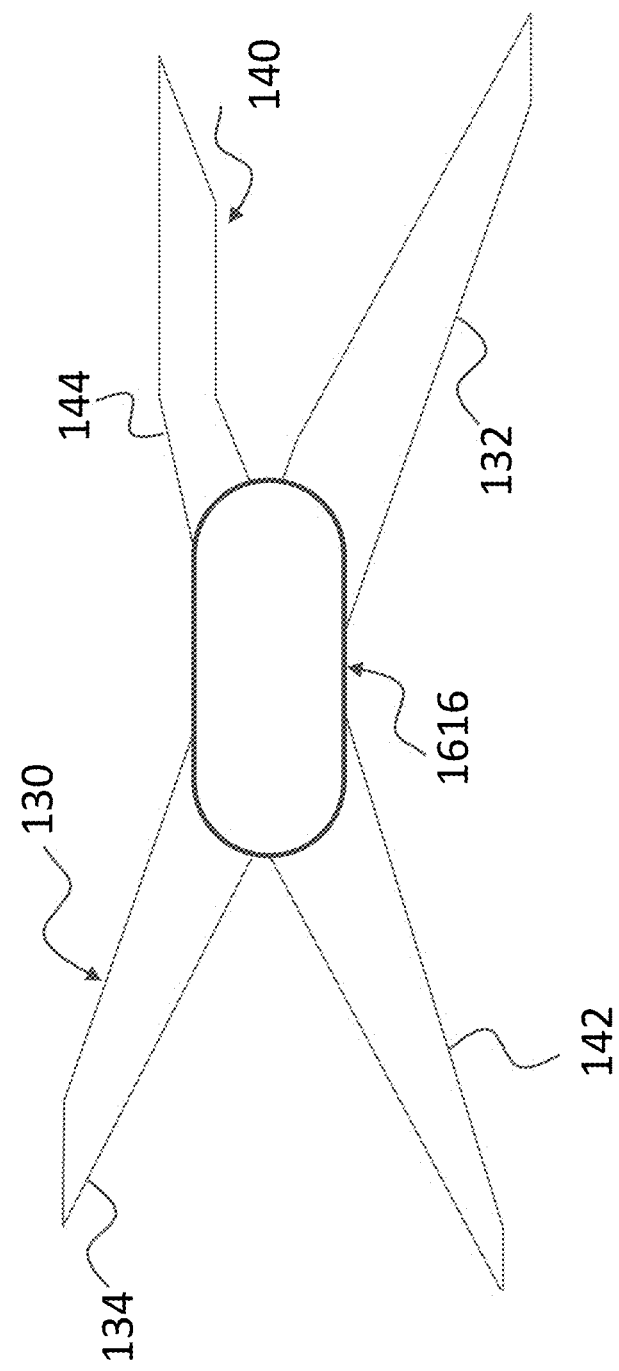
FIG. 16 presents an exemplary embodiment that utilizes two substructures that are connected to one another.

FIG. 13 presents a side view of an exemplary combination of the substructures where the two substructures are unified at the center. In FIG. 13, the view is looking from the side where the left is the front of the aircraft. FIG. 14 presents a side view of an exemplary combination of the substructures where the substructures are all part of the monolithic body. FIG. 15 presents a side view of an exemplary combination of the substructures that are held together relative to one another via the fuselage 1515. FIG. 16 presents a side view of an exemplary combination of the substructures that are held together relative to one another via a third substructure 1616, which can be a body that envelopes proximal portions of the legs and base to hold all together. Still, in an alternative embodiment, it is envisioned that a base skeleton structure having five appendages extending away from each other from a common base, which appendages are attached to respective legs and the base of the X and Y bodies can be utilized in at least some exemplary embodiments.

Figure 17:
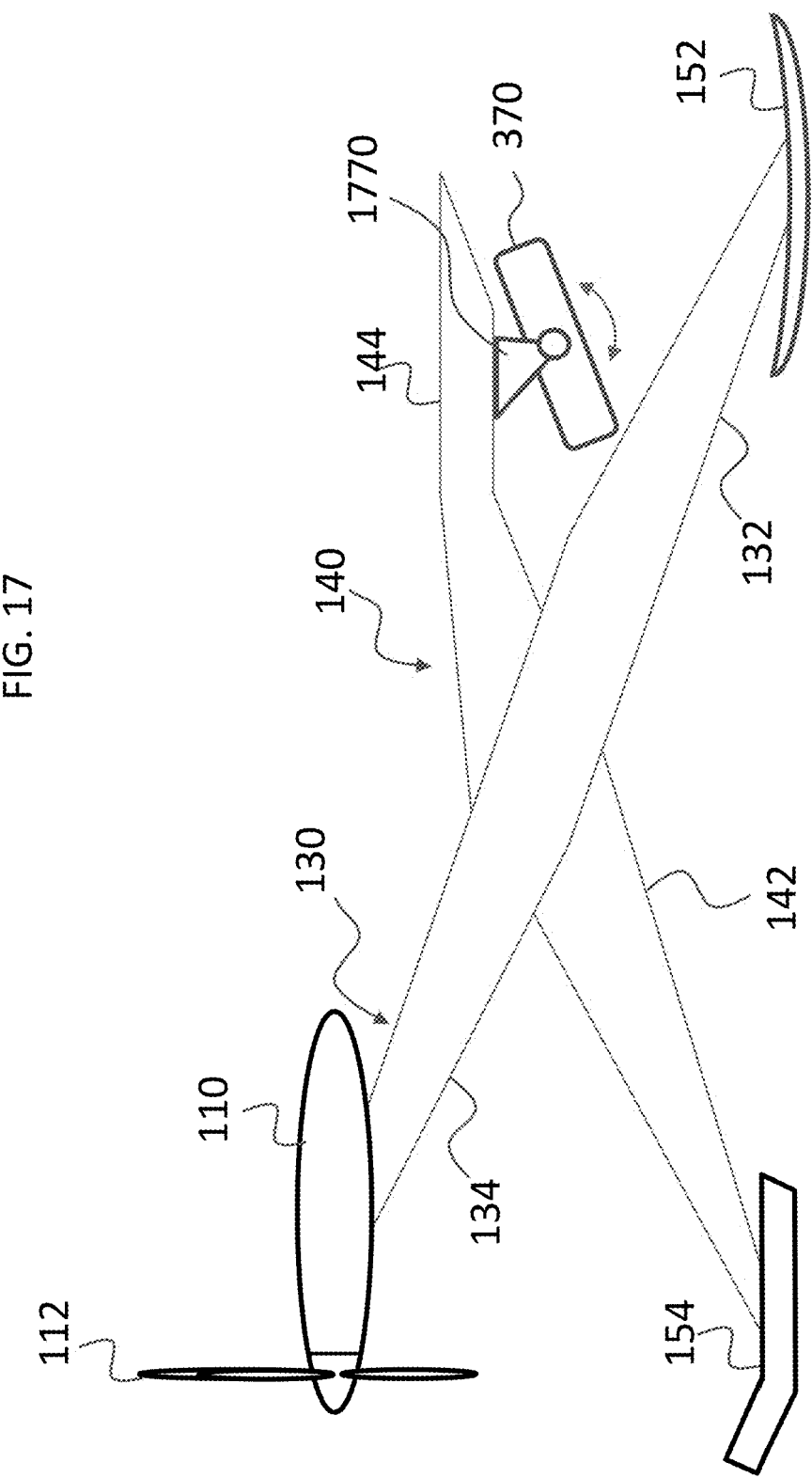
FIGS. 17-19 present exemplary embodiments of the two substructures supporting components associated with exemplary vehicles.
Figure 18:
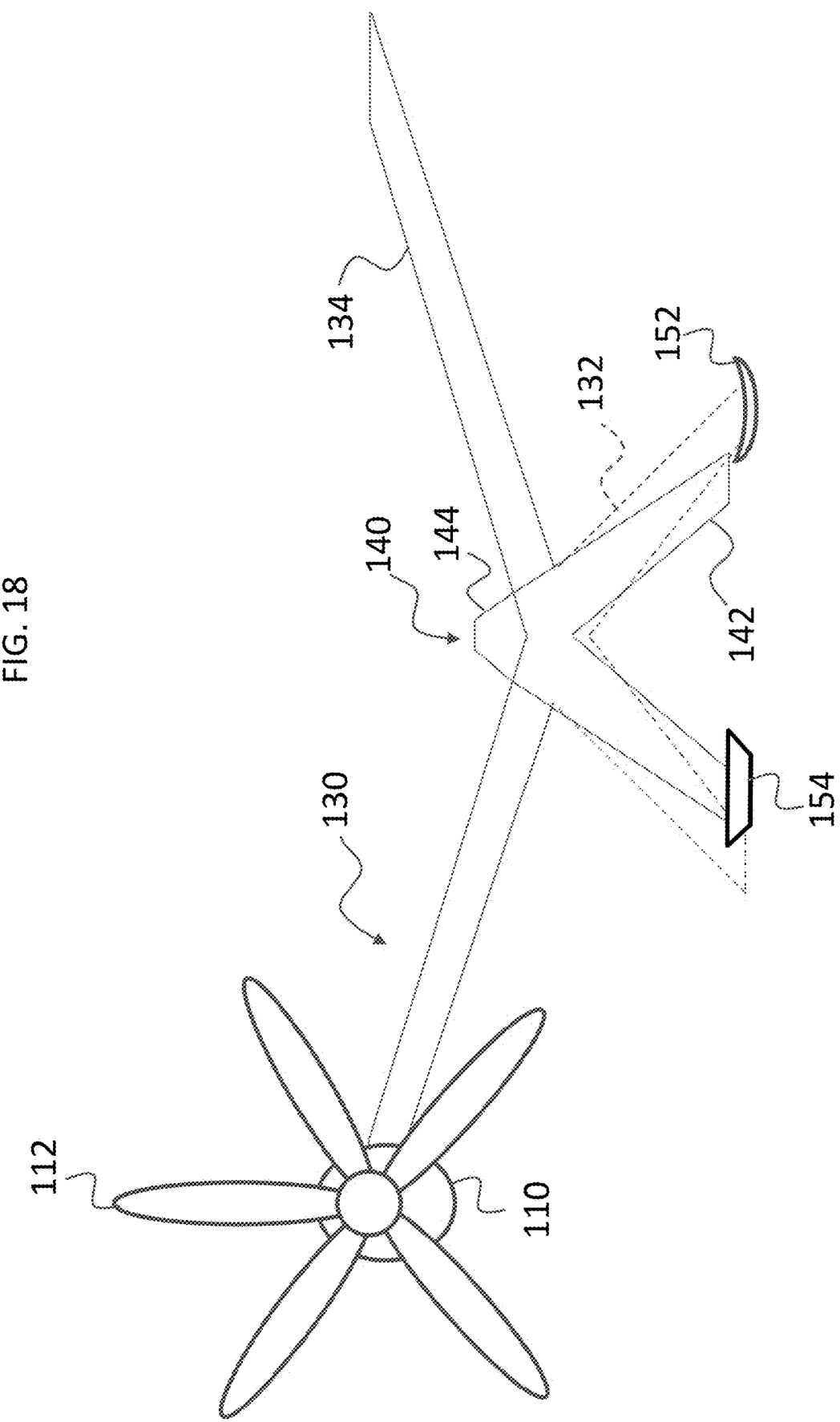
Figure 19:
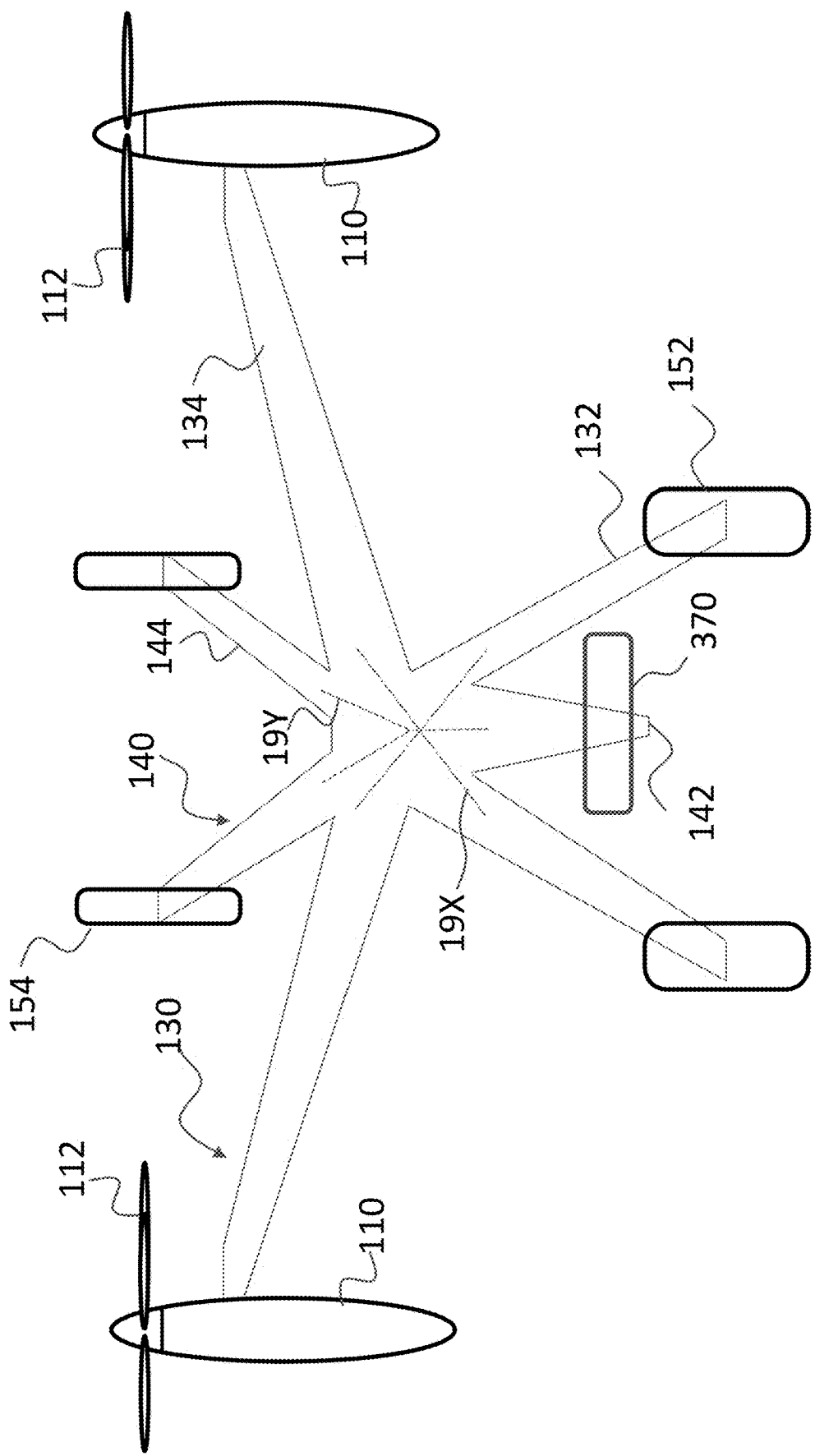

FIGS. 17 and 18 and 19 depict an exemplary utility of the sub-structures 130 and 140. Briefly, FIG. 17 depicts a side view of the combined substructures, FIG. 18 presents a view looking at the substructures from the front of the aircraft, and FIG. 19 presents a top view of the substructures. As can be seen, in an exemplary embodiment, the top legs 134 respectively support a nacelle 110, which supports power plant(s) that drive the proprotors 112. Respective legs of the bottom legs 132 support respective skid plates 152, which are utilized to support a portion of the aircraft weight when in a landed configuration (and also provide utilitarian value with respect to forced landing scenarios, as will be described in greater detail below). Respective legs of the legs 142 support respective skid plates 154, which are utilized to support the remaining portion of the aircraft weight when in a landed configuration (and also provide utilitarian value with respect to forced landing scenarios, more on this later). Base 144 supports an ducted fan 370, or, more particularly, supports a pivot mount 1770 that supports the ducted fan 370 in a pivoting manner. The ducted fan 370 is presented in conceptual terms in this embodiment, additional details of the ducted fan will be detailed below.

Figure 20:
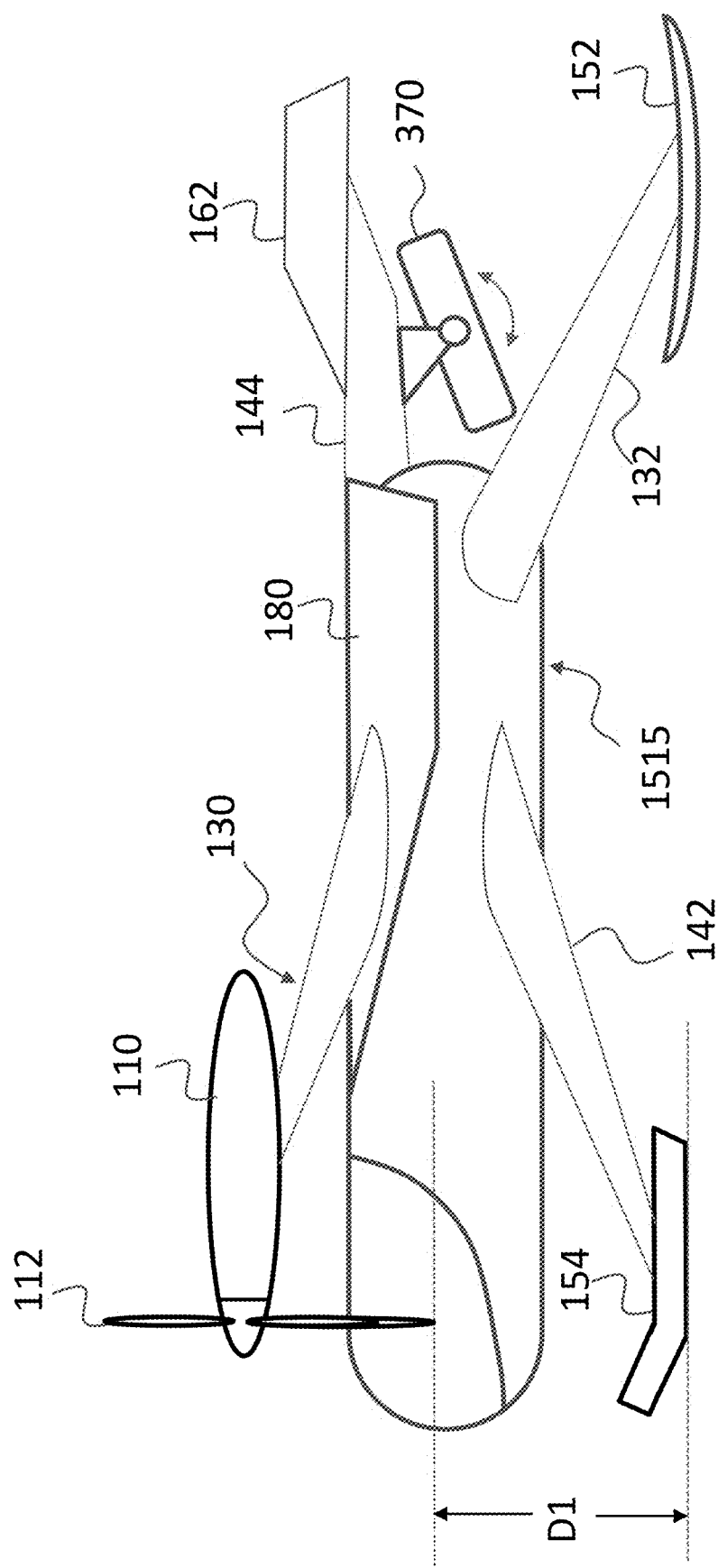

As noted above, in some embodiments, the base 144 can also support stabilization surfaces. It is also noted that in some embodiments, the legs and/or the base can support other components, as will be described in greater detail below. Briefly, FIG. 20 depicts an exemplary embodiment where the two substructures support the fuselage 1515, the wing 180, and the tail stabilizer 162. In this embodiment, the fuselage is a structure that is attached to the combined substructures and otherwise supported thereby.

As can be seen from the above figures, the combined substructures can support the relatively more massive components, such as the power plant(s) (including the ducted fan powerplant) and support surfaces that experience the greatest loads (e.g., the skid plates 152 and 154, which support the entire weight of the aircraft at landing, and, in some instances, the vertical stabilizer 162, or, more particularly, the control services associated there with). In this exemplary embodiment, the fuselage and the like is relatively free of support functionality vis-à-vis these elements (although this is not necessarily the case for some of these elements, such as, for example, the wing 180). Instead, the combined substructures established by the X and Y bodies support most of the load/react against most of the substantial forces normally experienced during the normal lifetime of the aircraft. Indeed, in an exemplary embodiment, the fuselage and/or the wings can be completely removed/otherwise not be present, and the structural integrity of the remaining portions of the aircraft will still remain. In this regard, in at least some exemplary embodiments, the fuselage is reduced to, for the most part, a component that provides a barrier between the ambient atmosphere and the components and/or entities inside, and little more. This is a conceptual example, of course, as in practice, a fuselage will be typically desired and otherwise present, but a conceptual example that explains the utility of the combined substructures relative to traditional aircraft that rely on the fuselage and/or the wings to provide structural support for the power plants (and rotors) and the landing gear/landing apparatus, etc.

In view of the above, there are some embodiments of an assembly that comprises an aircraft structure including a first sub-structure and a second sub-structure. In an exemplary embodiment, when viewed from a top perspective, the first sub-structure is in the form of a general "Y" shaped configuration, and the second sub-structure is in the form of a general "X" shaped configuration. They need not be perfect X shapes and Y shapes. In this regard, the shapes need not be symmetrical. FIG. 19 presents this concept, where there is a hypothetical perfect "Y" shown (19Y) and a hypothetical perfect "X" shown (19X), but the X and Y bodies are not aligned with the legs of the X or Y perfectly. By way of example only and not by way of limitation, with reference to FIG. 21, which presents the top view of a unified substructure arrangement, angle A1 can be different than angle A2. Also, it is briefly noted that angle A3 can be the same as or different than any of angles A1 and/or A2. All of these angles are measured from the longitudinal plane 2102 extending in the vertical direction (the plane in and out of the page of FIG. 21) to a centerline of a respective leg (the centerline can be established by a mean median or mode system or can established by any generally accepted engineering quantification standard). The centerline can be established by utilizing the middle of the "tip" of a leg. The centerline can be established by utilizing the middle of a chord at a middle of the leg (3-dimensional distance or distance from the plane 2101. The centerline is in two dimensions vis-à-vis looking downward (or upward). In reality, the centerline extends both horizontally and vertically-here, we are explaining the direction of extension in X-Y plane (the horizontal). In an exemplary embodiment, any one or more of angles A1, A2 and A3 can be 20, 25, 30, 35, 40, 45, 50, 55, 60, 65, 70, 75, 80, 85 or 90 degrees or any value or range of values therebetween in about 1° increments inclusive (e.g., 27, 33, 31 to 77 degrees, etc.). It is to be understood that the angle between the centerline and the plane 2199, which is orthogonal to plane 2101, would be 90° minus A1, A2 or A3, respectively.

Figure 22:
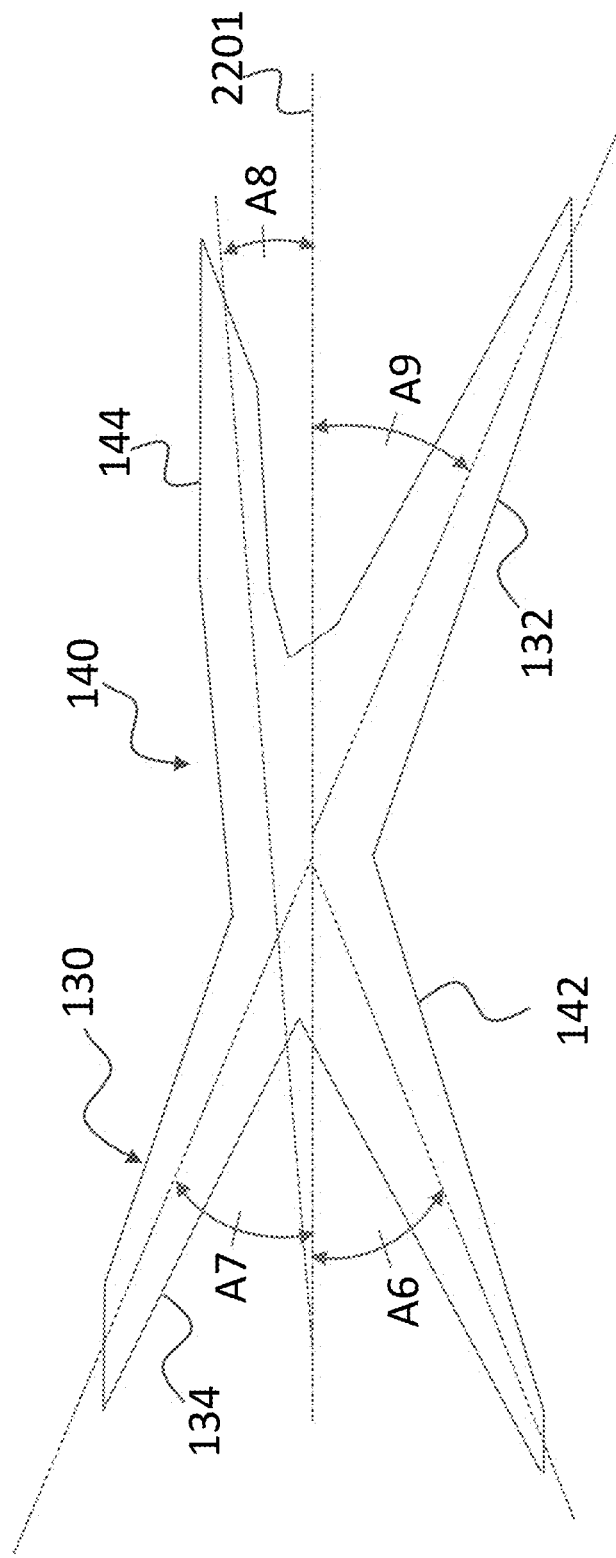

Continuing with the concept that the shapes of the bodies need only be generalized, we are reminded that the shapes need not extend in the same plane. This is most imminently the case with respect to some of the embodiments of the Y body, where the legs can extend on a plane that is substantially different than that of the extension of the base. In this regard, FIG. 22 presents a side view of the unified substructure arrangement, with the left being the front of the aircraft. Here, there is a vertical plane 2201 (extending into and out of the plane of FIG. 22). The vertical plane is measured from the location where the legs of the bottom meet the legs of the top. In this exemplary embodiment, it is assumed that the legs of the X meet at the same location that the legs of the Y meet the base of the Y. This is for ease of description. In an exemplary embodiment, there could be two separate planes. Indeed, in an exemplary embodiment, the legs of the X could straddle the base of the Y. In an exemplary embodiment, the legs of the Y could straddle the center point of the X. Of course, this may not necessarily result in two separate planes. In any event, it is to be understood that angle A6 can be the same as or different than angle A8, and Angle A7 can be the same as or different than angle A9.

Figure 21:
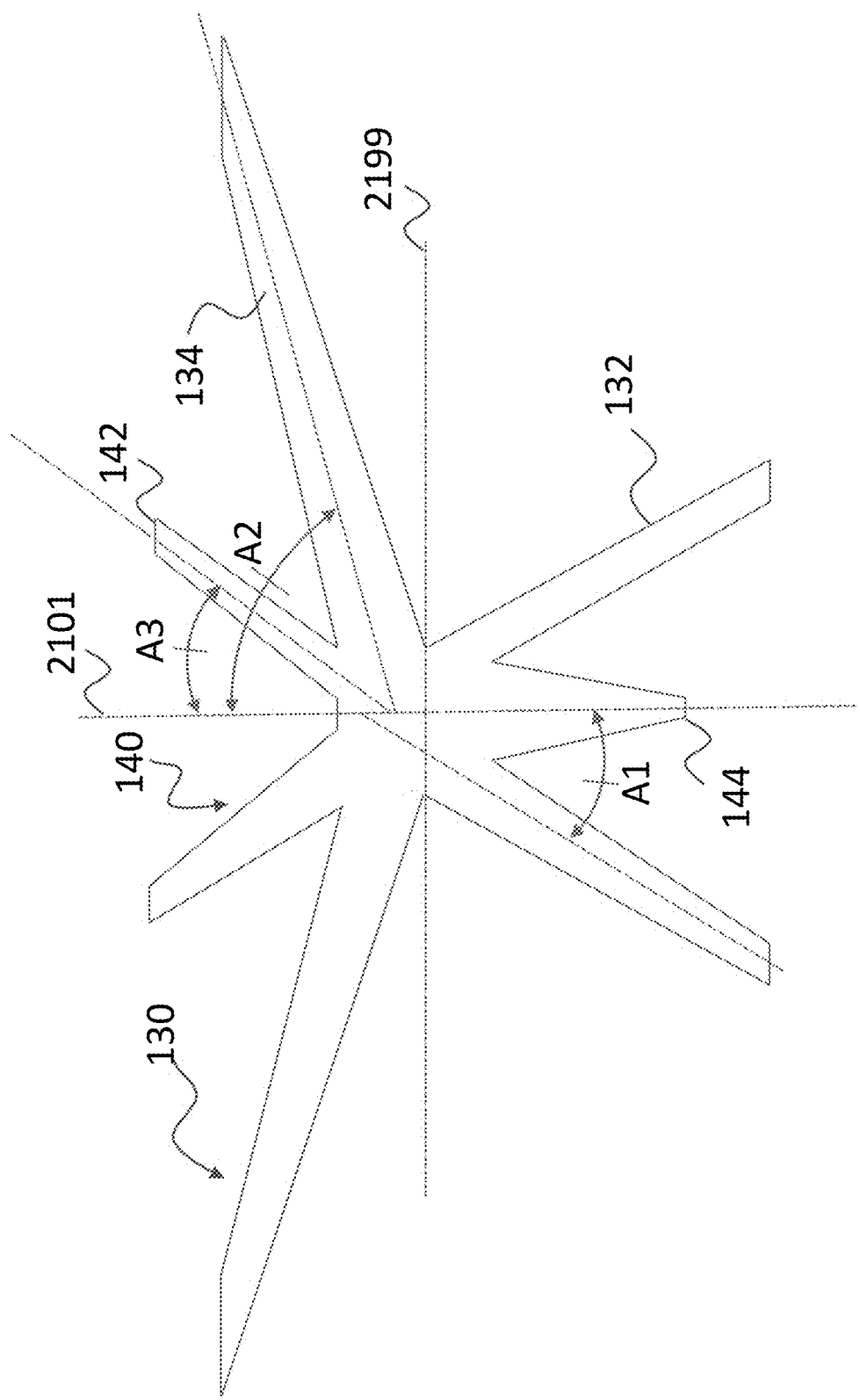

In the embodiment of FIG. 22, the centerlines are measured in accordance with any of the regimes detailed above with respect to FIG. 21, except that it is the Y-Z plane in which the measurements are taken, instead of the X-Y plane. In an exemplary embodiment, any one or more of angles A6, A7, A8 and A9 can be 20, 25, 30, 35, 40, 45, 50, 55, 60, 65, 70, 75, 80, 85 or 90 degrees or any value or range of values therebetween in about 1° increments inclusive (e.g., 37, 23, 41 to 71 degrees, etc.). It is also noted that angle A8 can be −120, −115, −110, −105, −100, −95, −90, −85, −80, −75, −70, −65, −60, −55, −50, −45, −40, −35, −30, −25, −20, −15, −10, −5, 0, 5, 10, 15, 20, 25, 30, 35, 40, 45, 50, 55, 60, 65, 70, 75, 80, 85 or 90 degrees or any value or range of values therebetween in about 1° increments inclusive. With respect to negative values, these would be angles that would place the centerline of base 144 below plane 2201 (with −90 having the base 144 extending straight down). It is also noted that angle A7 can be −45, −40, −35, −30, −25, −20, −15, −10, −5, 0, 5, 10, 15 or 20 degrees or any value or range of values therebetween in about 1° increments inclusive.

Figure 23:
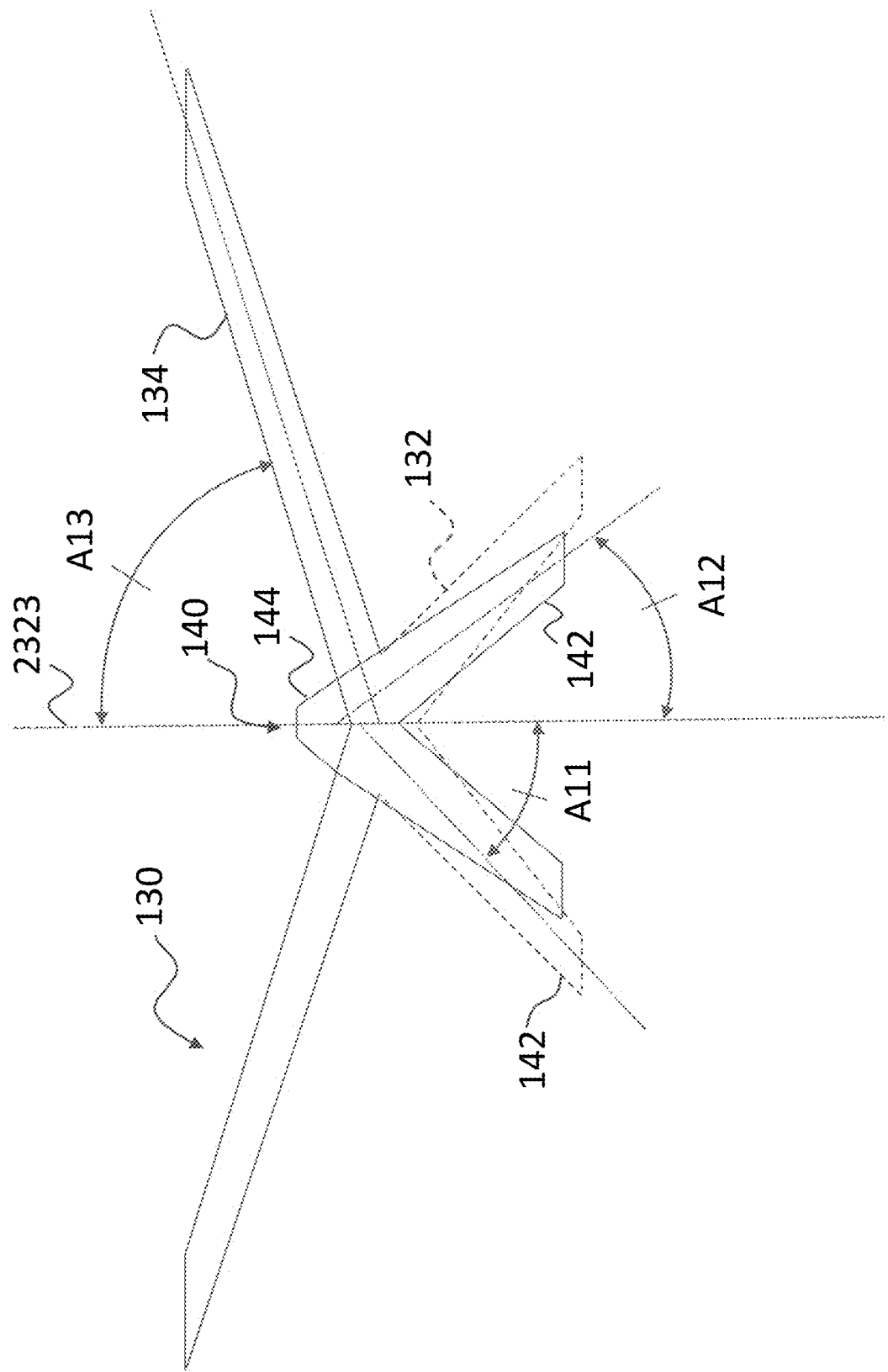

In the embodiment of FIG. 23, the centerlines are measured in accordance with any of the regimes detailed above with respect to FIG. 21, except that it is the X-Z plane in which the measurements are taken, instead of the X-Y plane. In an exemplary embodiment, any one or more of angles A11, A12 and A13 can be 20, 25, 30, 35, 40, 45, 50, 55, 60, 65, or 70, or any value or range of values therebetween in about 1° increments inclusive (e.g., 37, 23, 41 to 71 degrees, etc.). It is also noted that angle A13 can be 70, 75, 80, 85, 90, 95, 100, 105, 120, 125, 130, 135, 140, 145, 150, 155, or more, or any value or range of values therebetween in about 1° increments inclusive.

It is noted that the angles and measurements and dimensions herein are but exemplary, and other embodiments can use different values, and can be greater than or less than those detailed herein, providing that the art enables such.

In an exemplary embodiment, the length of a given leg and/or a base, along the centerline, whether such as compound or otherwise, as measured from the geometric center of the intersection of the legs (or legs and base) can be 30, 35, 40, 45, 50, 55, 60, 65, 70, 75, 80, 85, 90, 100, 120, 130, 140, 150, or 160 inches or more or any value or range of values therebetween in 1 inch increments. In an exemplary embodiment, a maximum thickness, irrespective of whether or not a given leg and/or basis hollow, can be 4, 5, 6, 7, 8, 9, 10, 11, 12, 13, 14, 15, 16, 17, 18, 19, 20, 21, 22, 23 or 24 inches or any value or range of values therebetween in quarter inch increments.

Figure 24:
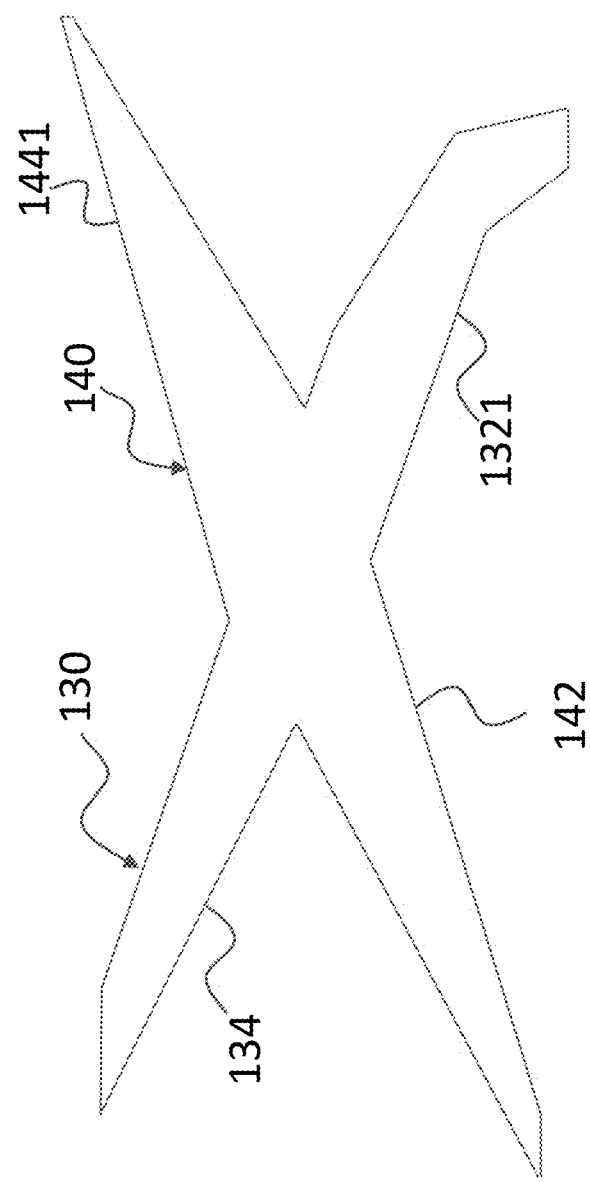

It is also noted that while the embodiments for the most part disclose legs that have non-compound directional extensions (as opposed to the base 144, which has a compound directional extension (2 directions of extensions are seen in FIG. 22), in other embodiments, the legs can indeed have compound directional extensions. This could be, for example, the case with respect to the lower legs of the X, where the structure could extend, for example, directly downward at a location at a midpoint between the center of the X and the tips of the leg, instead of extending directly outward as seen in the figures. For example, as seen in FIG. 24 (side view, with the front on the left), leg 1321 has such compound directions of extension. Conversely, as seen in FIG. 24, base 1441 has a direction of extension that is parallel, nay, on the exact same plane (the plane in and out of the figure) as that of the legs of the Y. The point is, any arrangement that can enable the teachings detailed herein can be utilized in at least some exemplary embodiments.

It is to be understood that there is a distinguishing feature between the substructures of the X and Y bodies and components to which are attached, such as the skids or the landing gear or the nacelles (or the mounts that enable the nacelles to rotate), etc. Accordingly, in the embodiments described above where, for example, a skid pad 154 is attached to a leg 142, that does not represent a compound direction leg.

Thus, in an exemplary embodiment, the combined substructures are such that when viewed from a side perspective, the first sub-structure and the second sub-structure form a wide general "X" shape configuration. In some embodiments, such as that of FIG. 22, at least one leg of the "X" has a compound shape (the base of the "Y" body, but here we are describing the X shape that is established by the combination of the X and Y bodies).

In any event, as can be seen, exemplary embodiments include a first sub-structure that supports respective forward landing components on the legs of the "Y" (e.g., skid pads 154 or the wheel arrangement that includes wheels 155), and the second sub-structure supports respective back landing components on two of the legs of the "X" (e.g., skid pads 152, the wheel arrangement that includes wheels 153).

By supports, it is meant herein that at least 33 percent of the load associated there with (e.g., the maximum load experienced during an average landing) is directed through the structure at issue. In an exemplary embodiment, there can be other structure beyond the first and second substructures that provide some loadbearing features. In an exemplary embodiment, the portions of the first substructure and/or the second substructure at issue bear at least 50, 55, 60, 65, 70, 75, 80, 85, 90, 95, or 100% of the load associated there with.

Consistent with the embodiment of FIG. 3, for example, in an exemplary embodiment, the first sub-structure supports aircraft control components and/or aircraft stability components on the base of the "Y" (e.g., with reference to FIG. 1, stabilizing surface 162 (which also is supported by legs 132, rudders 364, and 366 etc.). Further in an exemplary embodiment, the second sub-structure supports respective aircraft power plants on two legs of the "X" opposite the legs supporting the back landing components. Again, it is noted that the phrase power plants encompasses both internal combustion engines, jet engines (including turboshaft), and electric motors. Any apparatus that is utilized to provide thrust, either directly or indirectly for the aircraft is encompassed within the phrase power plant.

In an exemplary embodiment, the entire aircraft is built around the combined X and Y bodies. In an exemplary embodiment, the combined X and Y bodies support 100% of the load when the aircraft is landed and/or when the aircraft is in flight (the wing can be attached to the X and/or Y body—in an exemplary embodiment, at least 30, 35, 40, 45, 50, 55, 60, 65, 70, 75, 80, 85, 90, 95 or 100% of all loads experienced by the wing or otherwise associated by the wing (e.g., the weight of the wing (and fuel if therein), the aerodynamic loading of the wing, etc.) is directly borne by the X or Y bodies or combined X and Y bodies. That said, in an alternate embodiment, the wing is attached to the fuselage, and the fuselage is directly attached to the combined X and Y bodies, but in this instance, the wing would not be directly attached the X and Y bodies. Note also, in an exemplary embodiment, the wing can be attached directly to the X and Y bodies and also directly attached to the fuselage. In an arrangement where the fuselage is directly attached to the X and Y bodies, a portion of the loading of the wing will be directly borne by the X and Y bodies and a portion of the loading of the wing will be indirectly borne by the X and Y bodies. In an exemplary embodiment, the aircraft can be configured such that with respect to static loads associated with the aircraft, when the aircraft is fully fueled and ready for takeoff but in an inoperative state, and unloaded (no cargo), at least 30, 35, 40, 45, 50, 55, 60, 65, 70, 75, 80, 85, 90, 95 or 100% of the static loads experienced by the wing or otherwise associated by the wing are directly borne by the X or Y bodies or combined X and Y bodies. In an exemplary embodiment, the aircraft can be configured such that with respect to loads experienced during steady level flight with the aircraft 80% fully fueled flying at 5000 feet above sea level without any tailwind or headwind or any crosswind whatsoever, at least 30, 35, 40, 45, 50, 55, 60, 65, 70, 75, 80, 85, 90, 95 or 100% of the static loads experienced by the wing or otherwise associated by the wing are directly borne by the X or Y bodies or combined X and Y bodies vis-à-vis the remainder of the aircraft.

Further, in an exemplary embodiment, the first sub-structure supports aircraft control components and/or aircraft stability components on the base of the "Y" and the second sub-structure supports respective aircraft power plants and respective rotors on two legs of the "X" such that bottommost sweeps of respective rotors are at least D1 feet above a hypothetical perfectly flat landing surface when the assembly is supported on the landing surface without any lift being generated by the aircraft in a standard landed aircraft status. By way of example only and not by way of limitation, the hypothetical perfectly flat landing surface would be a flat area extending from the geometric center of the aircraft outward in all directions beyond the landing skid pads 154 and 152 and at least to the outermost profiles of the rotors 112 when spinning such that the tips of the blades approached the closest to that flat surface (which might be when the nacelles 110 are negatively oriented, for whatever reason, providing that that does not result in lift being generated by the aircraft). With respect to the qualification of no lift, the idea is that the aircraft, or more specifically, the rotors, is/are about as low as it is/they are likely to be. With respect to the qualification of a standard landed aircraft status, this would be a status of the aircraft that would be normal for landing under normal conditions (average conditions). Put another way, this would be the state in which the aircraft is in when landing without doing anything fancy or without any extreme conditions, or even slightly adverse conditions (e.g., a landing with zero cross-wind).

Figure 25:
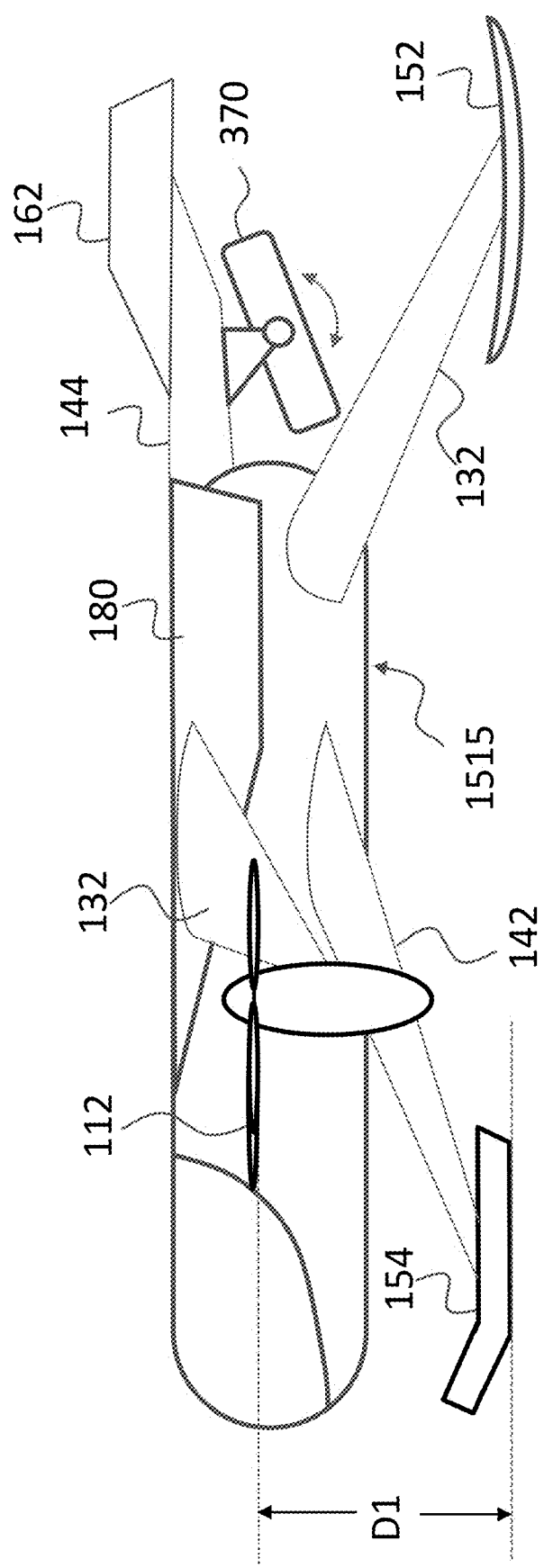

With reference to FIG. 20, D1 can be 4, 4.5, 5, 5.5, 6, 6.5, 7, 7.5, 8, 8.5, 9, 9.5, 10, 10.5, 11, 11.5, 12, 12.5, 13, 13.5, 14, 14.5, or 15, or any value or range of values therebetween in 0.1 increments. The idea here is that the aircraft can spin its rotors, and, in some instances, the chances of a person being struck accidentally by the rotors owing to the distance D1 can be minimized if not completely reduced. With reference to FIG. 25, it can be seen that the aircraft is in a configuration where the rotors are tilted directly upward, which would be typical for landing. In this embodiment, which is different than the embodiment of FIG. 20, the X body has "upper legs" (which may be more accurately described as "forward" legs") that extend downward at a negative angle relative to those charted out in the embodiment of FIG. 22. In this regard, angle A7 is negative, concomitant with an exemplary embodiment detailed above. Still, the value for D1 can be any of those detailed above. In this regard, it is envisioned that in at least some exemplary embodiments, the rotor will not be tilted to the horizontal when the aircraft in the aforementioned landing regime. Accordingly, in an exemplary embodiment, aircraft can be configured such that at full landing, no exposed rotor component is less than D1 feet in the vertical direction from the lowest part of the aircraft. It is noted that in the embodiments that utilize a ducted fan, such does not constitute an exposed rotor component.

Consistent with the embodiment of FIG. 13, when viewed from a side perspective, the first sub-structure and the second sub-structure form a wide general "X" shape configuration. That, of course, does not mean that the first substructure is an X shaped body. This reference just described is when viewed from the side. Conversely, when viewed from above, the first substructure and the second substructure would form an X shape with an appendage between the two legs of the X in between the two legs.

Consistent with the teachings detailed herein, in an exemplary embodiment, the assembly includes an aircraft fuselage, where the aircraft fuselage is supported by the first substructure and the second substructure when the aircraft is in a landed state. In an exemplary embodiment, the entire weight of the aircraft fuselage is borne by the two substructures. In an exemplary embodiment at least 50, 60, 70, 75, 80, 85, 90, 95, or 100% of the entire weight of the aircraft fuselage is borne by the two substructures.

Thus, as can be seen in some embodiments, the fuselage is located at least proximate the cross point of the extensions of the "X."

In an embodiment where there is a fuselage, the first sub-structure and the second sub-structure collectively and entirely support the aircraft fuselage when in the landed configuration, and the first sub-structure and the second sub-structure collectively provide a frame-like safety assembly that protects the aircraft fuselage.

Figure 26:
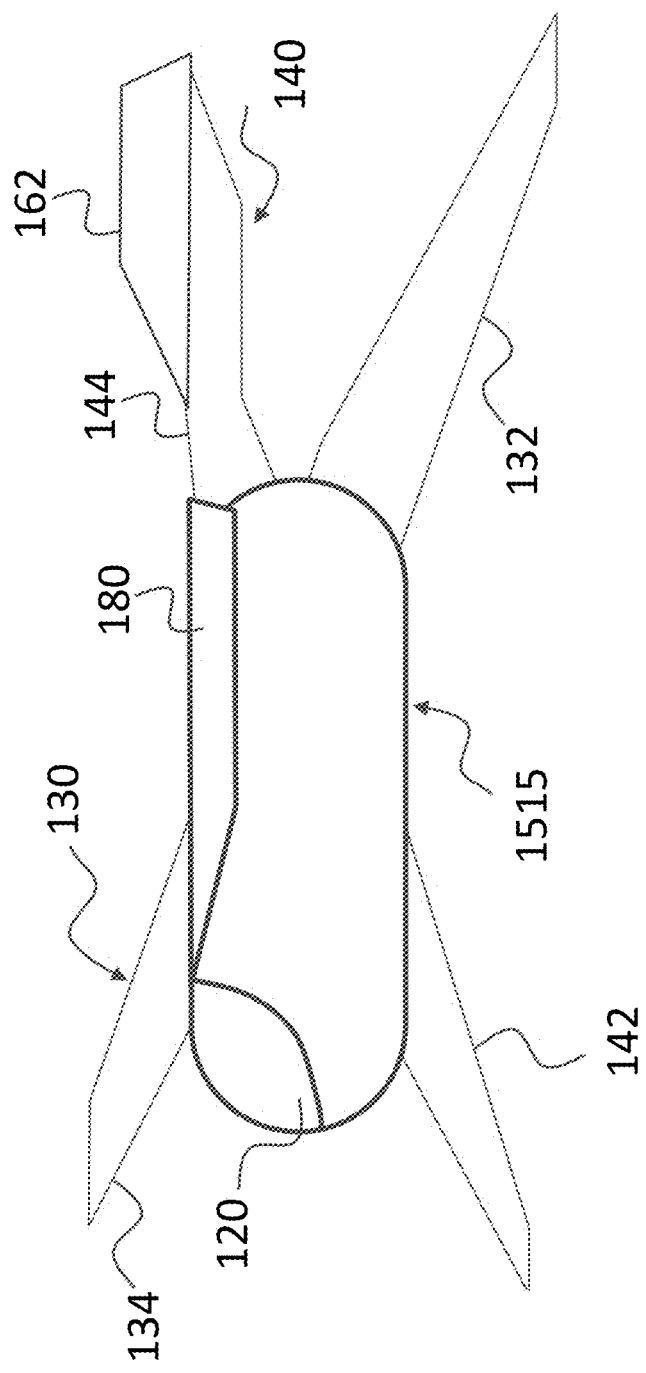

FIG. 26 presents an exemplary embodiment where the sub-structures extend out past the front of the cockpit 120.

Figure 27:
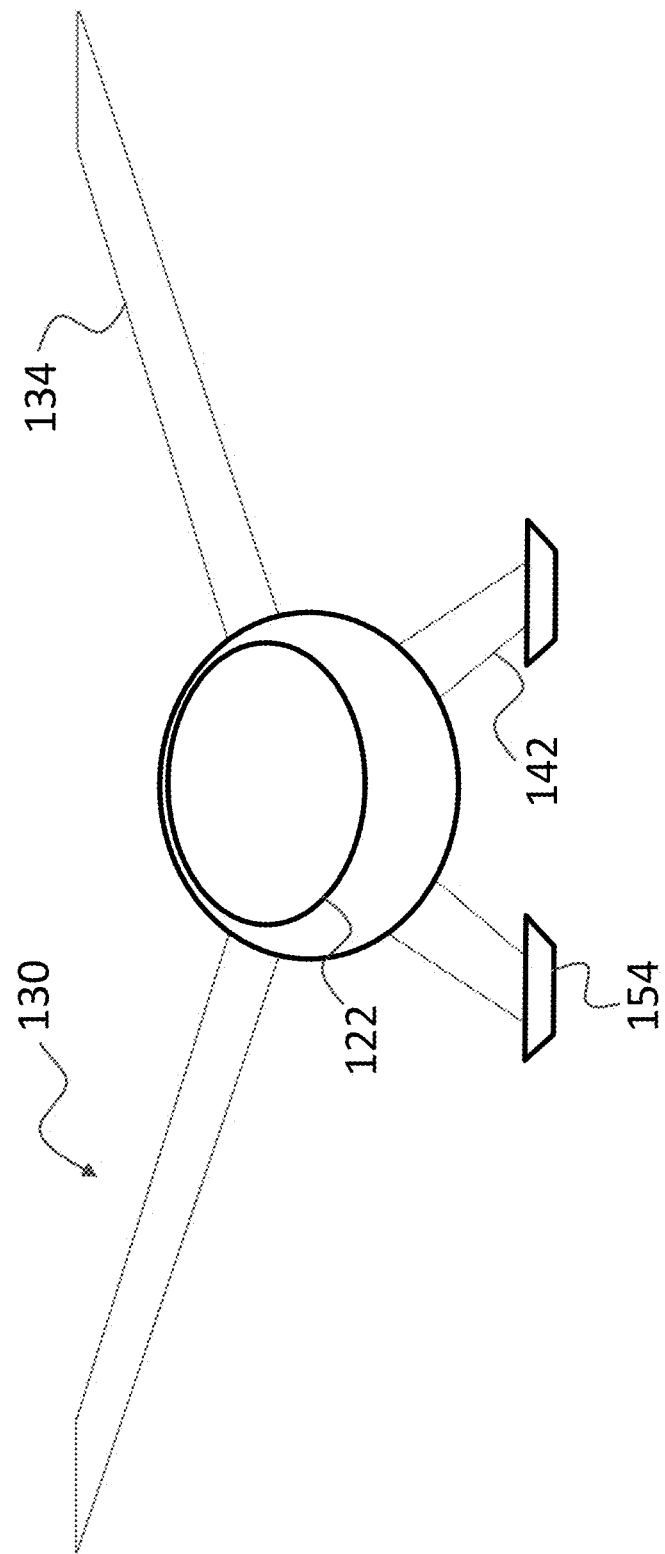

In an exemplary embodiment, legs 134 and 142 extend past the front end of the cockpit 120. The legs can also extend outwards past the sides of the cockpit, as seen in FIG. 27. Accordingly, there is substructure outboard of all portions of the cockpit with respect to a four quadrant frame of reference in FIG. 27, and there is substructure above and below the cockpit when viewed from the side in FIG. 27.

Figure 28:
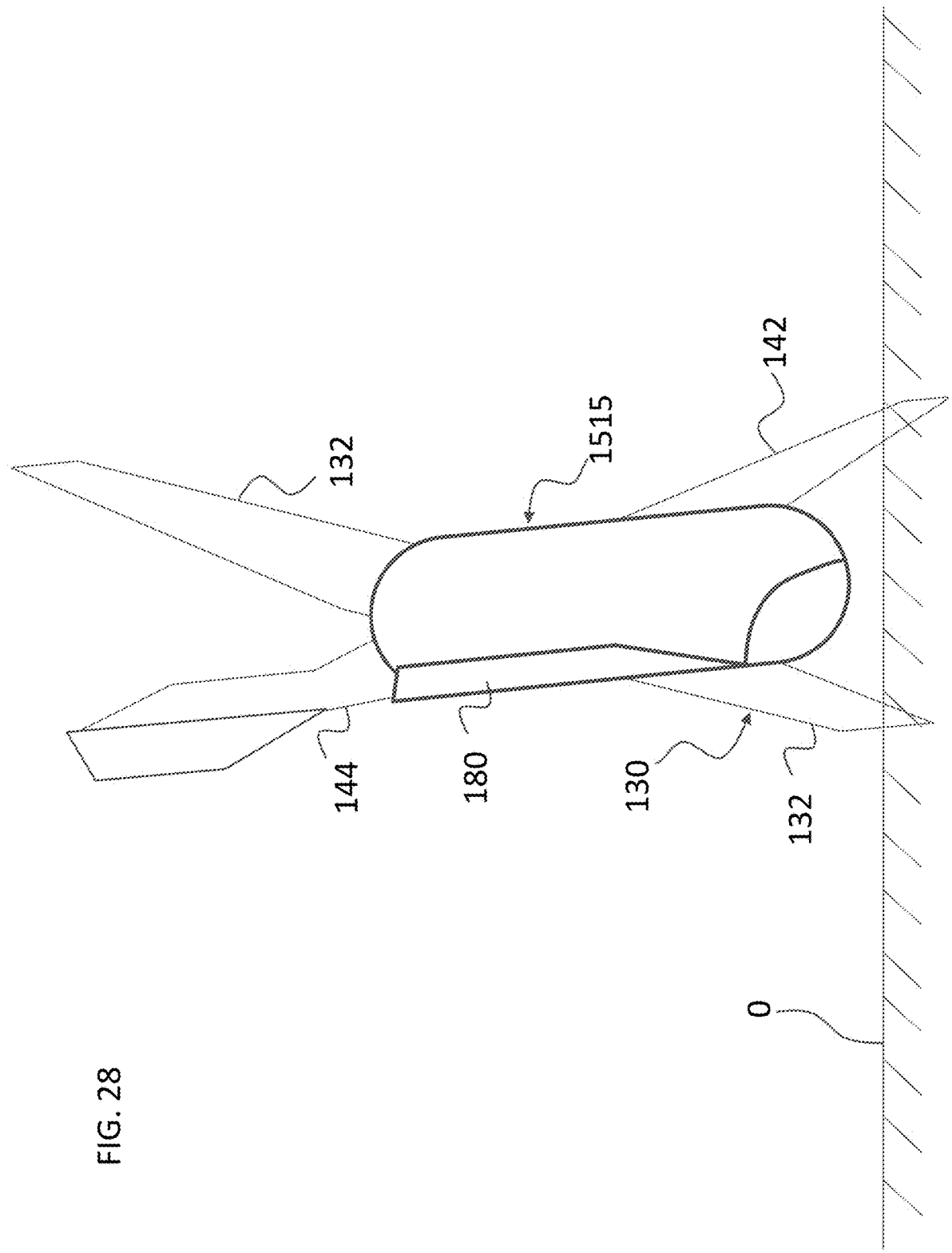
FIG. 28 presents an exemplary bad day scenario

In an exemplary embodiment, where the first and second substructures collectively provide a frame-like safety assembly that protects the aircraft cockpit 120, such can have utilitarian value with respect to a bad day scenario where the aircraft experiences a hard landing that results in an orientation of the aircraft being different than that of a normal landing, such as depicted in FIG. 28 (in practice, a "crash" is defined as an event where a portion of the fuselage contacts the ground—thus, technically speaking, this is not a crash), where reference 0 is ground. As can be seen, the substructures will embed into the ground a certain amount and/or collapse or otherwise become deformed a certain amount, but in this scenario, the substructures protect the cockpit from contact with the ground. That said, in an alternate embodiment, the landing can be such that the cockpit does contact the ground, but the substructures absorb sufficient amounts of energy prior to the contact, that such results in a significant increase in survivability vis-à-vis the occupants in the cockpit.

In at least some exemplary embodiments, the utilization of the substructures disclosed herein and/or variations thereof can have utilitarian value with respect to providing a direct path of support between the more massive components of the aircraft, such as for example, the power plants, and ground, when in a landed configuration. This as opposed to, for example, the V 22 Osprey, where the wings support the power plants, or even a conventional helicopter, where the fuselage or airframe supports the power plants, and the landing structure is attached to the fuselage/supports the fuselage. Thus, in view of the above, it can be seen that in some embodiments, there is an assembly, comprising at least two separate power plants spaced apart from one another on opposite sides of the assembly. The assembly also includes an aircraft structure including a first sub-structure, wherein the first sub-structure is a distinct structure that supports the at least two power plants such that there is direct support by the first sub-structure between landing structure of the assembly and the two power plants when the aircraft is in a landed configuration. Such an exemplary embodiment can be seen in the embodiment of FIG. 17, for example, where skid 152 is a landing structure (in other embodiments, the wheeled apparatus of FIG. 3 can be the landing structure).

In at least some embodiments of the assembly detailed herein, the assembly further includes an aircraft fuselage, wherein the first sub-structure also at least partially directly supports the aircraft fuselage when the aircraft is in the landed configuration. Consistent with the teachings detailed herein, in at least some exemplary embodiments, the assembly can also include a second sub-structure, wherein the first sub-structure and the second sub-structure collectively and entirely support the aircraft fuselage when in the landed configuration.

Corollary to this is that in at least some embodiments that include the second sub-structure, the first sub-structure and the second sub-structure collectively and entirely support the power plants when in the landed configuration. Here, the legs of the Y body can be linked to the X body (they can be part of the overall body, as noted above). Thus, the weight of the power plants will be supported by the legs of the X and Y bodies, with a portion of the weight being supported by the legs of the Y body. In some embodiments, there can also be direct support by the second substructure between landing gear structure (here, the forward skid pad 154, for example) and the two power plants when the aircraft is in a landed configuration. Conversely, in other embodiments, such as, where, the substructures are separated from one another, and are linked together by, for example, the aircraft fuselage, the Y body would not be providing direct support between the landing gear structure and the two power plants. There would be indirect support, but not direct support.

In an exemplary embodiment, there can also be an aircraft tail apparatus, wherein the first sub-structure also supports the aircraft tail apparatus. In embodiments where the aircraft tail apparatus is an extension of the fuselage, such would be the case where the first and second sub-structures collectively and entirely support the aircraft fuselage when in the landing configuration. Also, in embodiments where there is an aircraft tail apparatus, the first sub-structure can interface with the tail apparatus and the tail apparatus can be an extension of the fuselage.

In some embodiments, the assembly includes an aircraft fuselage and there is the first and second sub-structures, the first sub-structure and the second sub-structure collectively and entirely support the aircraft fuselage when in the landed configuration, and the first sub-structure and the second sub-structure collectively provide a frame-like safety assembly that protects the aircraft fuselage. In some embodiments, the assembly includes an aircraft cockpit and there is the first and second sub-structures, the first sub-structure and the second sub-structure collectively and entirely support the aircraft fuselage when in the landed configuration, and the first sub-structure and the second sub-structure collectively provide a frame-like safety assembly that protects the aircraft cockpit. In this regard, the frame-like safety assembly is configured to absorb a substantial amount of the energy upon a very hard landing and/or a crash situation. In this regard, in an exemplary embodiment, the first and second substructures are configured to deform or otherwise deflect, elastically and/or plastically, to absorb the kinetic energy associated with a hard landing, or otherwise dissipate the kinetic energy of the aircraft over a longer period of time relative to that which would be the case in the absence of the presence of the substructure. In this regard, it is the rate of deceleration that causes the damage in most instances. By placing a frame like safety assembly about certain structural components of the aircraft, a deforming frame and/or collapsing frame will reduce the rate of deceleration relative to that which would be the case in the absence of such, all other things being equal. In some embodiments, this prevents direct contact between the ground and the cockpit, in some situations, all in other embodiments, where there is direct contact, the direct contact occurs at a lower velocity relative to that which would be the case in the absence of the safety frame.

It is also noted that in at least some exemplary embodiments, the safety frame provides an arrangement that results in a tumbling or rolling effect of the aircraft, where the tips of the frame establish somewhat of a wheel like or ball like body in this regard. That is, in an exemplary embodiment, a box will "roll" (dice roll). By relying upon a rolling "crash" where vital portions or otherwise sensitive portions of the aircraft structure are maintained within the extrapolated circumference of the rolling body, a safety factor can be achieved relative to that which would otherwise be the case. By rough analogy, the effect of the frame, with the deflection and/or rolling, can be akin to a parachute landing fall executed by a paratrooper.

Embodiments can be such that the assembly is configured to move respective power plants of the at least two separate power plants away from the aircraft fuselage in the event of a hard landing event (which includes a crash landing event, or, more accurately, would also move in the event of a crash landing event, as the forces would be at least as great as the hard landing event). That said, in embodiments, this feature is implemented only in a scenario where there is a crash landing, as there can be some situations where this feature is not desirable in the event of a hard landing, as a hard landing does not necessarily implicate a significant safety issue to the occupants of the aircraft. It is briefly noted that herein, any reference to a hard landing corresponds to a disclosure of an alternate embodiment where there is a crash landing, and vice versa. In this regard, the power plants are typically the heaviest part of the aircraft, or, more accurately, the densest bodies of significance in the aircraft. In a sudden deceleration of the aircraft, these bodies will resist deceleration by tearing through/away from the structure supporting these bodies. This could result in the bodies striking a human, or otherwise causing damage to structures that otherwise would protect human occupants. In an exemplary embodiment, the X body is configured to scissor upon experiencing certain forces in certain directions (such as those resulting from a crash are hard landing) such that the ends of the top legs move away from one another, and thus move the respective power plants away from the fuselage and cockpit. By way of example only and not by way of limitation, the Y body can be configured to function as a wedge to spread the top legs of the X body away from each other in the event of, for example, a hard landing where the front landing structure impacts the ground. In this regard, the legs of the Y could be inside, or could be arranged such that they would move inside, the legs of the X, in the event of a hard landing or crash. The legs of the Y would wedge the legs of the X outward, and thus push the power plants away from the fuselage and away from the cockpit.

In an exemplary embodiment, there are least two aircraft power plants, each separated by at least 5, 10, 15, 20, 25, 30, 35 or 40 feet or more or any value or range of values therebetween in 1 inch increments, and a frame that supports the aircraft fuselage and the aircraft power plants when the assembly is in a landed state, wherein the frame establishes a safety structure that protects the aircraft fuselage when in a hard landing and/or crash landing scenario. It is also noted that the aforementioned values can be the distance that the thrust vectors are separated from for each of the tiltrotors.

In an alternative embodiment, the legs of the X can be hinged, or can be supported with frangible components, which, upon a sufficient force, will cause the tips of the legs or outboard portions of the legs to be moved away from the fuselage by the force of a crash landing or a hard landing. In some embodiments, the legs can be pretensioned, and held into the normal position with a frangible component or the like. In an exemplary embodiment, an actuator or the like can be utilized to push the legs apart. In an exemplary embodiment, a gas generator or the like, such as is utilized to pretension a seatbelt in an automobile in the event of a crash, can be utilized to generate a force that will push the legs apart from one another. Any arrangement that can cause the legs to be moved away from the fuselage can be utilized in at least some exemplary embodiments.

In view of the above, at least some exemplary embodiments include an assembly that includes a first sub-structure that is in the form of an "X" that supports respective power plants at respective top ends of the "X," wherein the assembly is configured such that the extensions of the "X" move in a pivot like manner relative to one another in the event of the hard landing event, thereby moving the respective power plants away from the fuselage.

Figure 29:
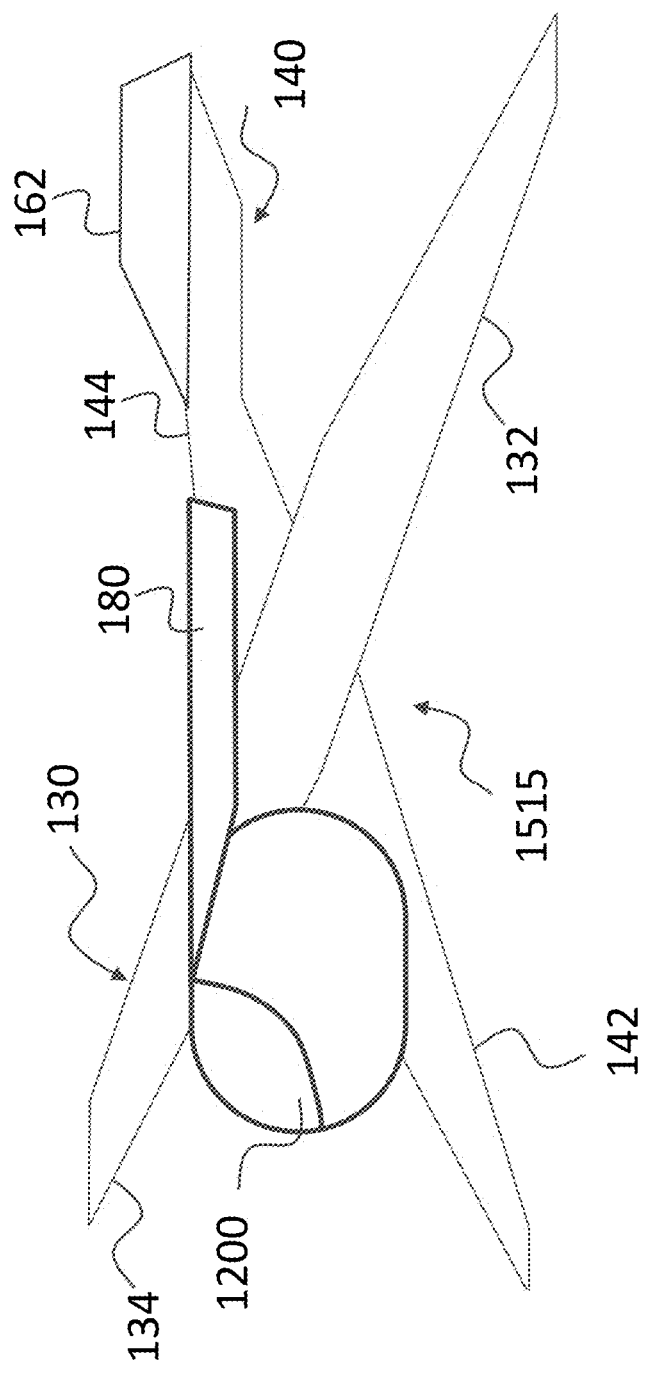

In some embodiments, the aircraft is configured such that the cockpit will detach from the rest of the aircraft in the event of a hard landing or a crash event. In an exemplary embodiment, FIG. 29 depicts an exemplary cockpit 1200, which has a race track shaped profile, but could be a circular or oval shaped profile. The shapes are chosen because they will be less resistant to rolling than other shapes, where in an exemplary embodiment, the aircraft is configured to impart a moment on the cockpit 1200 at detachment and/or the aircraft is configured such that a trajectory the results at the time of detachment will result in a ground impact of the cockpit 1200 that will result in a tumbling of the cockpit 1200. In an exemplary embodiment, the rolling or tumbling is akin to the utilitarian value of the paratrooper roll detailed above.

Figure 30:
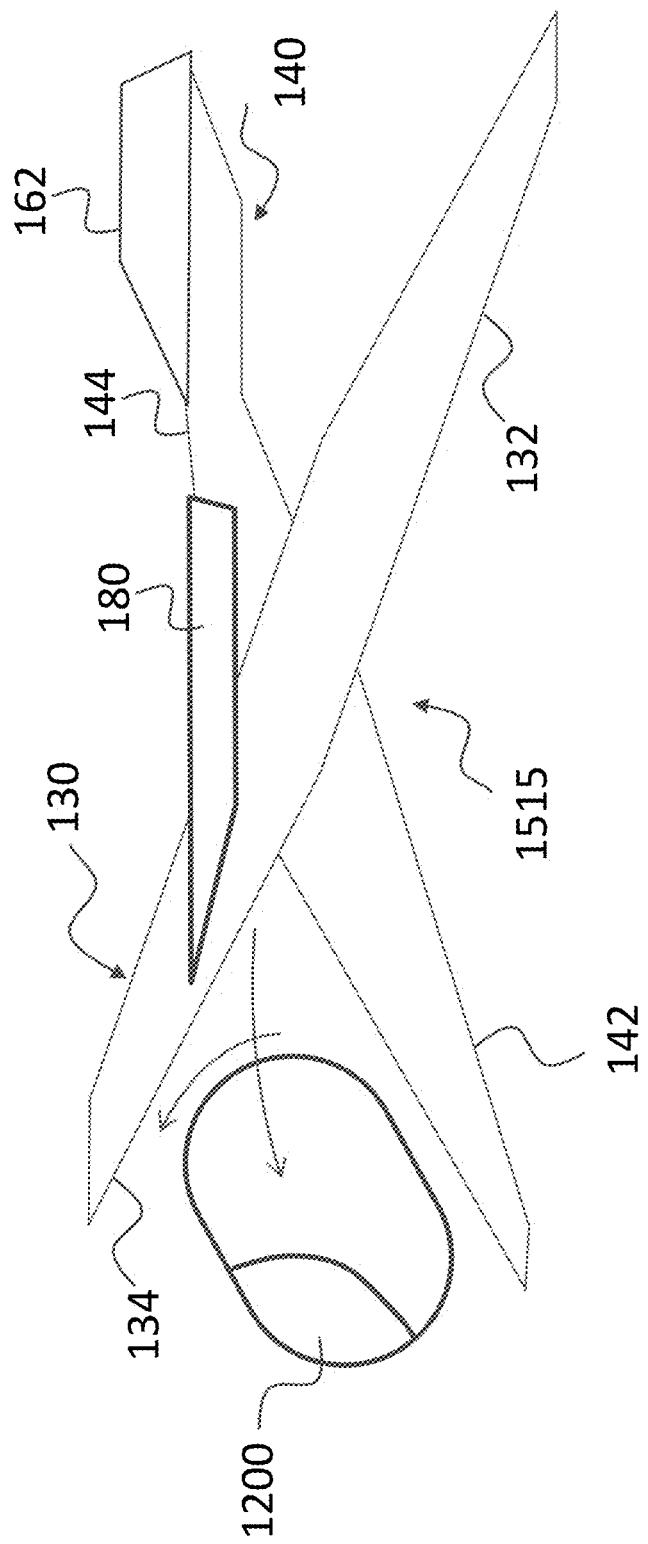

FIG. 30 depicts an exemplary scenario of the cockpit 1200 just after detachment, with the arrows indicating direction of movement and direction of rotation of the cockpit 1200.

In an exemplary embodiment, one or both of the sub-substructure(s) can have utilitarian value in enabling the detachment and/or rolling and/or enabling utilitarian value of having the cockpit detach. In an exemplary embodiment, the connection between the cockpit 1200 and one or both of the substructures can be such that an upper portion of the connection is weaker than a bottom portion of the connection, or the upper portion of the connection will release before the bottom portion will release. Accordingly, in an exemplary embodiment, where there is a sudden deceleration in the forward direction, after the top or upper connection is released or otherwise fails, there will be a brief period of time where the bottom connection remains in place this will impart a moment onto the cockpit 1200, and upon the bottom connection failing or otherwise being released, will result in the cockpit 1200 rolling in the direction of the arrow (counterclockwise). In an exemplary embodiment, instead of or in addition to these different connections, an actuator or the like can be utilized to impart the moment/spin, onto the cockpit 1200 during release.

The above said, in some embodiments, there is no impartation of a moment at the time of release. Whether or not the cockpit roles as a matter of how the cockpit impacts on the ground.

Still, it is to be understood that the substructures detailed herein can provide unique support for the cockpit 1200 that can enable the ease of detachment of the cockpit 1200 relative to that which would be the case in a scenario where the cockpit was part of a fuselage or otherwise part of a structure that was integral to the overall structure of the aircraft. This is compared to the embodiments herein that utilize the substructures to support the power plants and to establish the structure that is in direct communication with the landing structure, etc. in this regard, the fuselage 1200 can be mounted in a manner not entirely different than how an engine is mounted on a commercial aircraft. A point system can be utilized (e.g., in a commercial aircraft, the entire engine might be supported by, for example, four bolts). This as contrasted to, for example, an integrated structure where the load is spread out over a larger area (e.g., via several hundred of rivets, etc.). Thus, embodiments utilize a point system to connect the cockpit to one or more of the substructures.

It is noted that in some embodiments, the cockpit is only connected to one of the substructures. By way of example only and not by way of limitation, in an exemplary embodiment, the cockpit 1200 can be nestled between the legs of the Y body. Alternatively, in an exemplary embodiment, the cockpit 1200 can be nestled between the legs of the X body. The cockpit could be between these bodies, but supported only by one of the substructures and not the other. Still, in some embodiments, both substructures support the cockpit.

Thus, in an exemplary embodiment, there is a rotary wing aircraft including a cockpit, wherein the cockpit is breakawayable from the remainder of the assembly of which the rotary ring aircraft is a part. It is noted that the rotary ring aircraft can include a fuselage that has components beyond the cockpit, and in an exemplary embodiment, the cockpit can be breakaway above from the remainder of the fuselage. Still, in other embodiments, the cockpit may be a separate and distinct component, as disclosed above.

In an exemplary embodiment, the cockpit establishes a roll body that protects a pilot therein. Briefly, the outer "shell" of the cockpit 1200 need not be a very rigid structure. By analogy, while this is wonderfully a very rare occurrence as we approach the third decade of the $21^{st}$ Century, a beer can thrown from a car window traveling at speed will offer some protection—quite a lot relatively speaking—to sub-stances therein relative to that which would otherwise be the case. In this regard, the shell can crumple and otherwise deform substantially while still providing a level of protection to the occupants therein, at least providing that the cockpit can tumble or roll. By alternate analogy, a beer can will crumble and collapse to almost nothing if a force is directly applied thereto. To use another analogy, the White House Easter egg roll works because the shell of the Easter eggs, while typically becoming cracked, was still held together by the interior membrane. The structure of the cockpit can work in a similar analogous manner in some embodiments. The point is that in at least some embodiments, by enabling the rolling/tumbling feature of the cockpit, a level of safety is afforded to those inside the cockpit relative to that which would otherwise be the case.

It is briefly noted that a more streamlined arrangement can be utilized in some embodiments—a tear drop shaped cockpit could be utilized—in an exemplary embodiment, the tear portion of the drop could break off so as to facilitate rolling, but during normal use, the tear portion would provide reduce drag. Accordingly, embodiments include a cockpit with components that would be jettisoned or otherwise be destroyed during an event that would result in the cockpit coming detached from the rest of the aircraft. That said, in an exemplary embodiment, the aerodynamic portions could remain with the rest of the aircraft as the cockpit is detached. A tether system could be used to "yank" the aerodynamic portions from the structure of the cockpit proper when the cockpit 1200 reaches a certain distance from the rest of the aircraft. The idea being that the shape after the aerodynamic structure is detached from the rest of the cockpit is a shape that is conducive to rolling/tumbling.

While the embodiments depicted herein have focused on a curved body with respect to the cockpit, this is because it is recognized that at least of certain shapes roll better than one that is established by flat surfaces (see, for example, the wheel). This is not to say that the cockpit must have a curved body. Again, dice are known to roll. Any shape that can enable the teachings detailed herein can be utilized in at least some exemplary embodiments.

By way of example only and not by way of limitation, the pilot can be housed within a roll cage that is located within the skin of the pill shaped or oval shaped or spherical shaped or box shaped cockpit. That said, as seen in FIG. 3, the roll cage 3937 is located on the outside of the skin. In an exemplary embodiment, this can be blended with the outer surface of the skin of the cockpit to provide a more aerodynamic arrangement. That said, in an exemplary embodiment, the roll cage can be spaced away from the surface of the skin of the cockpit. In a nifty exemplary embodiment, the canopy can slide under the roll cage to open the cockpit.

In an exemplary embodiment, aluminum or steel or composite beams can be connected to one another to create a cage about the occupant(s) in the cockpit. Irrespective of the structural strength of the outer shell of the cockpit, this cage can protect the occupants in the cockpit, such as, for example, in a manner analogous to a roll bar in a Jeep™ with a canvas top—the top provides little to no protection, but the roll bar provides a lot of protection. The cage need not necessarily surround the occupants. Again, referring to the analogous feature of the roll bar, in an exemplary embodiment, the bar can be integrated with the other structure of the cockpit, so that the roll bar protects at the locations that are most likely to experience a deleterious scenario. For example, the area above and/or to the sides of the occupants of the cockpit would be an area that would warrant positioning of a roll bar structure, whereas the area beneath the occupants would not warrant such that at least some embodiments. Accordingly, a cage can be established utilizing some of the structure of the cockpit irrespective of the presence of a roll bar or the like combined with the roll bar(s).

Figure 31:
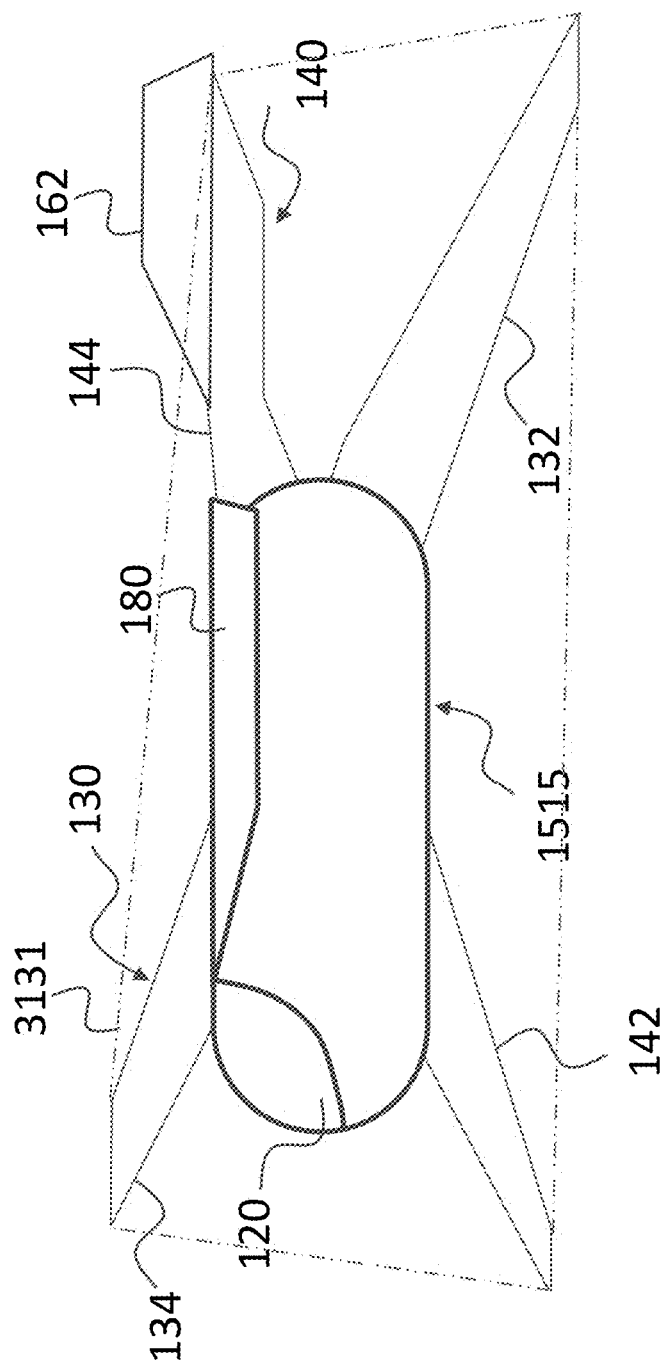

Still, it is noted that irrespective of the detachable nature of the cockpit, the substructures according to the teachings detailed herein provide protection to components inside portions of the aircraft inside the extrapolated outer profile, which again, is somewhat like a die. FIG. 31 depicts the exemplary extrapolated outer profile 3131. As can be seen, there is a shoebox like outer profile. The length of the outer profile can be shortened by bringing in the legs 132/shortening the legs. This will result in an outer profile that is more like a side profile of a die—bringing it closer to a square from the rectangular shape seen. In this regard, the base one for can also be shortened. It is also noted that in an exemplary embodiment, frangible or detachable components can be attached to the substructures that will provide a larger footprint for landing or the like and provide more structural support for the stabilization surfaces and the control surfaces, for example, but in the event of a hard landing or crash, these components will break off and change the outer profile to something closer to a box as opposed to a rectangle, thus enhancing the likelihood that the overall aircraft will roll/tumble. Indeed, actuators of the like can be utilized to decouple portions of the substructure depending on the scenario. In some embodiments, there is utilitarian value with respect to having a rigid and robust set of legs 132 (such as in a nose up hard landing—more on this below), but after the initial contact and the likely tumbling of the aircraft nose over tale, there can be utilitarian value to shortening or otherwise bringing in the rear outer profile so that the aircraft will roll more like a die.

In practice, there can be utilitarian value with respect to bringing in the legs 132 closer to the center of gravity/closer to the center of the aircraft, and then utilizing extended landing skids for any extra reach that might be needed. Conversely, a frangible base structure 144 could be utilized, as in the event of a hard landing or crash scenario, it is unlikely that that structure will experience the initial impact with the ground, and the utility for that base structure will be in the rolling/tumbling scenario.

In an exemplary embodiment, the cockpit is configured to provide a structural cocoon to a pilot therein after breakaway.

In an exemplary embodiment, the cockpit is configured to float for at least HH minutes after breakaway on a calm body of water, where HH is 0.5, 0.6, 0.7, 0.8, 0.9, 1, 1.1, 1.2, 1.3, 1.4, 1.5, 1.6, 1.7, 1.8, 1.9, 2, 2.25, 2.5, 2.75, 3, 3.5, 4, 4.5, 5, 5.5, 6, 7, 8, 9, or 10, or more, or any value or range of values therebetween in 0.05 increments. In an exemplary embodiment, this can be achieved without deployment of flotation devices that are dealt to the overall structure of the cockpit. For example, the cockpit 1200 could have a structure that floats providing it is structurally sound (and note that the above qualification is based on a product as you find it, not the hypothetical damaged product). In an exemplary embodiment, all seams or openings or the like could be located at a level above a level which would be at the water line in a normally loaded cockpit. For example, the hatch or the door could be located above this line, air inlets can be located above this line, etc. Alternatively, and/or in addition to this, any openings can be sufficiently sealed so as to provide the aforementioned flotation requirements. Also, in an exemplary embodiment, any openings can be automatically closed in the event of a water landing or the like.

The above said, in an exemplary embodiment, the above flotation scenarios can be achieved via an inflatable flotation device, such as an inflatable bladder that extends about the periphery of the cockpit on both sides of the aircraft, which can be inflated by a gas generator or the like in an emergency. Still, in an exemplary embodiment, the flotation is achieved without any additional inflation devices—it is the detached cockpit plain and simple.

Figure 32:
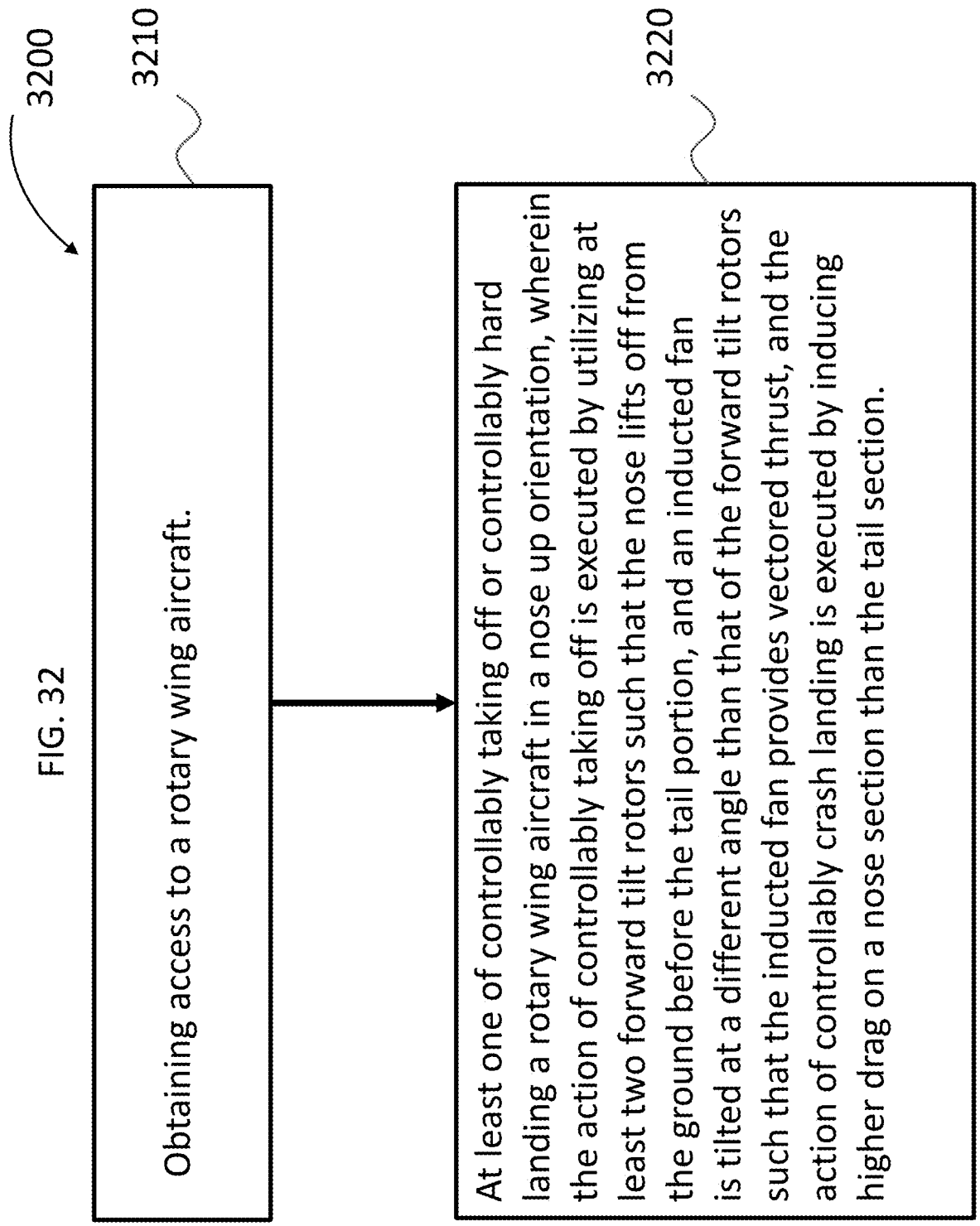
FIG. 32 presents an exemplary algorithm for an exemplary method.

In view of the above, it can be seen that the teachings herein enable various methods, one of which is represented by the flowchart of FIG. 32. In this regard, FIG. 32 represents an exemplary flowchart for an exemplary method, method 3200, which includes method action 3210, which includes obtaining access to a rotary wing aircraft. Method action 3210 further includes method action 3220, which includes the action of at least one of controllably taking off or controllably hard landing (which includes crash landing—herein, a hard landing always exists in a crash landing) a rotary wing aircraft in a nose up orientation. In this exemplary method action, the action of controllably taking off is executed by utilizing a least two forward tilt rotors such that the nose lifts off from the ground before the tail portion, and by tilting an ducted fan at a different angle than that of the forward tilt rotors such that the ducted fan provides vectored thrust.

In an exemplary embodiment, there can be an apparatus, such as an aircraft, comprising, an aircraft fuselage, which may comprise entirely of a cockpit and cargo/passenger compartment. The apparatus can have an aircraft wing, and at least two forward tilt rotors. In addition, there is at least one rear ducted fan. In an exemplary embodiment, an exhaust of the ducted fan is below respective centerlines of the forward tilt rotors when the respective forward tilt rotors are facing forward for maximum forward thrust (e.g., the configuration seen in FIG. 20). The exhaust is where the ducted air leaves the conduit thereof. In an exemplary embodiment, the distance between the centerline and the exhaust in the vertical direction, is 1, 2, 3, 4, 5, 6, 7, 8, 9 or 10 or more feet or any value or range of values therebetween in 1 inch increments. It is noted that depending on the direction of the ducted fan 370, this feature may or may not be present. As long as the ducted fan has an orientation where this feature can be met, such will be considered present aircraft.

Figure 53:
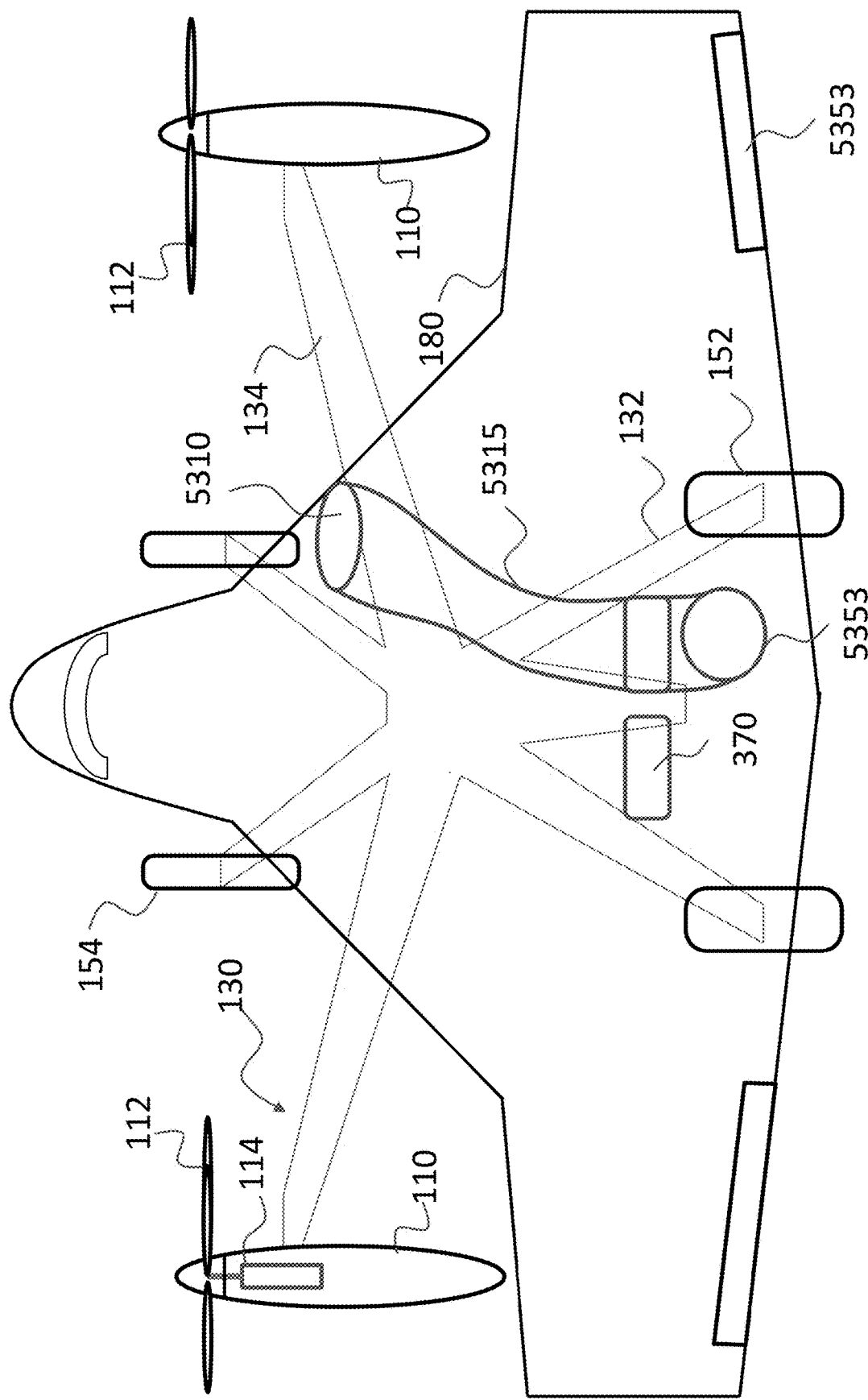
FIG. 53 present a top view of an exemplary vehicle according to an exemplary embodiment.

FIG. 53 presents a top view of an exemplary aircraft showing wing 180 to which ailerons 5353 are attached (in various views herein, the wing has not been depicted for purposes of clarity—it is noted that some embodiments include a winged aircraft while in other embodiments the aircraft is purely a rotary wing aircraft). Also seen in this figure is a dual ducted fan system. Here, there are two fans 370. In this exemplary embodiment, the fans are fixed, but it is the exhaust ports 5353 (only one shown for ink economy—in this exemplary embodiment, the exhaust port on the right would be duplicated for the fan on the left, along with the other components associated there with) that can be moved to direct the thrust from the inducted fan. In this exemplary embodiment, it can be seen that there are two forward ducted fan openings 5310 which are openings for the inducted fan ducts 5315 which lead to the ducted fans 370 and then to the exhaust ports 5353. In this exemplary embodiment, air is pulled into the ducted fan system via inlets 5370 and conducted via the ducting 53152 the fans, which then exhaust the air out outlets 5353, which can provide the lift and/or the thrust according to some exemplary embodiments.

It is noted that in an alternate embodiment, the duct system 5315 can instead and at the fans 370. In this regard, the fans could be tilted or the like to direct the thrust there from, and the nozzles/outlets 5353 could be eliminated in some embodiments.

Concomitant with the teachings detailed above, the exhaust of the ducted fan can be directed at a substantially different angle from the respective thrusts of the at least two tilt rotors.

Briefly it is noted that the at least two forward tilt rotors are configured to direct thrust in a downward direction such that the thrust vector is substantially in front of the center of gravity of the aircraft. In this regard, in an exemplary embodiment, during takeoff, the downward thrust that results from the one or more rear inducted fans will balance out the moments. Accordingly, in an exemplary embodiment, there can be utilitarian value with respect to placing the ducted fan(s) at greater distances from the center of gravity (in the longitudinal direction) than the distance that the tilt rotors are located in front of the center of gravity, so that the expanded moment arm can alleviate some embodiments where the amount of thrust produced by the ducted fan(s) is less than that which is produced by the combined tilt rotors.

In an exemplary embodiment, the tilt rotors and the ducted fan can be positioned such that the thrust vectors at the center of thrust generation (e.g., the plane of the rotors, the plane of the fan, or the average location between the planes of the fans (if 2 or more fans are used in a stacked arrangement) are 0, 1, 2, 3, 4, 5, 6, 12, 18, 24, 30, 36, 42, 48, 60, 72, 84, 96, 108, 120, 132, 144, 156, 168, 180, 192, 204 or more inches or any value or range of values therebetween in quarter-inch increments away from the center of gravity in the longitudinal direction, and of course, the values need not be the same for the tilt rotors in the ducted fan.

Figure 33:
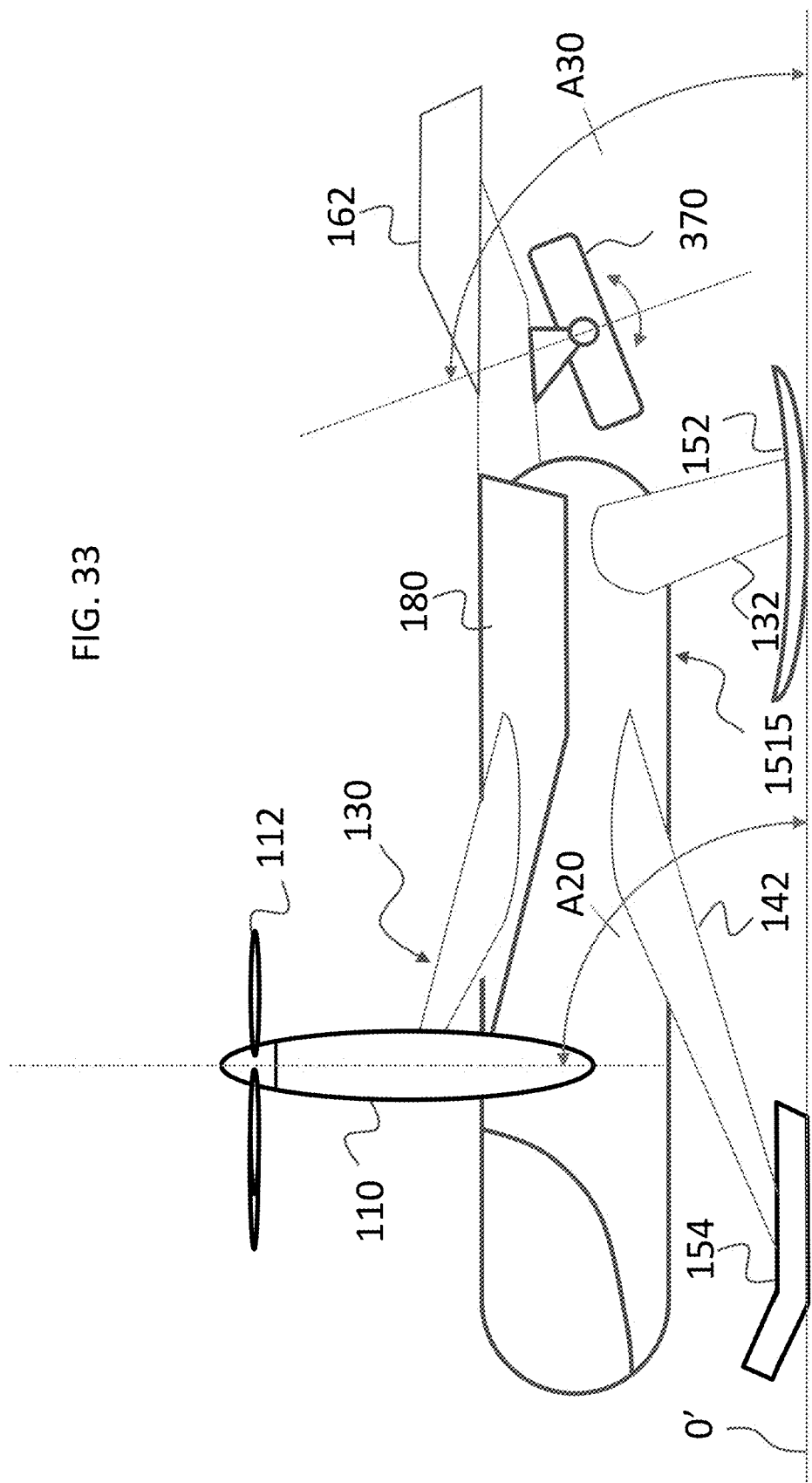
FIG. 33 presents details associated with an exemplary vehicle.

FIG. 33 presents an exemplary scenario of such a takeoff scenario. Here, the longitudinal axis of the thrust from prop rotor 112 relative to the extrapolated plane representative of ground 0' is 90 degrees (Angle A20). Thus, to practice an exemplary embodiment, angle A 30 must be different than 90 degrees.

Figure 34:
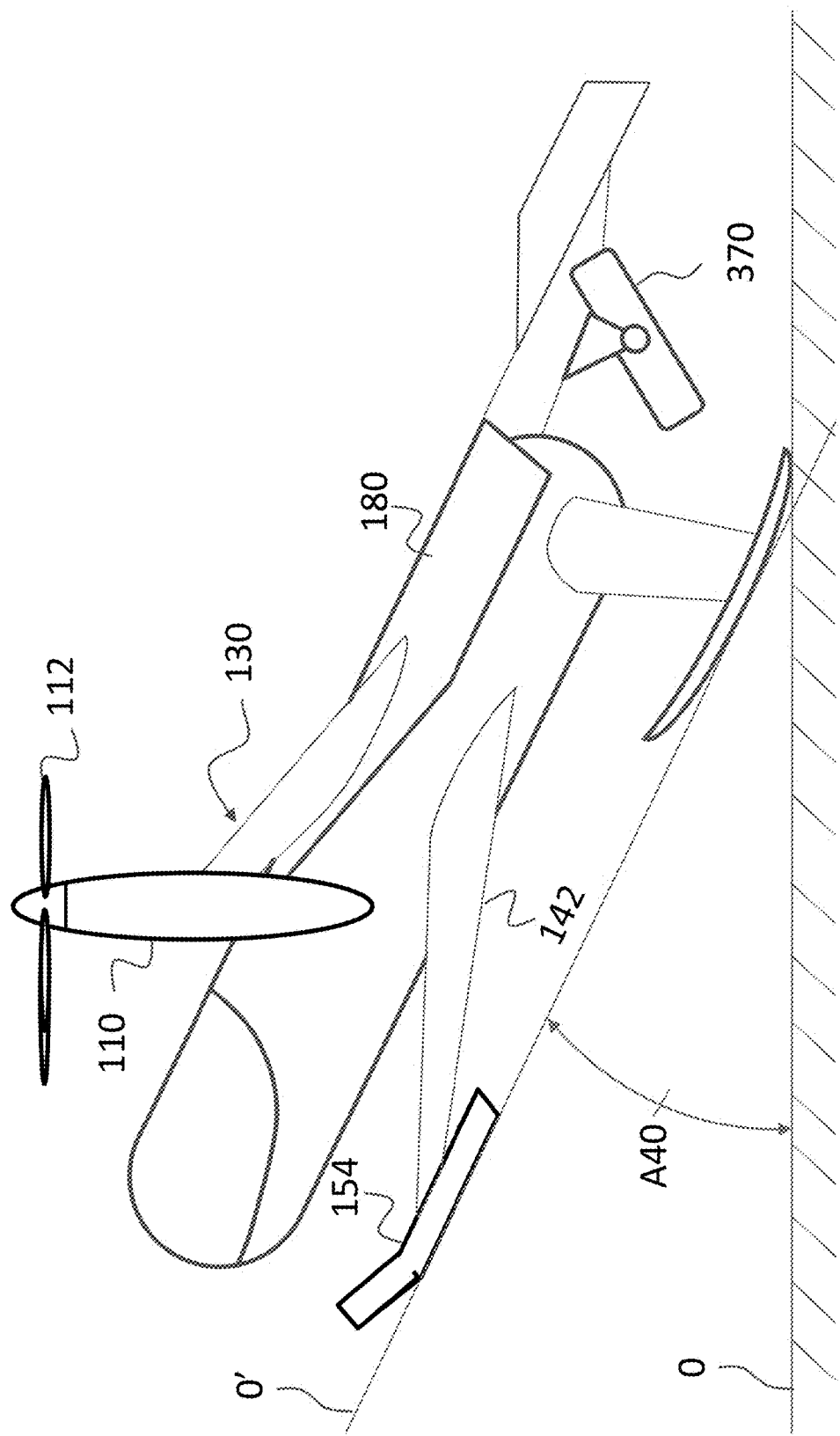
FIG. 34 presents an exemplary vehicle performing an exemplary takeoff, associated with details explaining this exemplary vehicle taking off.

It is briefly noted that the extrapolated plane representative of ground 0' is utilized instead of ground 0. This is because the aircraft will move relative to ground 0, and thus it is not a stable reference point. Conversely, the extrapolated plane that represents the ground can be theoretically represented by taking the landing structure as it is when the aircraft is fully on the ground and there is no lift being generated. As will be seen below, during takeoff, the ducted fan and/or the tiltrotor can tilt, and during the takeoff, the thrust there from will often be maintained at the same angle to the ground during the tilting process, and thus the angle A20, for example, will not change, if it is measured from ground 0. Conversely, if it is measured from the hypothetical plane, the angle will change. This will be seen below with respect to FIG. 34 compared to FIG. 33.

It is noted that angle A20 is not necessarily always 90°. In an exemplary embodiment, angles A20 and/or A30 can be any of 60, 65, 70, 75, 80, 85, 90, 95, 100, 105, 110, 115, 120, 125, 130, 135, 140, 145, 150, 155, or 160, or any value or range of values therebetween in 1° increments, providing that the angles are different and that the art enables takeoff under such conditions.

In an exemplary embodiment, where angle A20 is the base angle, angle A30 can be more than 30, 35, 40, 45, 50, 55, 60, 65, 70, 75, 80, 85, 90, 95, 100, 105, 120, 125, 130, 135, 140, 145, 150, 155, 160, 165, 170, 175, 180, 190, 200, 225, 250, 275, or 300 percent, or any value or range of values therebetween in 1% increments.

Accordingly, in an exemplary embodiment of method 3200, the thrust from the ducted fan is directed at an angle that is at least 5, 10, 15, 20, 25, 30, 35, 40, 45, 50, 55, 60 or 65 degrees or any value or range of values therebetween in 1 degree increments different from that of the forward tilt rotors such that the ducted fan provides vectored thrust. For frame of reference, a zero degree difference would be the tilt rotor facing forward and the ducted fan facing exactly backwards, as the thrust would be in the same direction.

It is also noted that in at least some exemplary embodiments, there are more than one ducted fans 370. In some embodiments, there are 2, 3, 4 or 5 or 6 or more ducted fans. By way of example only and not by way of limitation, the fans can be arrayed laterally in a set of 3 or 4 or more, and the sets can be arrayed longitudinally (e.g., a set of 2 and a set of 3 in back of the set of 2, or vice versa). In this exemplary embodiment, the average of the angles A30 (mean, median and/or mode) can be utilized to achieve the difference, while in other embodiments, none of the angles of the same. In this regard, it is noted that because there are two tilt rotors in at least some exemplary embodiments, the same can be the case vis-à-vis angle A20—the average can be utilized.

With respect to the ducted fan 370, any such ducted fan system can be utilized. In an exemplary embodiment, the ducted fan is akin to that utilized on the F-35. Also, while the embodiment depicted herein depicts the ducted fan being completely tiltable, in an alternate embodiment, the ducted fan can be fixed, and the outlet can be directed at different angles. Accordingly, in an exemplary embodiment, there is a variation of method 3200, where the thrust of the ducted fan is tilted at a different angle than the forward tilt rotors.

Accordingly, in an exemplary embodiment, there is a variation of method action 3220, wherein method action 3220 is executed such that the action of controllably taking off is executed by utilizing a least two forward tilt rotors such that the nose lifts off from the ground before the tail portion, and thrust from an ducted fan is directed at a different angle than that of the forward tilt rotors such that the ducted fan provides vectored thrust, whether that angle is due to movement of the ducted fan or by redirecting the thrust therefrom.

By vectored thrust it is meant that the thrust can be vectored. This as opposed to a fixed arrangement where the thrust cannot be vectored. The vectoring can be established by utilizing an outlet nozzle that moves in its entirety, or by utilizing flaps within a nozzle that directs the thrust in certain directions, or by tilting the ducted fan in its entirety.

FIG. 34 presents an exemplary takeoff scenario according to method 3200 here, it can be seen that the ducted fan 370 is at an angle that provides thrust as a component in the horizontal and a component in the vertical. This will provide lift at the tail, but also provide thrust. The scenario in FIG. 34 as depicted just at the moment right before takeoff. In this regard, it is to be understood that the tail rotor and the ducted fan, or more accurately, the thrust from the ducted fan, can change during a takeoff. In this regard, the thrusts can be vectored such that the angles A20 and A30 change during takeoff. It is noted that takeoff is defined as the moment no part of the aircraft is in contact with the ground. It is also noted that the method action 3220 need only be executed during a portion of the total takeoff scenario. In this regard, initially, angle A20 and A30 can be equal at the beginning of a takeoff procedure, but during the takeoff procedure, the angles will change. Upon such an occurrence, such meets the method 3220.

By way of example only and not by way of limitation, in an exemplary embodiment, the prop rotors 112 can provide lift to the forward sections of the aircraft while the ducted fan 370 provides lift to the rear portions of the aircraft, all directed exactly downward (A20 and A30 equal 90 degrees), but owing to the takeoff procedure, the lift at the front of the aircraft can be greater than the lift at the back of the aircraft, and thus the aircraft will tilt upward at the nose while the rear landing skid 152 (or other landing support apparatus) remains in contact with the ground. The tilt rotors can then be tilted forward to maintain the upward thrust at a maximum, as the longitudinal axis of the aircraft changes relative to the horizontal.

In an exemplary embodiment, the angle A40 can be 5, 10, 15, 20, 25, 30, 35, 40, 45, 50, 55 or 60 degrees or more or any value or range of values therebetween in 1 degree increments at the moment of lift off.

In an exemplary embodiment, the angle of the aircraft at takeoff can provide a significant angle of attack for the wing 180, which will create a very high lift situation, which will enable the wing, in some embodiments, to begin generating lift, or more accurately, begin generating significant amounts of lift, at a forward speed and/or within a shorter time from full takeoff relative to that which would be the case if the wing was in a more level position. In an exemplary embodiment, as the wing generates lift, the tilt rotor is tilted forward to increase the horizontal thrust vector, and such is also the case, although potentially in some embodiments, in a non-synchronized manner, with the ducted fan 370, or more accurately, the exhaust therefrom.

Any takeoff angle that can enable the teachings detailed herein can be utilized in at least some exemplary embodiments. It will be understood that some angles will represent optimized angles vis-à-vis achieving a given desired flight regime.

The ducted fan(s) are configured to provide both lift and forward thrust, in significant amounts.

In an exemplary embodiment, the ducted fan is configured to provide a lift component that is a maximum of a total thrust in a first use (e.g., a thrust vector analysis with two orthogonal vectors is such that the downward vector has 60% of the total thrust and the horizontal vector has 40%), such as can be the case during takeoff, and a forward thrust component that is a maximum of the total thrust in a second use (e.g. the opposite of the just detailed example), such as can be the case in forward flight. In an exemplary embodiment, the percentages of thrust for the vectors can be just over 50, 55, 60, 65, 70, 75, 80, 85, 90, 95, or 100%, or any value or range of values therebetween in 1 percent increment.

Figure 39:
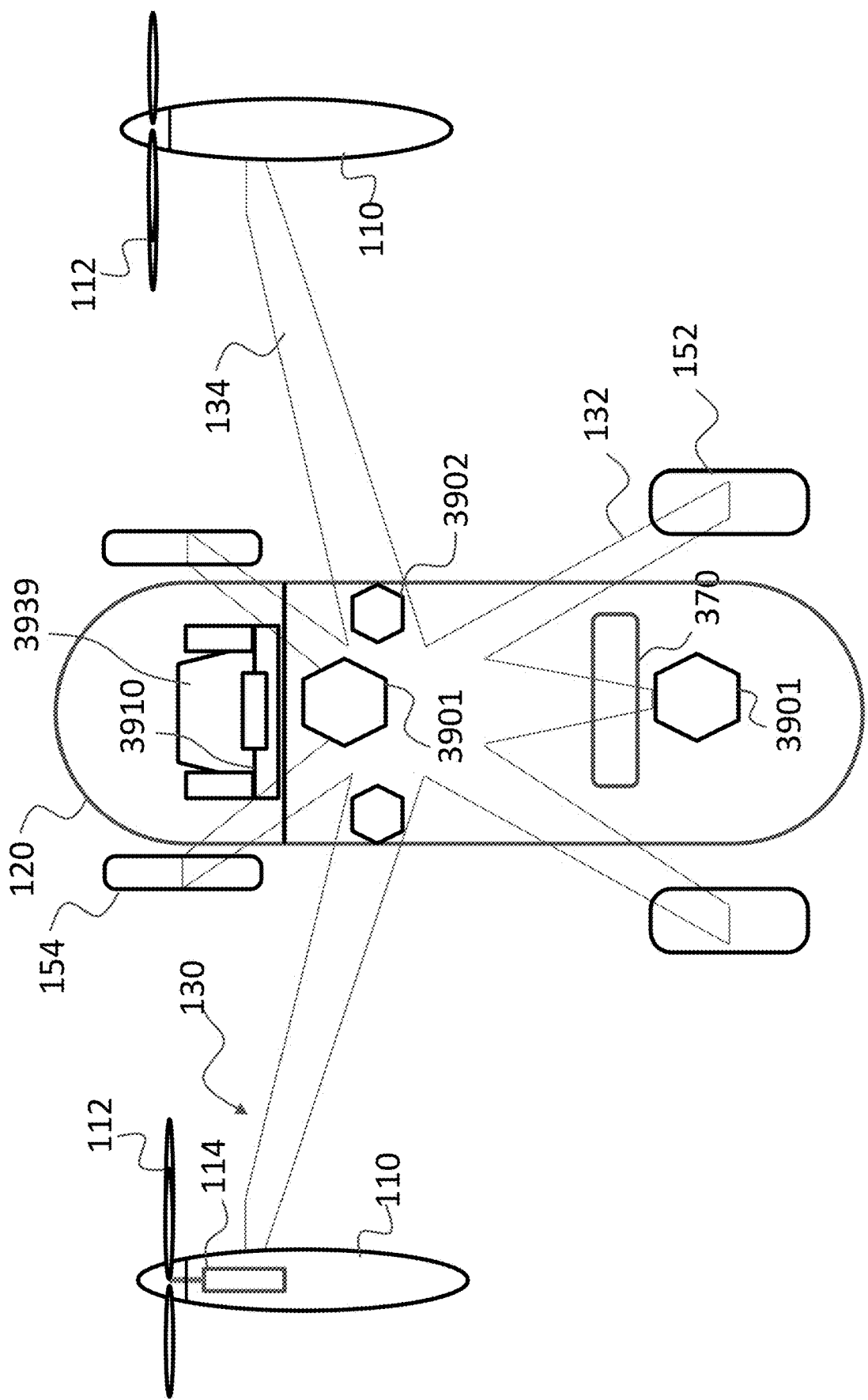
FIG. 39 presents a top view of an exemplary embodiment.

It is briefly noted that in an exemplary embodiment, the ducted fans are relatively close, if not on, the centerline of the aircraft with respect to the longitudinal axis in the vertical direction (e.g., when looking downward, such as in the view of FIG. 39, the center of the thrust vector of the ducted fan 370 is located on the centerline). In an exemplary embodiment, no centerline of the thrust of the inducted fan is further than 0.5, 1, 1.5, 2, 2.5, 3, 3.5, 4, 4.5, or 5 feet, or any value or range of values therebetween in quarter-inch increments from the centerline with respect to distance in the horizontal direction (the view of FIG. 39).

It is noted that there can be temporal components to the scenarios detailed herein. For example, in an exemplary embodiment, while the angles of the thrusts detailed herein can be present during takeoff during some time periods, the angles can also be aligned/the same during other portions of the takeoff procedure. That is, the teachings detailed herein contemplate scenarios where the thrust of the tilt rotor and/or the thrust of the ducted fan changes during takeoff, and in some instances, the directions of thrusts are aligned for some time periods, while in others they are not aligned.

Accordingly, in an exemplary embodiment, there is a scenario where method 3200 is executed, where the thrust from the ducted fan is directed at an angle that is different (for example, according to any of the angles herein) and in some embodiments, is substantially different, from that of the forward tilt rotors for at least temporally GG % of the lift producing portion of takeoff that reduces the weight on wheels value by 25% to full liftoff, where GG can be 10, 15, 20, 25, 30, 35, 40, 45, 50, 55, 60, 65, 70, 75, 80, 85, 90, 95, or 100, or any value or range of values therebetween in 1% increments. In this regard, during a takeoff procedure, there will be periods of time where the lift on the aircraft varies even though it is not intended to take off at a given time. Accordingly, the aforementioned threshold of weight on wheels of 25% is an indicator that takeoff is intended and will be imminent. It is also noted that this excludes a scenario where, for example, the weight on wheels value is reduced by, for example, 30 or 35%, and an increased to below the 25% threshold. The calculations would occur at the time that the weight on wheels goes fully from the 25% threshold to 100% reduction. That does not mean that the weight on wheels value must be changing during the whole time, or even that it might not have an inflection point. What that does mean is that when these calculations are implemented, is from the period of time that weight on wheels goes from 25% reduced to 100% reduced without falling below 25%.

In an exemplary embodiment, the action of controllably taking off is executed such that a longitudinal axis of the aircraft at a moment of complete full liftoff (i.e., when the last portion of the landing gear in contact with the ground is no longer in contact with the ground) is at least JJ degrees from horizontal, where JJ can be 10, 15, 20, 25, 30, 35, 40, 45, 50, 55, or 60 degrees, or any value or range of values therebetween in 1° increments. In an exemplary embodiment, this can be achieved via the combined use of the tilt rotors and the ducted fan(s).

In an exemplary embodiment, the action of controllably taking off is executed such that within and inclusive of the first 2 seconds from the moment of complete full liftoff, the aircraft moves forward and upward at a rate of speed in the horizontal of at least KK times the rate of speed in the vertical, where II can be 0.5, 0.6, 0.7, 0.8, 0.9, 1.0, 1.1, 1.2, 1.3, 1.4, 1.5, 1.6, 1.7, 1.8, 1.9, 2, 2.25, 2.5, 2.75, 3, 3.5, or 4 or more, or any value or range of values therebetween in 0.05 increments.

As noted above, in an exemplary embodiment of method 3200, there is the action of inducing a higher drag on the nose than that on the tail section during a controlled hard landing. The idea is that in an exemplary embodiment, the rear of the aircraft should first contact the ground. In this regard, FIG. 34 represents an exemplary hard landing scenario that results from the action of inducing higher drag on the nose section than on the tail section, although it is noted that the angles of the rotor and the ducted fan may not necessarily correspond to that which would be the case during such hard landing. It is also noted that in an exemplary embodiment, there is a horizontal velocity component in addition to the vertical velocity component. That said, in an alternative embodiment, the horizontal component may be de minimis if present at all. Either way, in an exemplary embodiment, by first contacting the ground at the rear of the aircraft, the paratrooper roll effect can be harnessed, thus dissipating or otherwise transferring energy away from the vital portions of aircraft, such as the cockpit. In an exemplary embodiment, by doing this, the aircraft may tumble or roll as detailed herein which can protect the occupants in a manner better than that which would otherwise be the case.

In an exemplary embodiment, the inducement of higher drag on the nose section than the tail section results at least in part from thrust from the forward tilt rotors having a downward vector that is substantially in front of a center of gravity of the aircraft relative to the longitudinal axis of the aircraft. In this regard, unlike, for example, the V 22 Osprey, where the tilt rotors have a downward vector that is about aligned with the center of gravity of the aircraft (in the longitudinal direction), the forward tilt rotors are located substantially in front of the center gravity (by substantially, it is meant something more than the de minimis amount that might exist with respect to the V 22 Osprey or the like, where there can be in some instances, an intentional offset, but it is minor). Here, in an exemplary embodiment, the substantial offset is such that without the ducted fan at the rear, the aircraft could not maintain a steady level hover. Thus, in an exemplary embodiment, by operating the forward tilt rotor as best as possible, which could be by simply implementing an anti-feathering routine right before impact (because it could be that there is no power available, but in other embodiments, some power may exist however minimal), the drag at the front of the aircraft can be greater than that at the rear because of the just detailed offset from the center gravity.

The above said, in an alternative embodiment, parachute arrangements of the like can be utilized, which parachutes can be arrayed such that the drag at the front results in the aforementioned nose up ground impact scenario. Accordingly, in an exemplary embodiment, the inducement of higher drag on the nose section than the tail section results from deployment of parachutes. In an exemplary embodiment, there can be parachutes located forward the center gravity and behind the center of gravity, but the overall drag resulting from the parachutes can be higher resulting from the four parachutes than the rear parachutes. In an exemplary embodiment, a combination of parachutes and the aforementioned rotor arrangement can be utilized to achieve the nose up impact scenario. In this regard, FIG. 39 presents an exemplary embodiment utilizing parachute canisters 3901 and 3902. The former being a larger (larger area/larger drag) parachute contained in the parachute canisters than the latter. As can be seen, the forward section aircraft has three parachute canisters, while the rear has only one. That said, in an exemplary embodiment, the parachute canisters on the rear can be dispensed with owing to the fact that the parachute canisters that are on the forward portions of aircraft are in front of the center gravity of the aircraft in some embodiments and thus will result in the nose up attitude at a desired value but not an extreme value. As can be seen, the parachute canisters are directly attached to the various substructures, while in another exemplary embodiment, the parachute canisters can be indirectly attached. It is noted that other locations for the parachute canisters can be provided, such as, for example, proximate the nacelles and/or on the legs of the Y body, or on the lower legs of the X body, etc. Any placement of the parachutes in any quantities that can enable the teachings detailed herein can provide utilitarian value can be utilized in at least some exemplary embodiments.

In view of the above, it can be seen that in an exemplary embodiment, there is a suite of parachute apparatuses, wherein three main parachutes are located at the front of the assembly and one main parachute is located at the back of the assembly. In an exemplary embodiment, one, two, three, four, five, six, seven, eight, nine, or 10 or more parachutes can be located at the front and/or at the rear, and the numbers at the front need not be the same as the rear, although they can be.

In an exemplary embodiment, the parachute arrangements detailed herein can avoid a spin or otherwise can be utilized to exit or otherwise counter a spin condition. In an exemplary embodiment, the parachutes can be utilized to maintain a wing attitude that is utilitarian for recommencement of forward steady level flight. In this regard, in an exemplary embodiment, the parachutes can be jettisoned or otherwise uncoupled if the pilot believes that he can regain control of the aircraft in a manner that will avoid a hard landing and/or a crash landing if continued use of the parachutes occurs.

The above said, in an exemplary embodiment, the utilitarian value of the parachutes can be, in at least some instances, a controlled hard landing and/or a controlled crash relative to that which would otherwise be the case. To be clear, a controlled hard landing or a controlled crash is distinct from a crash or hard landing that occurs at a velocity that would be less than that which would otherwise be the case. Here, the parachutes and the other drag producing components are utilized in a manner that results in the aircraft first striking the ground at locations that are supported by the lower portions of the X body (the rear). In this regard, in an exemplary embodiment, the teachings detailed herein can provide a first contact angle with respect to a hypothetical horizontal plane where the longitudinal axis of the aircraft is 20, 25, 30, 35, 40, 45, 50, 55, or 60 degrees or more, or any value or range of values therebetween in 1° increments from the horizontal, with the rear first contacting the ground. This can dissipate energy and also impart the above noted rolling onto the aircraft.

Figure 35:
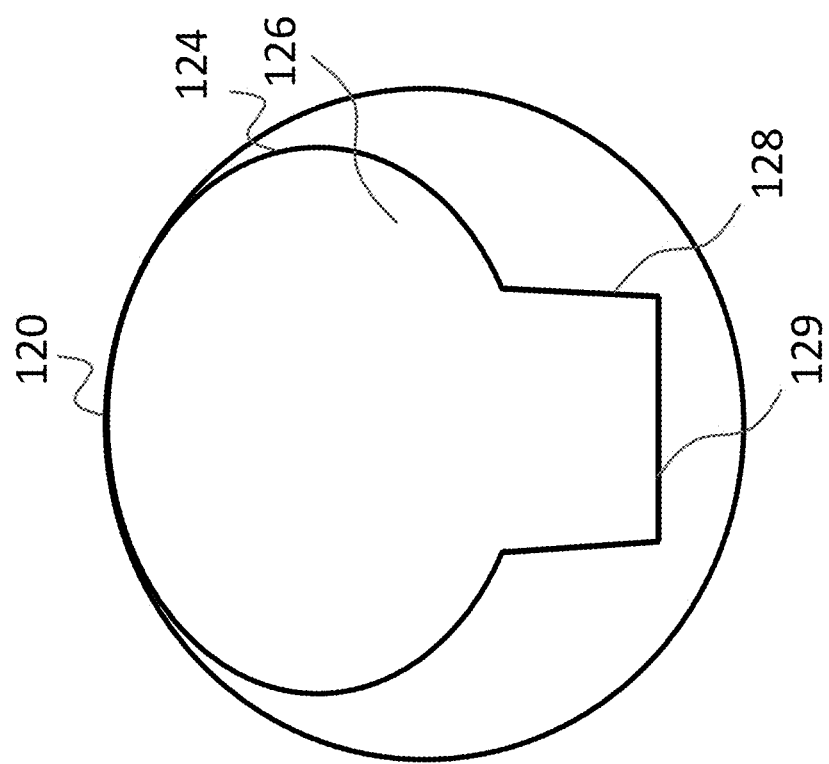
FIGS. 35-37 presents views of an exemplary cockpit.
Figure 36:
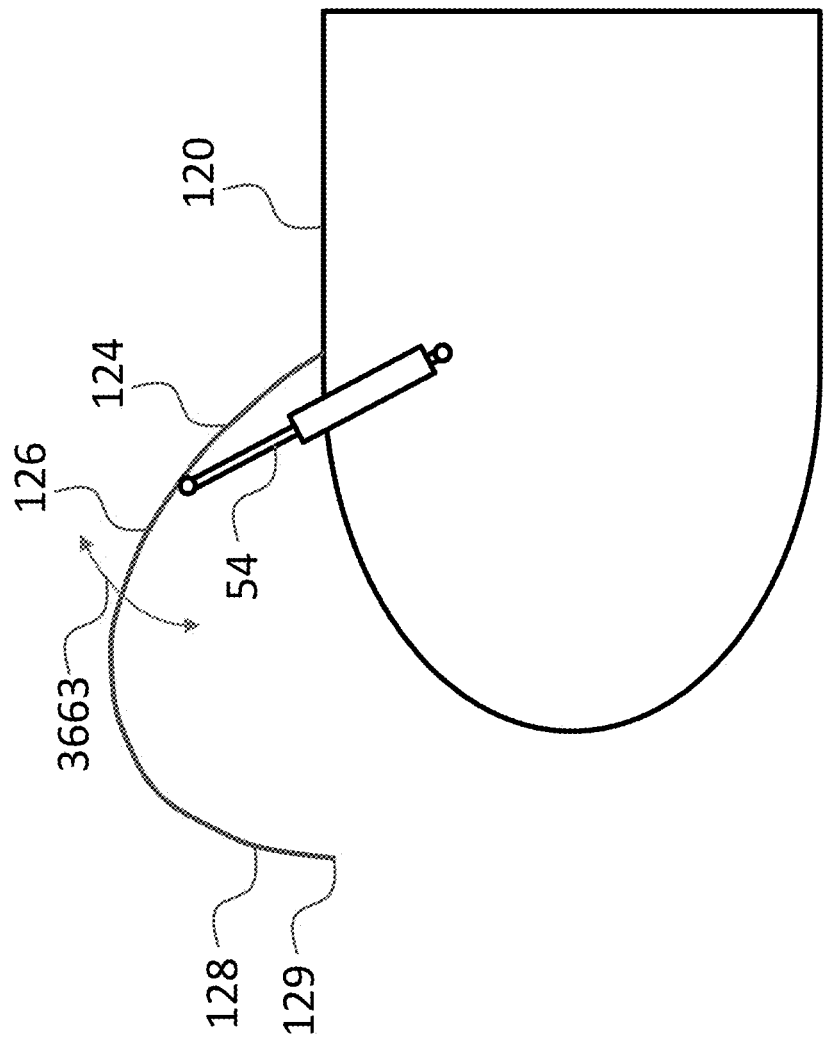
Figure 37:
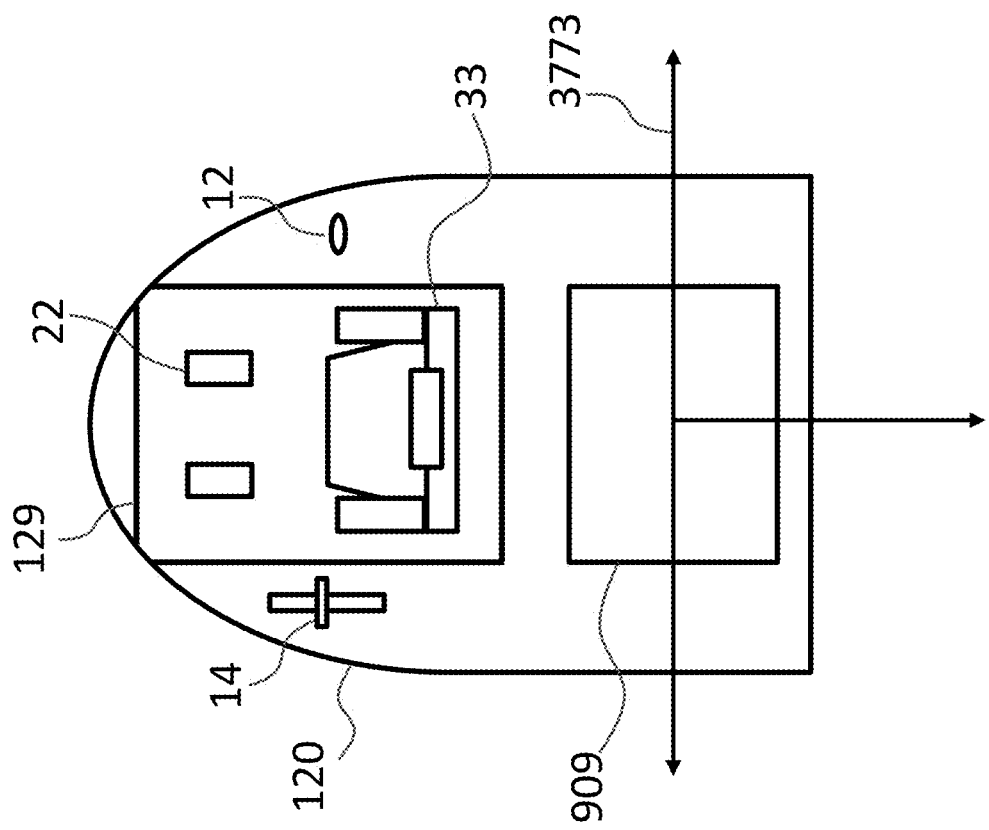

FIGS. 35-37 present another exemplary embodiment of an aircraft. Here, there is an aircraft fuselage including a cockpit, wherein the cockpit is configured for at least one egress from the front of the cockpit or ingress and egress from the front of the cockpit. More specifically, FIG. 35 depicts a front of an aircraft cockpit 120 looking down the longitudinal axis of the aircraft. Here, there is windscreen 124, which depicts an oval-shaped portion 126 and a trapezoidal section 128. While in this embodiment, this can be a complete windscreen (a monolithic transparency) and alternate embodiment, the windscreen can be bifurcated and/or need not necessarily be a transparent component at all locations. The windscreen 124 extends from the top to the location identified is 129, which is not quite all the way to the bottom of the aircraft.

It is briefly noted that while some embodiments depicted herein represent a windscreen that opens and a clamshell like manner, in an alternate embodiment, such as with respect to the embodiment of FIG. 3, the windscreen can slide backwards or forwards. By way of example only and not by way of limitation, windscreen 333 can slide backwards over the rear structure of the cockpit, owing to the fact that the contours or relatively similar. Also, while the embodiments depicted herein depict a canopy that opens up in an arc that is one a plane that is normal to the longitudinal axis extending in the vertical direction, in an alternate embodiment, the canopy can open over an angle that is 90° there from.

FIG. 36 depicts a side view of the cockpit 120, with the windscreen 124 in open position. Here, it can be seen that the windscreen 124 provides an access function to the interior of the cockpit. In this regard, the windscreen 124 moves in the direction of arrow 3663 to open and close the windscreen 124. In an exemplary embodiment, this can be aided via actuator 54, and can be automatic in some embodiments, while in other embodiments, it can be manually activated. In other embodiments, there is no actuator 54. That said, in an exemplary embodiment, the device 54 can be a force assist device that simply reduces the amount of force that is required to lift the windscreen 124 in the upward direction, akin to that which exists with respect to certain car hoods and the like. Briefly, FIG. 7 depicts a top view of the cockpit 120, showing seat 33 and certain control devices, such as the cyclic control 12 and the thrust control 14. Also can be seen are yaw petals 22. Element 129 presents the border of the bottom of the windscreen 124 and the structure of the remainder of the cockpit.

In an exemplary embodiment, the pilot steps into the cockpit from the front of the aircraft with the windscreen 124 in the raised position as seen in FIG. 36. Because all of the control components are located on the sides (except the yaw pedals 22, which are located below the level of 129, and thus do not present a serious obstruction to ingress and egress), the pilot can enter and exit with relative ease.

The arrangement depicted in FIGS. 35-37 is presented in terms of an arrangement that permits ingress and egress during normal operation. That said, in an alternate embodiment, this arrangement can be utilized only for egress in general, and emergency egress in particular. In this regard, in an exemplary embodiment, the windscreen 124 can be jettisonable, such as using an explosive bolt arrangement, or even something that can be simply kicked out by the pilot. In this regard, by rough analogy, the windscreen of a car is very robust with respect to forces impacting the windscreen from the outside, but the windscreen can be relatively easily kicked out from the inside.

In any event, in at least some exemplary embodiments where the control components are located on the sides, ingress and/or egress from the front can be enabled in a relatively safe or at least utilitarian manner, depending on the circumstances associated with utilization of the ingress and/or egress from the front. In an exemplary embodiment, heads up displays or the like can be projected onto the windscreen, thus permitting, for example, a virtual instrumentation suite directly in front of the pilot. Accordingly, in an exemplary embodiment, the cockpit can be configured to project flight control data to a location in front of the pilot location.

Further, in an exemplary embodiment, displays and/or control components can be located on one or more boom apparatuses that swings downward from the ceiling of the cockpit (like a flap) or from a side of the cockpit (like a train crossing barrier). Alternatively, and/or in addition to this, the boom apparatuses can swing in the horizontal direction. The point is, in at least some exemplary embodiments, mechanical structures can be utilized to position instrumentation and/or control components in front of the pilot in a manner that will permit such to be moved at the time of ingress and/or egress so that there is nothing in between the pilot seat 33 and the opening.

Accordingly, in an exemplary embodiment, it can be seen that there is a cockpit that is configured with at least substantially all (including all) flight control instrumentation to side(s) and/or above and/or below a pilot location in the cockpit. In an exemplary embodiment, there can be displays located on the floor and/or on the ceiling, providing that such enables ease of maneuvering, or more accurately, relative ease of maneuvering of the pilot during ingress or egress. Indeed, in an exemplary embodiment, a temporary platform can be located over such instrumentation to be in place during ingress and/or egress, but then removed for flight purposes.

It is noted that in an exemplary embodiment, the cockpit is configured such that the front facing windscreen can be removed and/or at least moved within DD seconds by hand, leaving an opening through which a human factors engineering YY percentile male can fit, where DD is 1, 2, 3, 4, 5, 6, 7, 8, 9, 10, 11, 12, 13, 14, 15, 16, 17, 18, 19, or 20 seconds, or any value or range of values therebetween in half second increments, and YY is 50, 55, 60, 65, 70, 75, 80, 85, 90, or 95, or any value or range of values therebetween in 1 increments. In an exemplary embodiment, there can be an arrangement where there is a seal that can be pulled away from the windscreen so as to decouple the windscreen from the rest of the cockpit. In an exemplary embodiment, there can be latches or the like that can be undone so as to decouple the windscreen from the rest of the cockpit. Alternatively, in an exemplary embodiment, the windscreen can be kicked out within DD seconds leaving an opening through which the aforementioned human factors engineering YY percentile male can fit.

In an exemplary embodiment, the above noted openings are such that the aforementioned persons can at least crouch through (as opposed to fit, which covers a smaller area). In an exemplary embodiment, an opening that is created has a cross-section having an area that is at least 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, or 18 or more square feet, or any value or range of values therebetween in 0.1 square feet increments.

In an exemplary embodiment, a cockpit door faces forward, through which the pilot can ingress and egress during normal flight operations (as opposed to an emergency situation).

With reference to FIG. 37, it is briefly noted that FIG. 37 represents an exemplary miniaturized fuselage, or more accurately, a fuselage that is for all intents and purposes a cockpit. FIG. 37 depicts an exemplary embodiment where the aircraft is utilized for quick delivery or otherwise timely delivery of high-value but limited cargo. More particularly, in this exemplary embodiment, package 909 is located within the cockpit or immediately behind the cockpit. In an exemplary embodiment, the cockpit or the fuselage is configured with side openings to enable quick placement and quick removal of the package 909. In this exemplary embodiment, the cockpit 120 is configured so as to enable retrieval of the package 909 from both sides of the aircraft, as conceptually represented by arrow 3773. In this regard, irrespective of the orientation of the aircraft vis-à-vis ground personnel, the personnel need not go around the aircraft to retrieve the package.

Such can have utilitarian value with respect to exemplary embodiments where specialty packages are delivered. By way of example only and not by way of limitation, transplant organs can be placed on the aircraft and delivered to hard to reach locations (e.g., a hospital in an inner city during peak rush hour in a rain storm during a transit worker strike) and retrieved by the hospital in a very quick matter. Alternatively, and/or in addition to this, high-value medical devices can be moved from hospital to hospital in a scenario where a patient may not be transported readily to the location of the high-value medical device. In this regard, in an exemplary embodiment, equipment cost can be reduced by sharing medical equipment.

While the embodiment depicted in FIG. 37 has left and right openings in the cockpit, is also noted that in an exemplary embodiment, such as the embodiment of FIG. 37, there can be a rear opening, as represented by the arrow that is orthogonal to arrow 3773. Note also that in an exemplary embodiment, it is contemplated that in some instances, the package 909 could be retrieved through the front of the aircraft, such as where, for example, the pilot seat 33 to be collapsible or otherwise foldable to enable the package to be removed from the front of the aircraft, depending on its size. Note also that in at least some exemplary embodiments, the package could be retrieved from the bottom of the aircraft.

Note also that in an exemplary embodiment, the package need not necessarily be enclosed within the fuselage during transport. In an exemplary embodiment, the package can be spring-loaded or otherwise attached to the outside of the fuselage or other structural components aircraft. Indeed, in an exemplary embodiment, the package or cargo can be located between the lower legs of the X body and forward of the ducted fan. Any arrangement that can enable the teachings detailed herein can be utilized in at least some exemplary embodiments.

Figure 38:
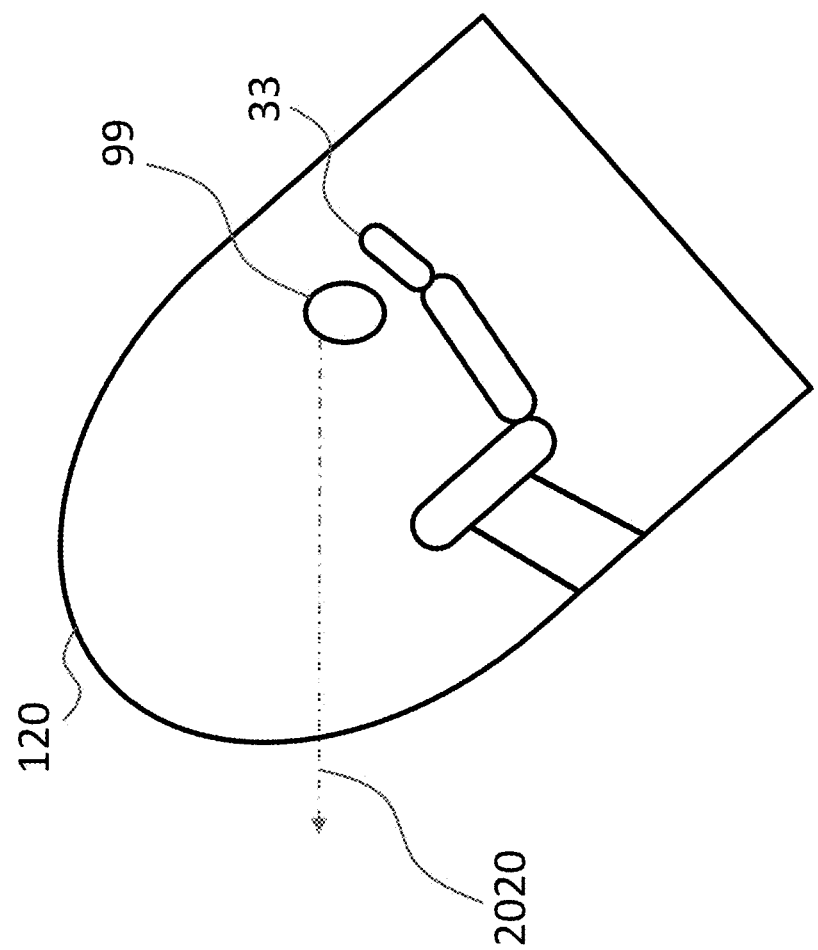
FIG. 38 presents a cockpit at an angle of attack relative to the horizon that is greater than zero.

Some exemplary embodiments enable a line of sight at high angles of attack. While the two embodiments are not reliant upon one another, the utilization of the forward transparency according to the teachings detailed above can enable such. In this regard, FIG. 38 presents an exemplary embodiment where the cockpit 120 is at a 45° angle of attack with respect to the longitudinal axis and the horizontal. Here, it can be seen that the pilot can lean forward/tilt his or her head 99 forward, so as to provide a line of sight 2020 that is aligned with the horizontal, which line of sight extends outside of the cockpit. In this regard, in an exemplary embodiment, just below the line of sight 2020 is the boundary 129 of the cockpit door detailed above, and above is the transparency which extends all the way to the level portion, in an exemplary embodiment, above the pilot. It is briefly noted that in other embodiments, the aforementioned angles can be different. In an exemplary embodiment, the cockpit is configured such that a pilot has sight vision of the horizon at an angle of attack of at least 25, 30, 35, 40, 45, 50, 55, 60, 65, 70, 75, or 80 degrees, or any value or range of values therebetween in 1 degree increments. Indeed, in an exemplary embodiment, the floor of the cockpit can be a transparent material.

It is also noted that in some exemplary embodiments, there can be instrumentation or the like on the floor or otherwise just below the demarcation line 129. In this regard, during normal flight, these instruments would not be relied upon because the pilot would have to look too far down to see them. However, during the aforementioned takeoff regimes, where the pilot could be looking towards the horizontal but because the orientation the aircraft, the pilot is also looking towards the floor, there can be utilitarian value with respect to placing these instruments at such locations. Accordingly, in an exemplary embodiment, there are instrumentation output devices that are located between demarcation line 129, and the plane of the pilot seat, which instrumentation located on the bottom floor or otherwise towards the bottom floor of the cockpit.

It is briefly noted that with respect to an exemplary embodiment, any detailed herein relating to a feature related to the pilot or an occupant of the aircraft corresponds to that which would result with respect to any of a human factors engineering 5, 10, 15, 20, 25, 30, 35, 40, 45, 50, 55, 60, 65, 70, 75, 80, 85, 90, or 95 percentile value, or range of values therebetween in five percentile increments male or female aged 20, 25, 30, 35, 40, 45, 50, 55, or 60 years, or any value or range of values therebetween in one year increments of native-born United States citizenship as of Oct. 13, 2019.

It is noted that in an exemplary embodiment, the aforementioned lines of sight are located on a plane that is normal to the longitudinal axis and normal to the vertical and lying on a longitudinal axis of the aircraft (e.g., in the center) and bisecting the most outward portion of the aircraft from the pilot's head rest (basically, the center of border 129), while in another exemplary embodiment, the aforementioned lines of sight are located on a plane that is 3, 4, 5, 6, 7, 8, 9, 10, 11, 12, 13, 14, 15, 16, 17, 18, 19, 20, 21, 22, 23 or 24 inches or any value or range of values therebetween in 0.1 inch increments to the left and/or to the right of the aforementioned plane (in an exemplary embodiment, on the leftmost or the rightmost side of the border 129).

In an exemplary embodiment, the aforementioned field-of-view lying on any of the planes just detailed extends uninterrupted from the horizontal line of sight 2020 an angle of 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, or 245 degrees or more, or any value or range of values therebetween in 1° increments, where the horizontal line of sight 2020 can be that which exists when the longitudinal axis of the fuselage or cockpit is 45° or 50 degrees or 55° or 60° from horizontal or more, as detailed herein, or where the longitudinal axis of the fuselage or cockpit is 40° or 35° or 30° or less from the horizontal. In an exemplary embodiment, to the extent there are interruptions, the interruptions extend no more than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 percent, or any value or range of values therebetween in 0.1% increments of the overall arc. For example, in a scenario where there is a frame that separates the top windscreen 126 from the bottom windscreen 128, that frame may take up no more than 5% of the overall angle. This is compared to, for example, an embodiment where there is a dashboard or the like or a control panel in front of the pilot, which will take up more of the view.

In view of the above, it can be seen that in an exemplary embodiment, there is an assembly, comprising an aircraft fuselage including a cockpit, wherein the cockpit is at least one of (1) breakawayable from the remainder of the fuselage or (2) configured for ingress and egress from a front of the cockpit.

In an exemplary embodiment, the cockpit includes a parachute apparatus and the cockpit is breakawayable from the remainder of the fuselage during flight and the parachute is deployable at least after breakaway so as to enable a less than catastrophic touchdown of the cockpit. By way of example only and not by way of limitation, at least some of the detachable cockpit and/or fuselage concepts disclosed herein can be utilized in conjunction with a parachute arrangement. While some embodiments are presented in terms of a cockpit that breaks away only upon impact or otherwise hard landing with the surface of the earth, and other embodiments, the breakaway or detachment could be enabled utilizing actuators or explosive bolts, etc. That said, in an exemplary embodiment, the drag of the parachute can be utilized to break the parachute away from the frame or otherwise the remainder of the aircraft. In an exemplary embodiment, the parachute(s) could be deployed, and the force resulting from the drag of the parachute could be sufficient to pull the cockpit away from the remainder of the aircraft. In some embodiments, the actuator components or the like can uncouple the cockpit from the remainder of the aircraft, or at least can uncouple the main structural support for the cockpit, so that when the force resulting from the drag of the parachute operates on to the cockpit, whatever remaining structure is present is sufficiently frangible so that the cockpit will be the way from the aircraft (or more accurately, the pull of gravity will pull the remainder of the aircraft away from the cockpit). Any arrangement that can enable detachment of the cockpit from the remainder the aircraft can be utilized in at least some exemplary embodiments.

In an exemplary embodiment, the aircraft is configured such that while completely in the air, at least under certain flight regimes that are to be expected to be experienced, however unlikely or otherwise undesirable, during the lifetime of the aircraft, the cockpit can be 100% detached from the remainder of the aircraft within 0.5, 1, 1.5, 2, 2.5, 3, 3.5, 4, 4.5, 5, 5.5, 6, 6.5, 7, 7.5, or 8 seconds, or any value or range of values therebetween in 0.1 second increments, from the temporal point of initiation by the pilot or by some automatic system.

In an exemplary embodiment, there are one, two, three, four, five, or six lug points that attach the cockpit to the remainder of the aircraft, and these lugs are configured to be opened released or otherwise undone within the aforementioned temporal periods. In an exemplary embodiment, a single lug can be utilized where the lug is under tension and pull the cockpit towards the aircraft during normal operation. By way of example only and not by way of limitation, two or more pin lugs can be utilized where the cockpit includes bearing surfaces that ride around the pins, but can move longitudinally along the pins in the forward direction but for the fact that there is a log under tension that pulls the cockpit back towards the base of the pins. Upon the release of tension at the lug, which could be a simple explosive bolt concept, this tension would be released, and thus the cockpit could be free to be pulled forward, akin to a pallet being pull off a forklift. Here, the parachute could pull the cockpit off, or the cockpit could be spring-loaded or the like. Moreover, the pins could be configured to move or otherwise can be gimballed, so that there is even less resistance to whatever direction of movement the cockpit takes. The gimbling could be canceled or otherwise prevented when the system is in tension during normal operation.

Referring back to FIG. 1 and FIG. 2, in an exemplary embodiment, the forward landing skids 154 can establish rail like structures along which the cockpit can move. In this regard, in an exemplary embodiment, sliders or rollers can be connected to the top surfaces are side surfaces of the skids 154, or separate rails can be present that run parallel to the skids. Indeed, in an exemplary embodiment, the rails establish the skids. In an exemplary embodiment, the cockpit can slide forward when the cockpit detaches from the remainder of the aircraft. Indeed, in an exemplary embodiment, the cockpit can be mounted onto the rail. Moreover, in an exemplary embodiment, the legs of the Y body can be compound structures where a horizontal portion of the leg establishes the front landing apparatus. That is, in an exemplary embodiment, there is no separate skid 154 from the Y body, or more accurately, the skid is simply another part of the Y body. This can also be the case with respect to the X body as well vis-à-vis the rear skid.

In an exemplary embodiment, the aircraft is configured to eject the cockpit away from a remainder of the aircraft at breakaway. In this regard, in an exemplary embodiment, a gas generator or the like can be utilized to provide propulsion or otherwise provide a force against the cockpit that the cockpit "shoots" away, for example, from the remainder the aircraft. Such can have utilitarian value with respect to ensuring that the cockpit clears the remainder of the aircraft, and/or avoids the rotors which still could be rotating. In an exemplary embodiment, this feature could be utilized at the time of first contact in the aforementioned nose up hard landing and/or crash scenario. In an exemplary embodiment, owing to the angle of the remainder of the aircraft, the ejection system could eject the cockpit away from the remainder of the aircraft.

It is noted that there is a difference between ejection and breakaway. Breakaway can simply be a scenario where the cockpit is no longer connected to the remainder the aircraft, but there is not necessarily a force that is artificially generated to move the cockpit away from the remainder of the aircraft. Conversely, ejection utilizes some form of artificial force. While the embodiment detailed above utilized a gas generator, in an alternate embodiment, a limited rocket system can be utilized, or a spring system could be utilized, where the spring is in compression, for example, until breakaway, and then the spring can extend and thus push the cockpit away from the aircraft.

In an exemplary embodiment, the rejection of the cockpit from the remainder of the aircraft is such that the vector of ejection is within 5, 10, 15, 20, 25, 30, 35 or 40 degrees or any value or range of values therebetween in 1° increments of a longitudinal axis of the cockpit prior to breakaway. That is, the ejection system does not shoot the cockpit downward or upward, but instead shoots the cockpit forward (i.e., the primary vector is forward, not upward or downward).

In an exemplary embodiment, an onboard system can continue to attempt to regain control of the aircraft after the cockpit becomes detached. In this regard, in an exemplary embodiment, the aircraft can be configured or otherwise weighted so that the removal of the cockpit does not so significantly change the center of gravity that the aircraft cannot be flown. Alternatively, and/or in addition to this, the other parachutes associated with the aircraft could provide sufficient drag to cancel out any change of center of gravity of the aircraft as a result of the removal of the cockpit. In any event, in an exemplary embodiment, the aircraft is configured with a flight control computer system that can attempt to stabilize the aircraft with or without the pilot on board. Again, some embodiments are associated with an autonomous vehicle and/or a drone vehicle, or remote controlled vehicles, etc.

Still, the likelihood that the aircraft will be recoverable after the cockpit is jettisoned or otherwise removed from the rest of the aircraft while the aircraft in flight implicate certain actuarials. In an exemplary embodiment, there includes methods of flying the aircraft over locations that have low to no populations. An exemplary embodiment, an automatic system could be utilized that would prevent the aforementioned cockpit jettisoning when the aircraft is over a populated area. Accordingly, the aircraft could include an onboard computer system that includes a processor or a microprocessor, etc., that continuously determines the location of the aircraft and automatically synchronizes that location with data in a database indicative of population density or otherwise indicative of data based on population density, and the computer system activates and/or deactivates the emergency jettisoned system, where, in the deactivated state, the cockpit cannot jettison. Alternatively, and/or in addition to this, signals from a ground-based system or the like can be continuously provided to the aircraft, which signals provide data that the aircraft can utilize to determine whether or not to engage or disengage the jettison feature. Indeed, the system could be controlled by the ground such that the jettison system can only be activated if a ground controller or the like permit such. This ground controller could be an automated system that evaluates the location aircraft and determines whether or not it is over an area where the jettisoning can take place with low to no risk of casualties on the ground with respect to the remainder of the aircraft.

In this regard, in an exemplary embodiment, methods could include flying the aircraft over low to non populated areas, so that the risk of injuring someone on the ground is minimized or otherwise to maximize the amount of time that the jettison feature can be utilized. By way of example only and not by way of limitation, in an exemplary embodiment, flight patterns might include utilizing flight over a river for more than that which would otherwise be the case, as compared to, for example, a straight line of flight to the destination. For example, with respect to Pittsburgh, the Ohio River could be followed/flown directly over, and then potentially the Allegheny River could be utilized, to reach a location in Pittsburgh even though it might be a more direct route to simply crossover one to land from the Ohio River. Thus, in an exemplary embodiment includes altering a flight plan that is not the most optimal flight plan vis-à-vis temporal concerns and/or vis-à-vis economy, but that which increases the amount of time that the jettison feature can be utilized relative to that which would otherwise be the case when flying a different route.

It is also noted that the above noted alternate flight arrangements can be utilized with or without the jettison system. In this regard, there can be utilitarian value with respect to flying unmanned vehicles over low populated areas for as much as possible.

In view of the above, in an exemplary embodiment, there is a method that includes taking off from the first location, flying from the first location to a second location, and then landing at the second location utilizing any of the aircraft detailed herein or any other aircraft, where the flight increases the distance and/or time in the air by 5, 10, 15, 20, 25, 30, 35, 40, 45, 50, 55, 60, 65, 70, 75, 80, 90, 100, 125, 150, 175, 200, 225, 250, 275, or 300 percent or more relative to that which was the case if an effectively straight shot was utilized or a traditionally optimized flight plan was utilized, which flight increases the time and/or distance over unpopulated or otherwise low populated areas relative to that which would otherwise be the case.

Another exemplary safety feature in some embodiments is that the forward portions of the aircraft power plants are at least about aligned with a front facing vertical of a pilot seat at the forward most operational position thereof in the aircraft fuselage when the assembly is in a forward flight wing supported mode. FIG. 39 depicts this exemplary embodiment, where the forward powerplant 114 has a forward portion that is in front of, and thus at least about aligned with (the "at least" qualifies that it can be aligned or be forward) the front facing vertical 3910 of the pilot seat. In an exemplary embodiment, this can have utilitarian value with respect to placing the relatively massive power plants at a location that is conducive to avoiding contact with the more vital portions of aircraft in the event of a hard landing or crash landing in the event that the power plants move as a result of such. By alignment, it is meant in the longitudinal direction, as seen in FIG. 39. That said, in some embodiments, the from portions can also be aligned in the vertical direction providing that such can have utilitarian value, such as alignment with the top surface of the upward facing surface of the seat (the surface 3939 seen in plan view in FIG. 39) when that surface is at its highest operational level.

In an exemplary embodiment, the forward most portion of an aircraft powerplant is no more than 5, 4, 3, 2, 1, or 0 feet, or any value or range of values therebetween in 1 inch increment behind the front facing vertical of the pilot seat at the forward most operational position thereof when the aircraft is in a forward flight wing supported mode (i.e., the rotors are tilted for maximum forward thrust), when measured relative to the longitudinal axis of the aircraft. In an exemplary embodiment, the forward most portion of an aircraft powerplant is at least 0, 1, 2, 3, 4, 5, 6, 12, 18, 24, 30, 36, 42, 48, 60, or 72 inches, or any value or range of values therebetween in quarter-inch increments in front of the front facing vertical of the pilot seat at the forward most operational position thereof when in the forward flight wing supported mode.

In an alternate embodiment, the aforementioned forward portion/forward most portion is instead the center of gravity of the power plant.

In an exemplary embodiment, a center of gravity of the powerplant is at least 0, 1, 2, 3, 4, 5, 6, 12, 18, 24, 30, 36, 42, 48, 60, 72, 84, 96, 108, or 120 inches, or any value or range of values therebetween in quarter-inch increments above the top surface of the upward facing surface of the pilot seat when that is at its highest operational level or at least 0, 1, 2, 3, 4, 5, 6, 7, 8, 9, 10, 11, 12, 15, 18, or 24 inches, or any value or range of values therebetween in quarter-inch increments below the top surface of the upward facing surface of the pilot seat when it is at its highest operational level.

Figure 40:
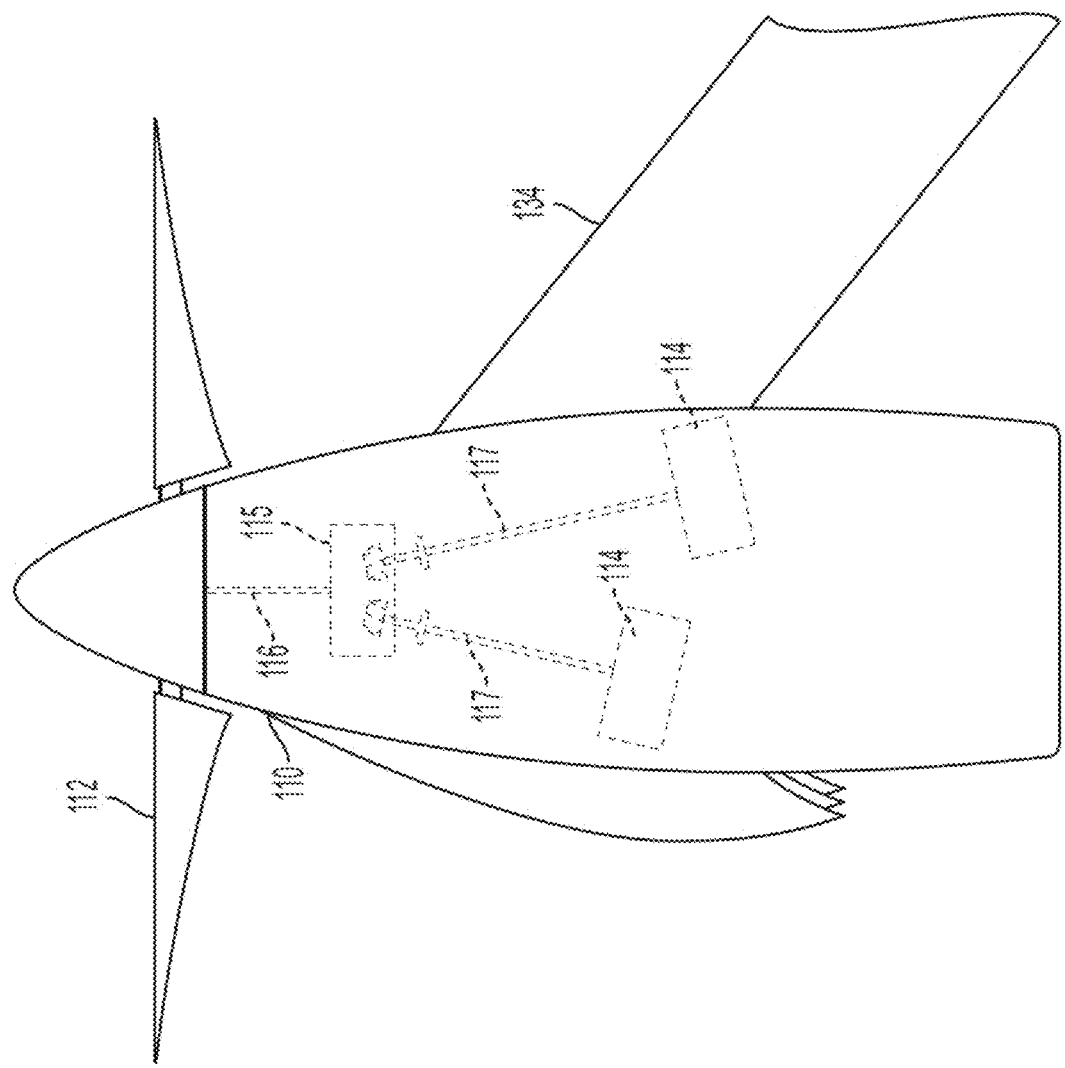

FIG. 40 presents another exemplary embodiment. Shown here is a view inside of a nacelle 110 (the left nacelle), which is supported by the left leg 134 of the X body in accordance with the teachings detailed herein. In this embodiment, there are two power plants in the form of electric motors 114. The electric motors are connected by respective driveshafts 1172A combiner transmission 115 (combiner gear box). The output from the two motors 114 is combined by the transmission 115, which outputs rotational power through driveshaft 1162 the prop rotors 112. In an exemplary embodiment, the skin that forms the nacelle is segmented and configured to move so as to establish and/or vary openings into the interior of the nacelle so as to increase and/or decrease airflow into the nacelle.

Figure 41:
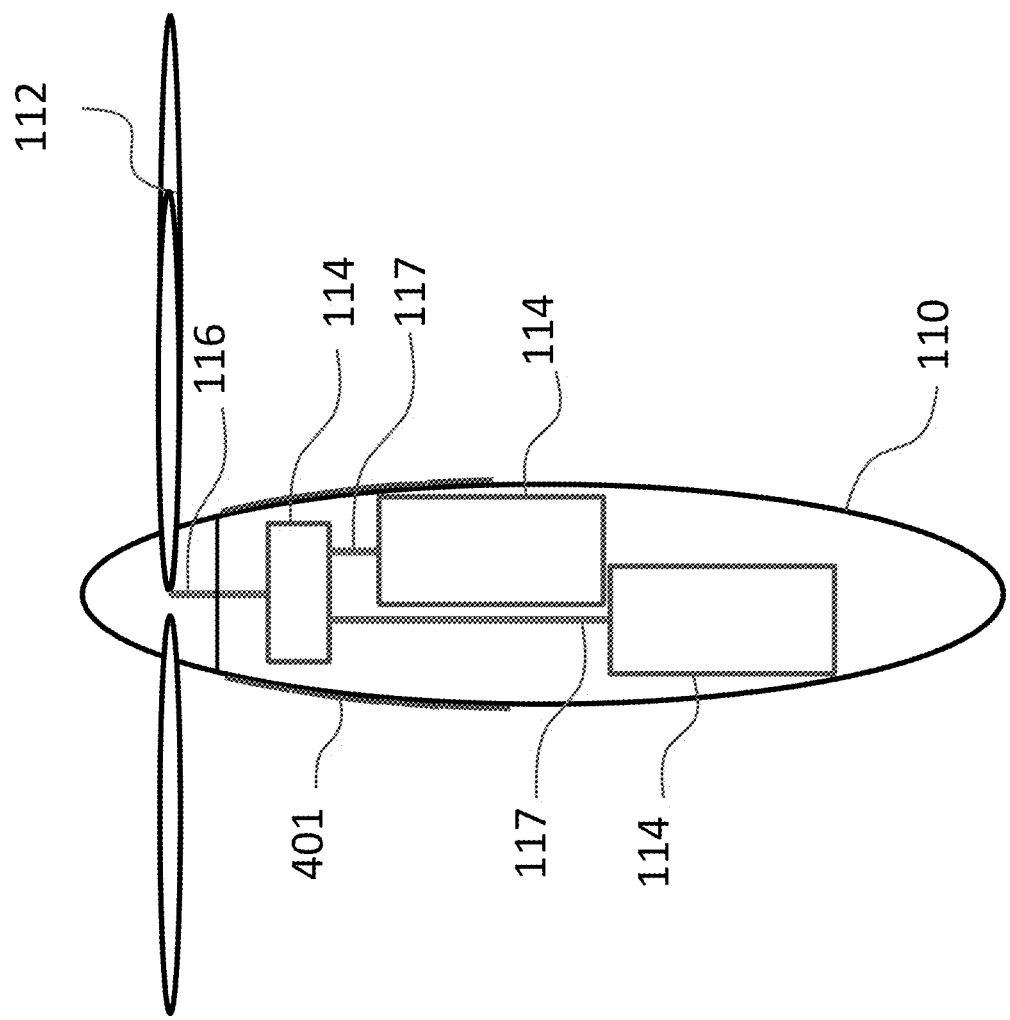
Figure 42:
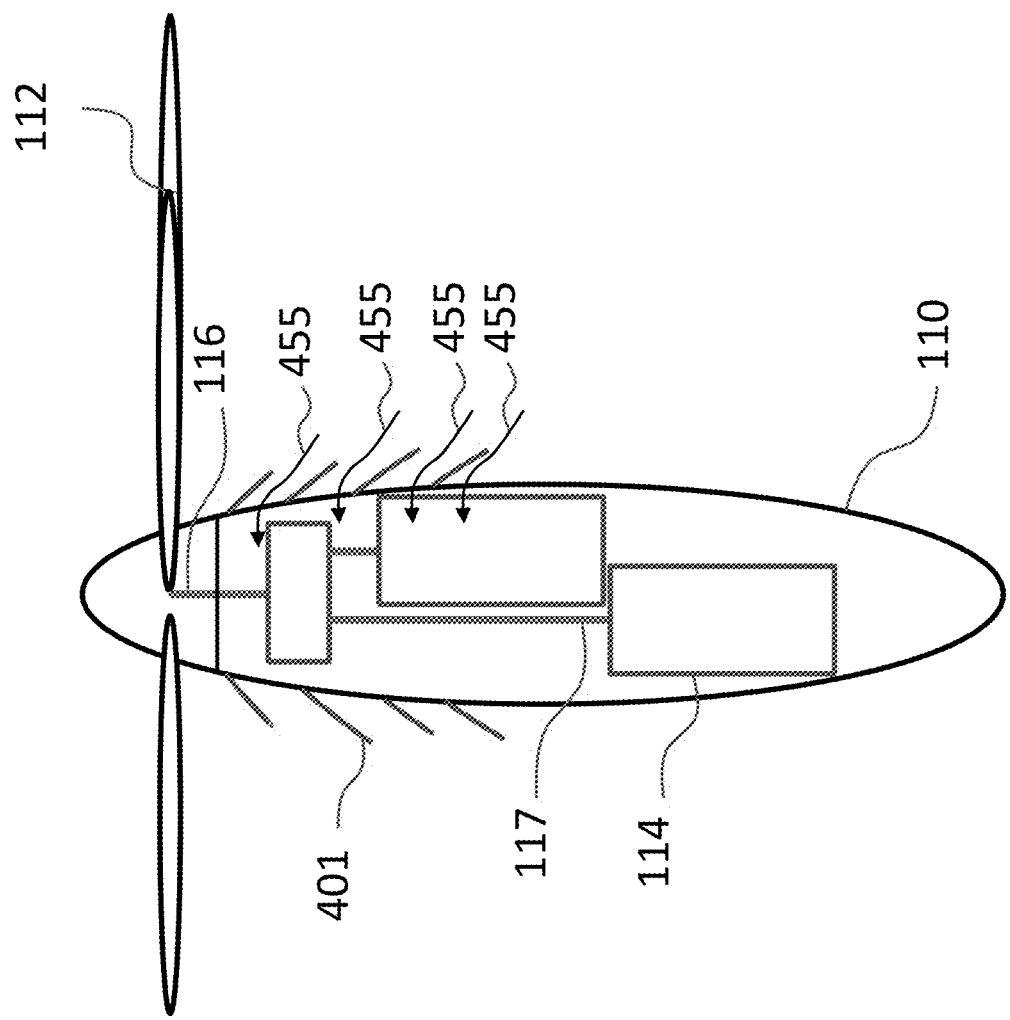

More specifically, FIG. 41 depicts an exemplary embodiment of a nacelle arrangement that includes a plurality of segments 401 that establish the forward surface of the nacelle, or at least a portion thereof. FIG. 42 depicts the segments 401 in an open configuration, which permits airflow into the interior of the nacelle 110, as represented by arrows 455 (depicted only on the right for purposes of ink economy). Depending on the angle of opening, the amount of airflow can be increased or decreased relative to that of other angles of opening.

Accordingly, it can be seen that in an exemplary embodiment, there is an aircraft power plant cowling including a plurality of segments, wherein the power plant cowling is configured such that the plurality of segments can move from respective first positions to respective second positions, the second positions enabling greater airflow into and/or out of the interior of the cowling relative to the first positions. In an exemplary embodiment, the first positions can be closed positions, such as that seen in FIG. 41, and the second positions can be the maximum open positions. In an exemplary embodiment, a plurality of positions in between the closed position in the maximum open position can be present. In an exemplary embodiment, the amount of opening can be infinitely variable (e.g., such as that which can be achieved via a jackscrew mechanism) or can be limited to precise amounts of opening, such as can be achieved via the utilization of a ratchet or a detente system.

Still, in this regard, in an exemplary embodiment, the first positions correspond to substantially closed positions (which includes completely closed) and the second positions can correspond to substantially open positions (which includes completely open positions). It is noted that in an exemplary embodiment, it is entirely possible that there is no completely closed position. In this regard, the nature of the segments may be such that the segments cannot be completely closed, such as in the embodiments where the segments are scale like features that overlap one another. In an exemplary embodiment, the plurality of segments are arrayed in a longitudinal direction of the cowling so that, when in the first position, first ends of respective segments overlap second ends of adjacent respective segments.

Figure 43:
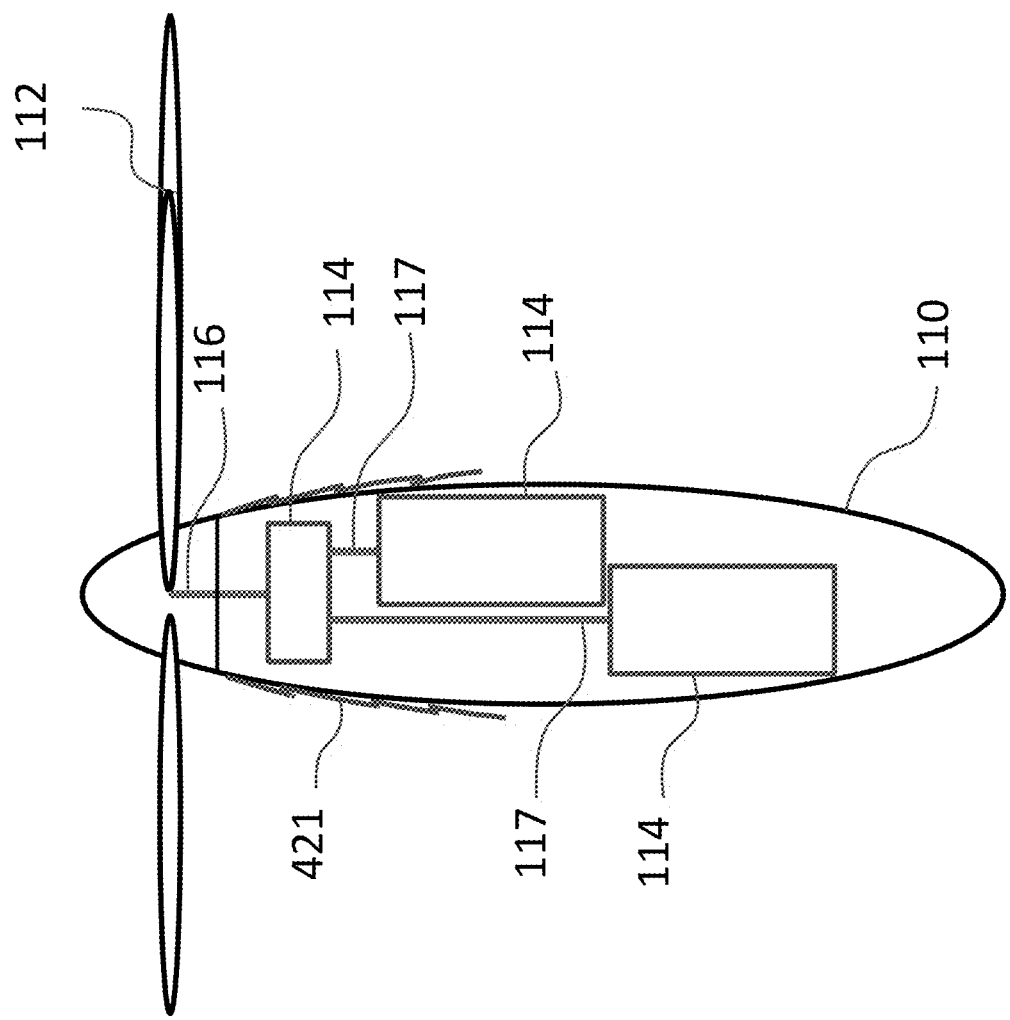

This embodiment can be seen in FIG. 43 by way of example. In an exemplary embodiment, the segments 421 are scale like components that move like perch spiny dorsal fins from the first position to the second position. In this regard, fish scales overlap but tend to not move on their own accord. Conversely, the spiny dorsal fin of a perch can move from a very streamlined and tapered backwards position to an erect almost vertical position. The segments 421 may not necessarily extend to such analogous extremes as the perch fish, but the concept is applicable for purposes of description. That said, in an exemplary embodiment, such as where the aircraft is not flying or otherwise on a tarmac waiting for takeoff or after landing, the segments may in fact be positioned in an almost vertical position, as streamlining is likely not a concern when the aircraft is on the ground.

While the embodiments seen in FIGS. 41 and 42 depict the segments 401 being located only on the sides and at the forward section of the nacelle 110, in an exemplary embodiment, the segments 41 can be located at other locations such as at the rear section of the nacelle and one top and/or one bottom, etc. Indeed, there can be utilitarian value with respect to placing the segments for one only at the bottom so as to reduce the amount of water that would enter the nacelle during rainstorms or the like. Accordingly, in an exemplary embodiment, the plurality of segments can be arrayed in a lateral direction of the cowling as well as or instead of in the longitudinal direction of the cowling.

It is briefly noted that while some embodiments that utilize the overlap arrangement may not result in openings that can be completely closed, in other embodiments, the openings may be completely closed.

Figure 44:
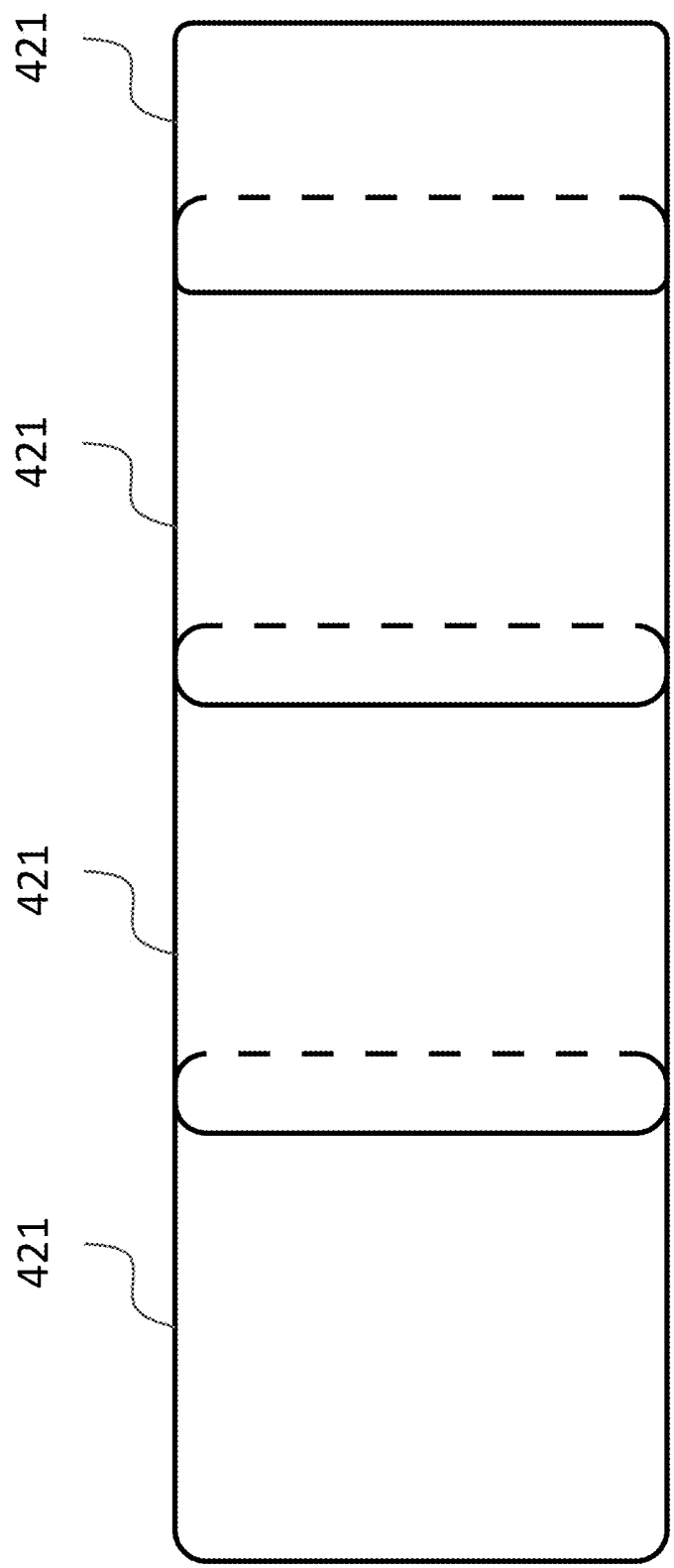

FIG. 43A depicts an exemplary arrangement of the segments 401 that are arrayed in a longitudinal direction of the nacelle. Here, the segments do not overlap. Indeed, there are gaps 477 between each segment. In an exemplary embodiment, the segments can be flush with the outer skin of the nacelle. In this regard, the gaps 477 can be structure that rises to a level that is flush with the outer surface of the segments 401. That is, the segments can be located in a manner somewhat analogous to how a manhole cover is located in a street—flush with the overall street. That said, in some alternative embodiments, there is no gap (or, more accurately, any gap is negligible) between the segments 401. FIG. 44 depicts another exemplary embodiment that utilizes the scale/overview lap arrangement. FIG. 44 also depicts an exemplary embodiment where not all of the segments have the same length in the longitudinal direction. Any sized and any shaped segment that can enable the teachings detailed herein can be utilized in at least some exemplary embodiments.

In an exemplary embodiment, the segments are aluminum plates that are hinged at one end. In an alternate exemplary embodiment, the segments are flexible plates that have a living hinge at one end. Some additional details of this will be described below.

In most instances, the overlap will be such that the end of a segment that overlies another segment is located on the downstream or otherwise at a rear facing side of the segment. In this regard, much like scales of a fish, such an arrangement reduces drag. That said, in an alternate embodiment, there can be an arrangement where the overlap is arrayed in a lateral direction about the nacelle.

Figure 45:
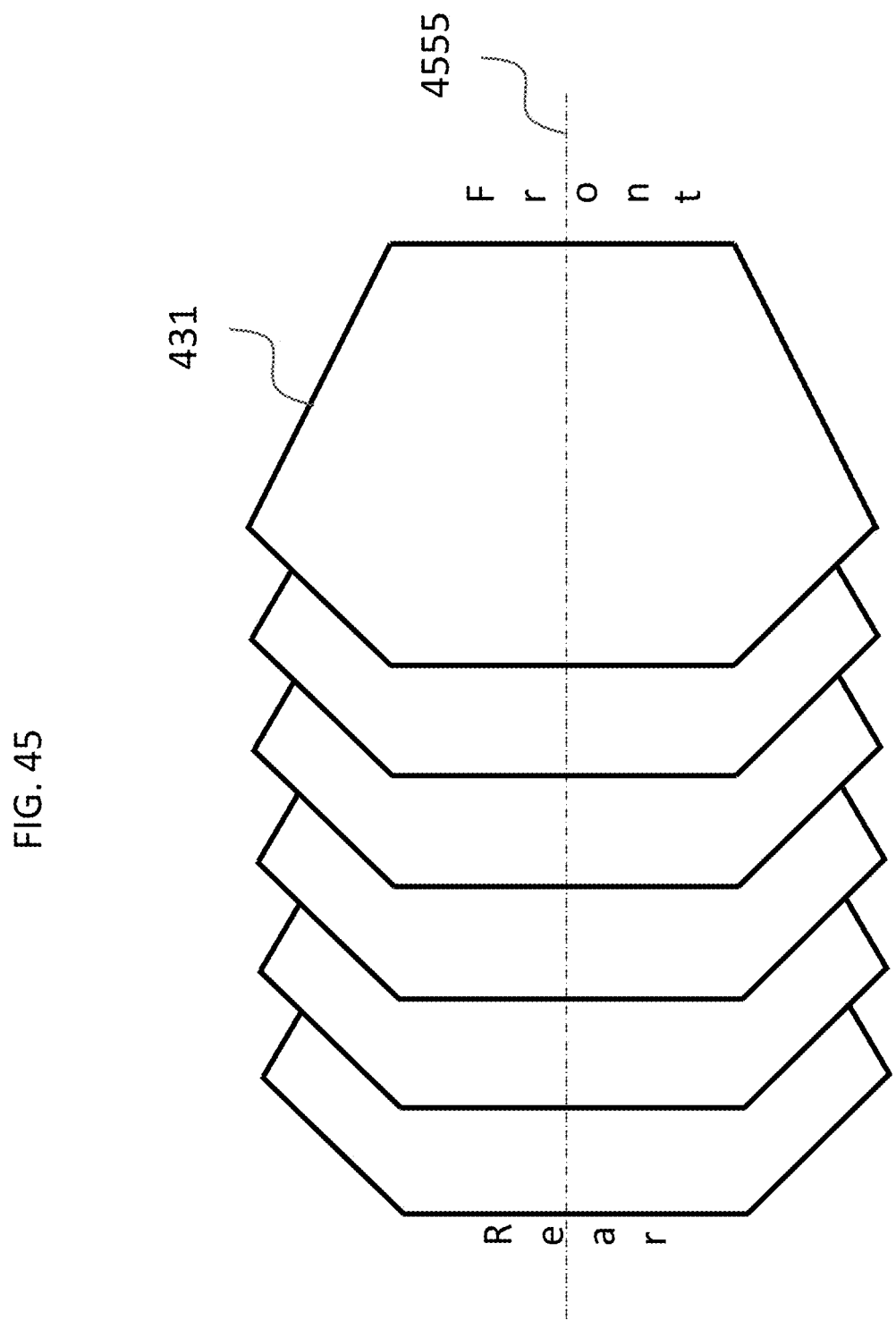

FIG. 45 depicts an exemplary embodiment of overlapping plates 431. In this regard, it can be seen that the plates 431 are generally the same size and generally the same shape. Here, six plates/segments are arrayed in the longitudinal direction, and in an exemplary embodiment, the plates can rise in unison in the manner of the dorsal fin detailed above. In this exemplary embodiment, the plates are curved scale like plates that in this embodiment, are symmetrically curved inward into the page on both sides of the axis 4555.

Figure 45A:
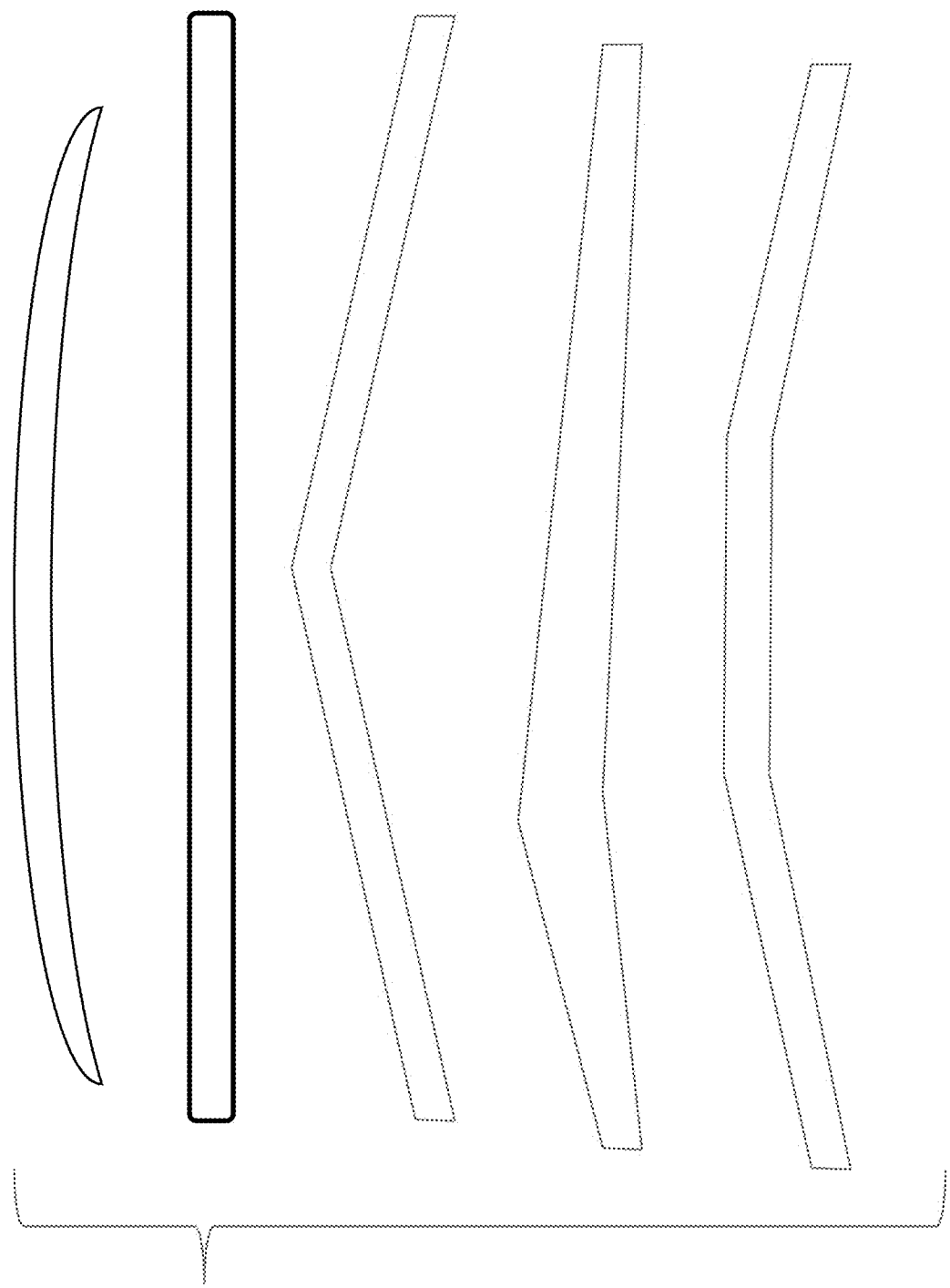

In this regard, FIG. 45A depicts exemplary cross-sections of some of the segments according to some embodiments, which cross-sections are taken normal to an axis extending from front to rear. Also, it is noted that a cross-section taken parallel to the axis extending from front to rear can also be compound, such as would be conducive to maintaining consistency with the shape of the nacelle. Any configuration or arrangement that can enable the teachings detailed herein can be utilized in at least some exemplary embodiments.

That said, in an alternate embodiment, the nacelles are configured so that only some of the segments move or otherwise open, or more specifically, the nacelle is configured so that different numbers of segments can be moved depending on a given condition. With respect to the embodiment of FIG. 45, in an exemplary embodiment, the nacelle can be configured to selectively raise or otherwise move one, two, three, four, five, or all six plates 431. Also, in an exemplary embodiment, the nacelle can be configured to raise or move the plates by different amounts. In an exemplary embodiment, each plate can have a separate actuator which can be individually controlled.

FIG. 46 presents an exemplary embodiment where the plates 447 are of different sizes but of the same general shape. Here, four plates are arrayed in a longitudinal direction. FIG. 47 presents another exemplary embodiment where plates 458 are of different sizes but of the same general shape, again these plates are arrayed in a longitudinal direction.

The plates can have a flat or curved or angled cross-section. Also, the plates can have compound shapes. Any arrangement that will enable the teachings detailed herein can be utilized in some embodiments. Also, while plates are described, other components can be utilized, such as blocks.

It is briefly noted that while the embodiments detailed for the most part up to this point are directed towards rigid plates or rigid segments, in an alternative embodiment, the segments can be configured so that they will bend or otherwise flex outward to open. In an exemplary embodiment, an elastomeric material can be utilized. Accordingly, in some embodiments, the segments utilize a living hinge arrangement. In some embodiments, the living hinge is isolated to a limited portion of the segment, while in other embodiments, is the entire segment that establishes a hinge. With respect to the latter, in an exemplary embodiment, the segment can curve outward in a parabolic manner from the mounting location to the structure of the nacelle (which part will likely not flex, because it could be bolted or riveted to the structure). With respect to the former, segments of the segments can be flexible, while other portions can be rigid. These flexible arrangements can also utilize an actuator or a common spline, etc., but also can be configured to open or close based on pressure differences (this is also the case with the rigid segments in some other embodiments). In these exemplary embodiments, the elastomeric arrangement can be biased in the closed position, and force is required to open. Conversely, in an exemplary embodiment, the elastomeric arrangement can be biased in the open position, and force is required to close (this could present a failsafe arrangement akin to the dead man break concept). It is also noted that both biasing techniques can be utilized with respect to the rigid segments as well. Is also noted that in some embodiments, there is no biasing—they can be like a fire door—the door can be held open and can be held shut.

While the embodiments detailed above have focused on an elastomeric arrangement, in another embodiment, a plastic deformation can be utilized. In this regard, in an exemplary embodiment, the segments can be arranged so that they will plastically to form in an emergency situation, such as in a scenario where there is a severe overtemp. By way of example only and not by way of limitation, some or all of the segments may never be opened except in an emergency scenario, where there will be structural failure with respect to the segments, but such will prevent failure or prolong the useful lifetime of the other components of the nacelle.

Figure 48:
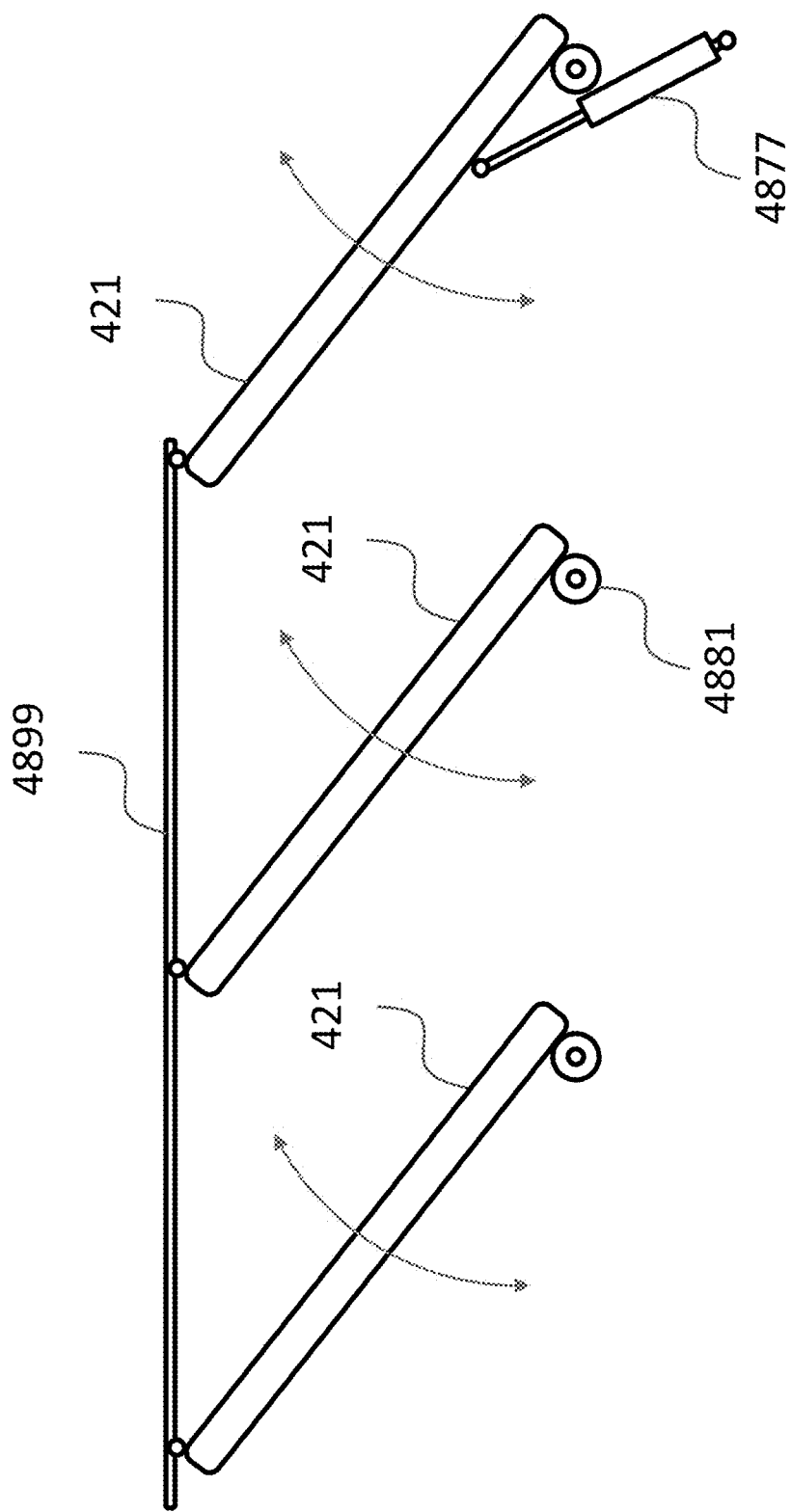
FIGS. 48-49 present exemplary systems of opening and/ or closing or otherwise moving exemplary segments.

FIG. 48 presents an exemplary embodiment where the plates 421 are splined together. Here, spline 4899 links the tips of each plate so that movement of one plate, such as the forward most plate, moves the remaining plates. Here, it can be seen that there is an actuator 4877, such as a hydraulic actuator and/or an electromagnetic actuator, that moves the first plate. Each plate is hinged at its base via hinge 4881. While this embodiment depicts a single actuator being utilized to control the location all of all of the plates, via the use of the spline 4899, in an alternative embodiment, as detailed above, separate actuators can be utilized for each separate plate such as that seen in FIG. 49, so that varying degrees of openness of each plate can be obtained and/or some plates can be opened while others are not opened.

Figure 49:
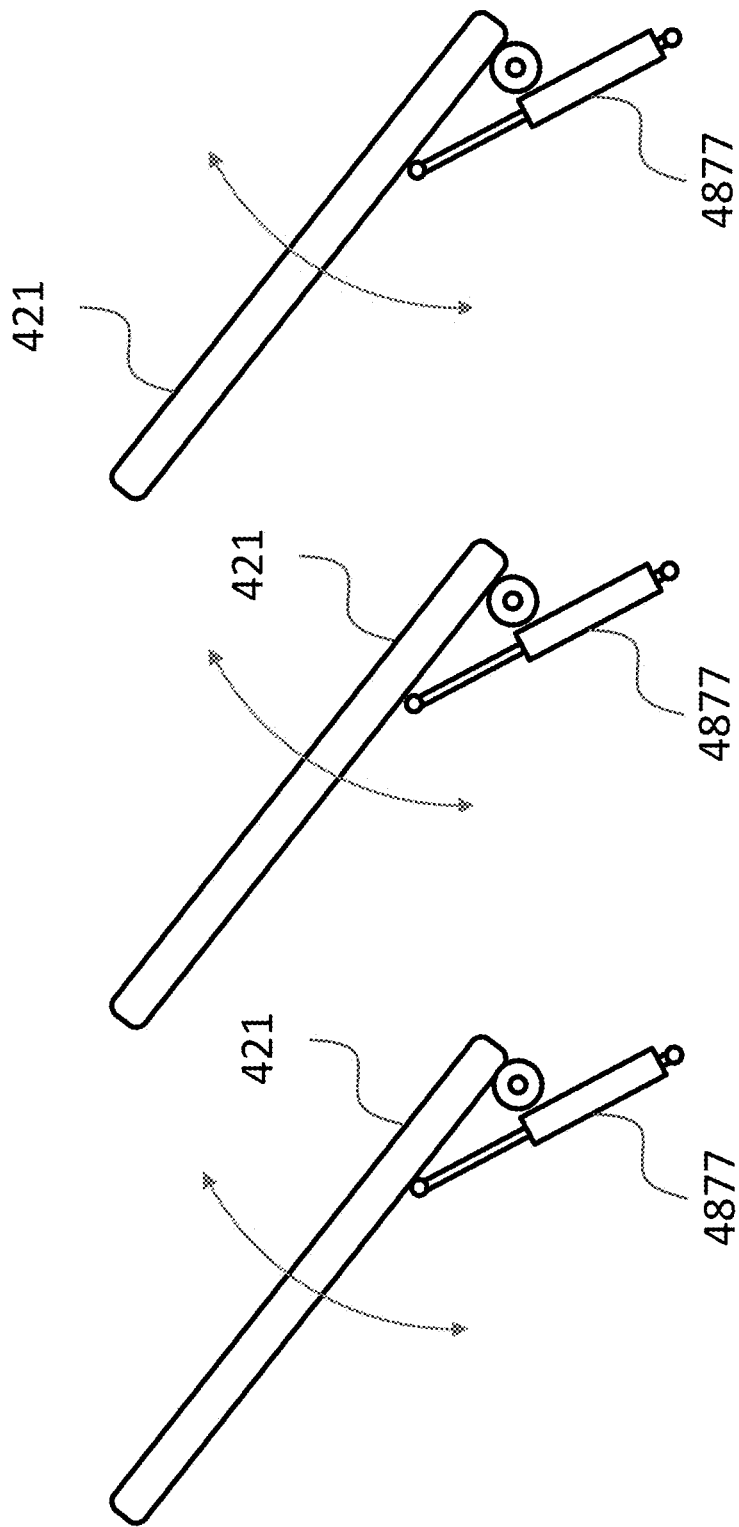

While the embodiments of FIGS. 48 and 49 depict a linear actuator, in an alternate embodiment, a torsional actuator can be utilized. Also, in an exemplary embodiment, the plates themselves can be piezoelectric benders or the like that flex open or closed upon the application of or the halting of an electric current there to. Any arrangement that can enable the movements of the plates can be utilized in at least some exemplary embodiments, providing that the art enable such.

It is also noted that groups of the segments can be present at different locations on the nacelle. By way of example only and not by way of limitation, in an exemplary embodiment, a first grouping of segments can be present at the forward section, and then a second grouping of segments can be present at the back section, with a space in between (1, 1.5, 2, 2.5, 3 feet, etc.). Additional groups can be present forward and/or in back of these groups, or group can be located in between. Forward, groups can be located about the lateral orientation of the nacelle.

Figure 50:
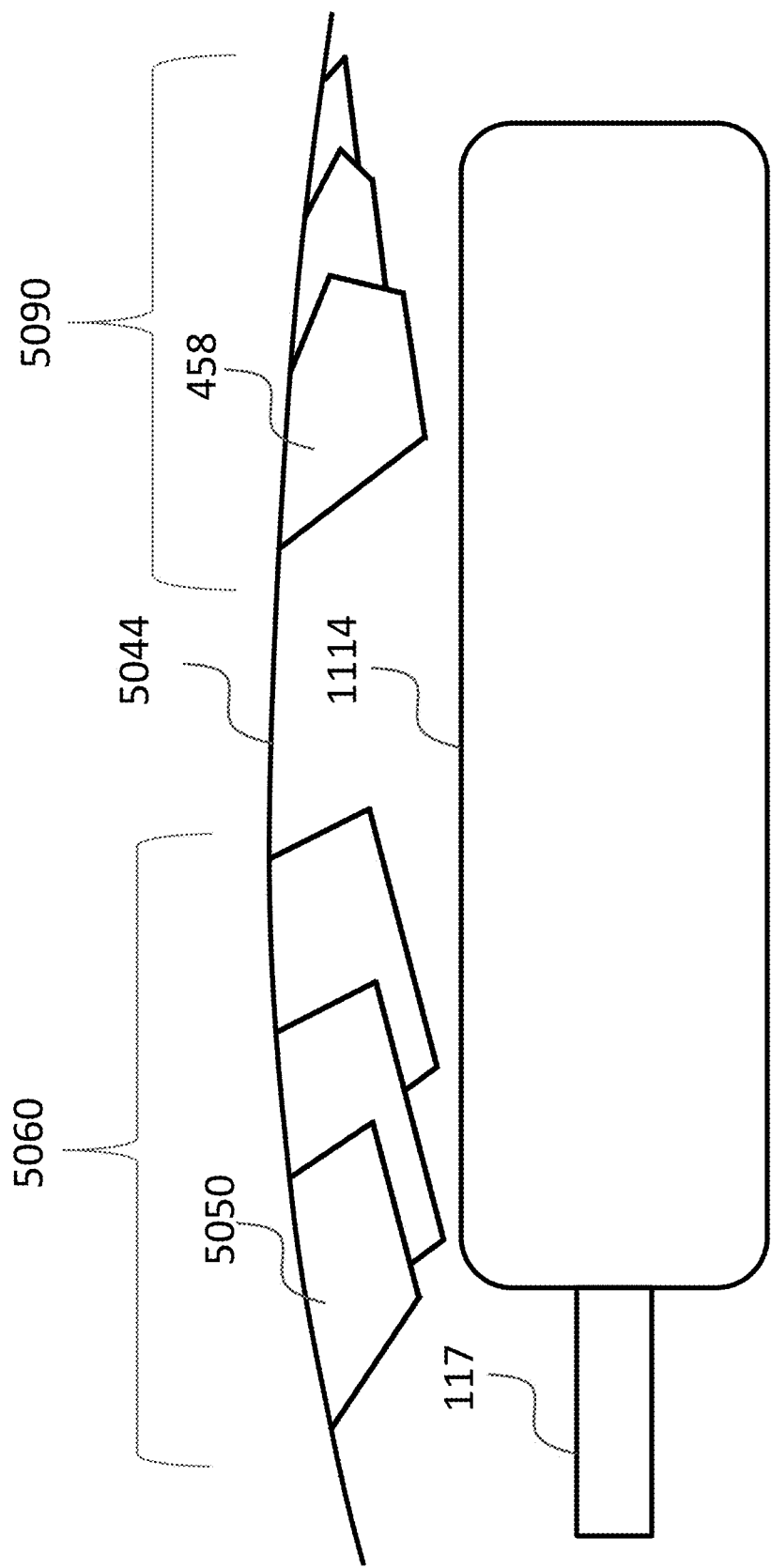
FIGS. 50-51 presents an exemplary embodiment utilizing the segments.

FIG. 50 depicts a conceptual view of an arrangement of plates 458 and plates 5050 establishing a cowling surface 5044 in relationship to the engine 1114, which in this exemplary embodiment, can be an internal combustion engine, or a jet engine or turboshaft engine, or an electric motor, etc. In this exemplary embodiment, there are two groups of segments that open, group 5090 and group 5070. The groups can be opened individually in an exemplary embodiment where the plates are linked to one another in individual groups. So, for example, in a scenario where some airflow was desired to be brought into the interior of the nacelle, but not a lot of airflow, group 5060 or group 5090 can be opened, but not both. Conversely, in a scenario where the ambient temperatures are very hot or otherwise sensors within the nacelle indicate high temperatures, both groups can be opened. It is noted that while some embodiments depicted herein have been disclosed as having plates/segments that can be opened at varying amounts. In some embodiments, it is a binary decision: either the segments are opened or they are closed. This can make the mechanical and/or control system simpler relative to that which would otherwise be the case, and thus achieve economy. Accordingly, there can be utilitarian value with respect to opening one group but not the other, as opposed to opening all of the plates a limited amount.

Figure 51:
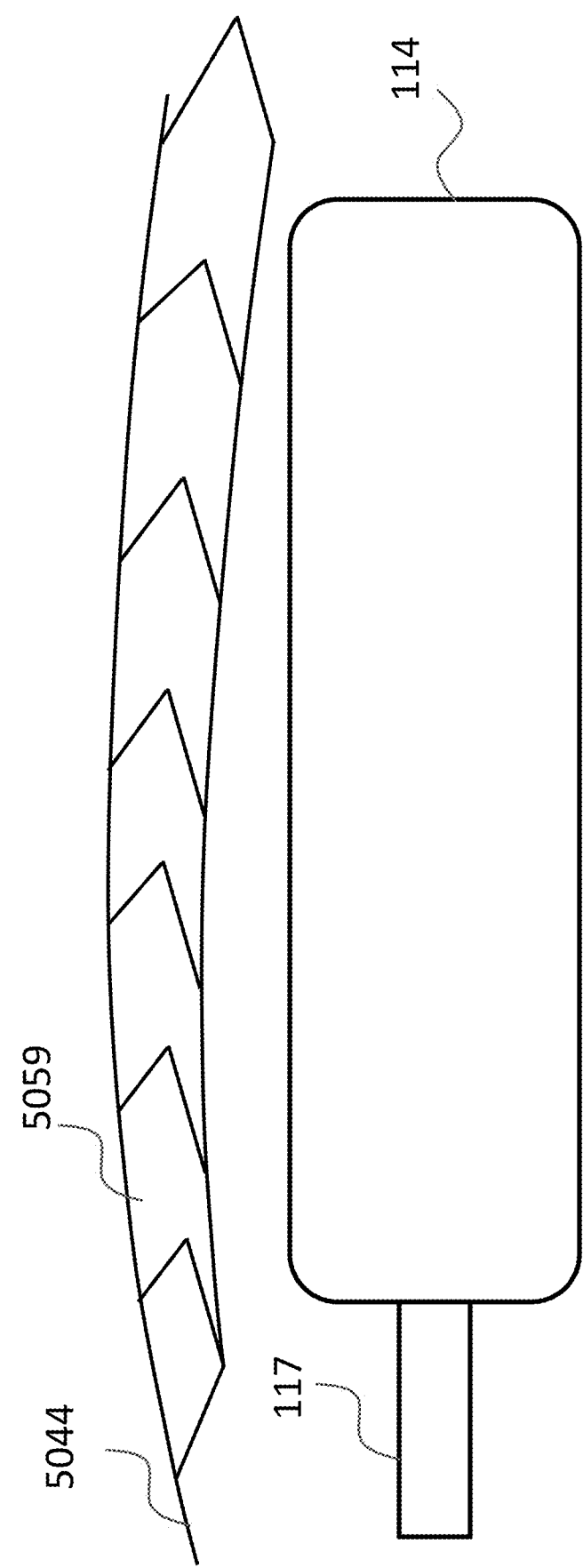

FIG. 51 depicts an alternate embodiment where the plates 5059 are arrayed forming a substantial amount of the cowling surface 5044—here, a surface that extends from in front of a forward most portion of the power plant 114 to a location extending in back of the power plant 114.

While the embodiments depicted above have, in some instances, utilized a spline or the like to link the plates, in another embodiment, the plates can be arrayed such that the opening of one plate opens the others, and owing to the geometries, even though one plate is directly against the other plate and so on, there can be opening for air to flow through. Accordingly, in an exemplary embodiment, the rearward most plate could be attached to an actuator, and the actuator to push that plate up, which would then in turn push the other plates up like a card pro could move cards by moving the end card, etc.

Figure 52:
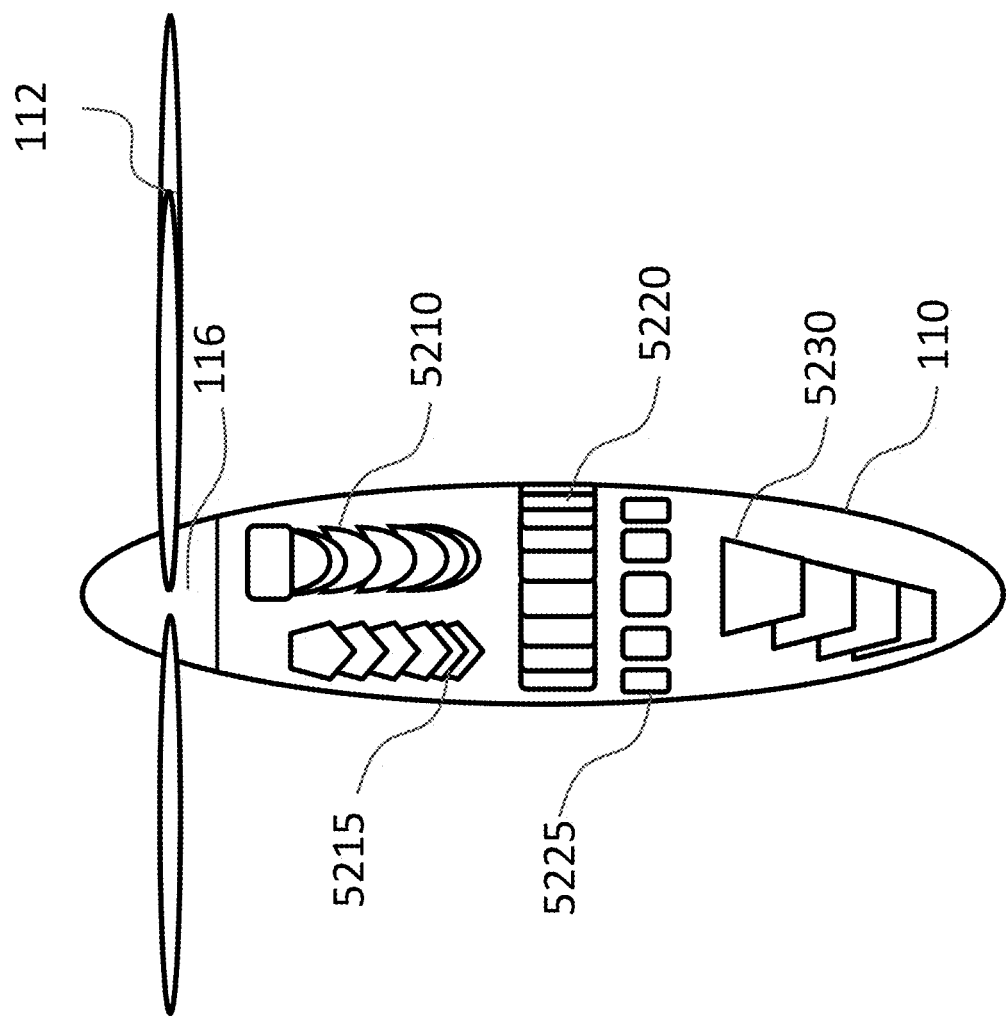
FIG. 52 presents a view of an exemplary nacelle and associated components.

FIG. 52 presents an exemplary embodiment where there are a plurality of groups of opening plates. Here, it can be seen that on the side of the nacelle facing the viewer, there is a first group 5210, and a second group 5215. These groups are aligned with one another in the longitudinal direction of the nacelle. These groups have plates of different configurations, and, with respect to the group 5210, it can be seen that plates of different configurations can be utilized within a single group. Also, it can be seen that the distances or otherwise the spacing of plates within a group can vary within a single group.

Also can be seen is group 5220, which is a group of plates that extend about the longitudinal axis, and thus extend laterally about the nacelle 110. These plates are an example of plates that will open and close in an arc that is 90° from the longitudinal axis. Still, it is to be understood that in an alternate embodiment, the arc could be aligned with the longitudinal axis. Indeed, in this regard, group 5225 shows a grouping of plates that have a minor gap between each other and can open with an arc that is on a plane of the longitudinal axis or can open with an arc that is normal to the plane of the longitudinal axis.

FIG. 52 also presents group 5230, which is a group of plates that extend both in the longitudinal direction and in the lateral direction, and that, as can be seen, will result in an opening that has a compound width of opening, owing to the fact that the last plate is smaller than the plates preceded.

In view of the above, it can be seen that in an exemplary embodiment, there is an assembly, comprising an aircraft motor apparatus including at least one motor (internal combustion engine, electric motor, jet, turboshaft, etc.) located within a protective structure, the protective structure having movable sub-structure components (the plates), wherein the portion of the aircraft motor apparatus is configured to move the movable sub-structure components to increase or decrease airflow through the protective structure, where, in an exemplary embodiment, the protective structure is a power plant nacelle.

In an exemplary embodiment, the sub-structure components establish at least a significant minority of a total surface area of the protective structure.

In an exemplary embodiment, the sub-structure establishes a surface area over the total surface area of the nacelle of at least 3, 4, 5, 6, 7, 8, 9, 10, 15, 20, 25, 30, 35, 40, 45, 50, 55, 60, 65, 70, 75, or 80 percent, or any value or range of values therebetween in 1% increments.

Concomitant with the embodiment of FIG. 48, in an exemplary embodiment, the sub-structure components are hingedly attached to a chassis of the protective structure, which hingedly attachment enables the sub-structure components to move. As seen in the embodiment of FIG. 52, the sub-structure components are arrayed like scales along at least one of a lateral direction or a longitudinal direction of the nacelle.

In an exemplary embodiment, the protective structure has a length that is at least TT times a width and the movable sub-structure components extend along at least MM percent of the length, where, for example, TT can be 1, 1.5, 2, 2.5, 3, 3.5, 4, 4.5, 5, 5.5, 6. 6.5, 7, 7.5, 8, 8.5, 9, 9.5, 10, 11, 12, 13, 14, or 15, or any value or range of values therebetween in 0.1 increments. In an exemplary embodiment, the width is at least 8, 8.5, 9, 9.5, 10, 11, 12, 13, 14, 15, 16, 17, 18, 19, 20, 24, 30, 36, 42, 48, or 56 inches, or any value or range of values therebetween in quarter-inch increments. In an exemplary embodiment, MM can be 5, 10, 15, 20, 25, 30, 35, 40, 45, 50, 55, 60, 65, 70, 75, 80, 85, 90, 95, or 100%, or any value or range of values therebetween in 1% increments.

In an exemplary embodiment, the aforementioned plates can be opened so as to increase an overall area of air inlet relative to that which is the case when all plates are closed by at least 10, 15, 20, 25, 30, 35, 40, 50, 60, 70, 80, 90, 100, 125, 150, 175, 200, 225, 250, 275, 300, 350, 400, 450, 500, 550, 600, 700, 800, 900, 1000, 1250, 1500, 1750, 2000, 2250, 2500, 2750, 3000, 3500, 4000, 4500, 5000, 5500, 6000, 6500, 7000, 7500, 8000, 8500, 9000, or 10,000 or more percent, or any value or range of values therebetween in 1% increments. In an exemplary embodiment, such results when all plates are open to the maximum extent. In an exemplary embodiment, such results when only some plates or open and/or only some plates are opened a full amount and others are only opened a partial amount or the plates are only opened if at all less than the full amount, etc. In an exemplary embodiment, the above qualitative results can be achieved via the results of opening in part or in full of at least 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, 70, 75, 80, 90, 100 or more segments on a given nacelle or any value or range of values therebetween in 1 segment increments.

In an exemplary embodiment, the plate/segment arrangements can increase a volumetric and/or mass flow by at least at least 10, 15, 20, 25, 30, 35, 40, 50, 60, 70, 80, 90, 100, 125, 150, 175, 200, 225, 250, 275, 300, 350, 400, 450, 500, 550, 600, 700, 800, 900, 1000, 1250, 1500, 1750, 2000, 2250, 2500, 2750, 3000, 3500, 4000, 4500, 5000, 5500, 6000, 6500, 7000, 7500, 8000, 8500, 9000, or 10,000 or more percent, or any value or range of values therebetween in 1% increment relative to that which would be the case without such (i.e., if there were no openings), all other things being equal (e.g., if there is a negative pressure creating device, such as a fan that sucks air into the interior, that device operates in both scenarios.

In an exemplary embodiment, the utilization of the segments, more accurately, the opening in the closing of the segments, can be utilized to achieve a natural or seminatural convection of cooling air into and/or out of the interior of the nacelles. In this exemplary arrangement, there is no forced air component that forces air into and/or out of the nacelles. That said, this does not mean that the rotor 112 does not drive airflow into or out of the nacelle. That is simply a natural part of the overall configuration. Still, as noted above, in an exemplary embodiment, there can be components that cause air to move, which components are delta to the rotary wing components of the aircraft.

In an exemplary embodiment, an onboard system, which can be implemented in a computer or a microprocessor or a processor, or otherwise in a computer apparatus, can be configured to receive input from sensors that are located in or proximate the nacelle, and can sense temperature or otherwise evaluate readings from the sensors. In an exemplary embodiment, the onboard system can evaluate the readings in the sensors, and determine whether or not there is utilitarian value to opening or otherwise adjusting the locations of the plates so as to cool or otherwise reduce the internal temperature. Accordingly, in an exemplary embodiment, there is an automated system that controls the opening and/or closing of the plates. That said, in an alternate embodiment, the system can be manual or can be a combination of the two. In this regard, it is noted that while the embodiments detailed above have focused on actuators and powered components to open the plates, in alternate embodiments, this can be done by hand. For example, a ground crew member can open or close or otherwise adjust the positions as utilitarian.

It is also noted that while the embodiments detailed above have focused on concepts where the plates open in a direction so that the opening is downstream or otherwise away from the flow of air, akin to the scales of a fish being directed downstream, in an alternate embodiment, the plates can open in the opposite direction, or in some embodiments, can actually rotate more than 90° so that a scoop effect or the like is present vis-à-vis the downward airflow from the rotors. Accordingly, in some embodiments, the plates can act as a scoop. Still further, in an exemplary embodiment, such as the embodiments where the plates open up/rotate in a plane that is normal to the longitudinal axis of the nacelles, there can be scoop features on the inside surfaces of the plates that scoop or otherwise direct air from the rotors into the nacelle. In this exemplary embodiment, these plates will remain closed during flight, owing to the scenario where the air could potentially damage these components during forward flight, but can be open when on the ground, so as to scoop or otherwise direct air from the rotors into the nacelle. There is utilitarian value with respect to utilizing the plates that open in the plane that is normal to the longitudinal axis because these plates still do not open up in the direction of the airflow during normal flight, and thus when they are closed, the tendency of the air to force the plates open will not be nearly as great as that which would otherwise be the case if these opened in the forward direction. Of course, the plates that open in in the rearward direction are most impervious to this phenomenon, but design trade-offs can be made in this regard.

As noted above, in an exemplary embodiment, there can be a cargo hold in an exemplary embodiment, the cargo hold (one single one and/or collectively) interior dimensions that do not exceed a volume of 1, 1.5, 2, 2.5, 3, 3.5, 4, 4.5, 5, 5.5, 6, 6.5, 7, 7.5, or 8 cubic feet, or any value or range of values therebetween in 1 cubic inch increments. Also, in an exemplary embodiment, the aircraft is configured such that the way to the cargo cannot exceed 20, 25, 30, 35, 40, 45, 50, 55, 60, 65, 70, 80, 90, 100, 125, 150, 175, 200, 225, 250, 275, or 300 pounds, or any value or range of values therebetween in 1 pound increments when the aircraft is fully loaded with fuel and in a normal operation state.

All of this said, other embodiments include aircraft that are configured to do that, but also configured to do other things. Accordingly, for example, the aforementioned volumes and weight limits may not be applicable. To be clear, these are directed towards exemplary limited embodiments, where other embodiments are not so limited.

Consistent with the teachings detailed herein, any one or more of the method actions detailed herein can be executed in an automated fashion unless otherwise specified. Conversely, any one or more of the method actions detailed herein can be executed in a manual fashion.

Embodiments include a pilotless vehicle, while in other embodiments, the vehicle is piloted. Some embodiments are directed towards a single pilot vehicle, while in other embodiments there is a dual pilot vehicle. Any disclosure herein of a single piloted vehicle, such as the embodiments detailed above showing only a single pilot seat, correspond to an alternative disclosure of a two pilot arrangement.

As noted above, exemplary embodiments are directed to transporting organs that are utilized in organ transplants, and more particularly, embodiments directed to the specialized regime of movement of organs, or more particularly, the packages/containers in which those organs are shipped/transported (typically, semi- or fully hermetically sealed chests/containers, with controlled climate features).

In an exemplary embodiment, the aircrafts detailed hearing are configured to transport one or more of respective specialized containers, such as containers approved by the United States FDA as of Apr. 12, 2020, for transport over a distance of more than 5, 10, 15, 20, 25, 30, 35, 40, 45, 50, 60, 70, 80, 90, 100, 125, 150, 175, 200, 250, 300, 350, 400, 500, 600, 700, 800, 900 or 1000 miles or more or any value or range of values there between in 1 mile increments, for a heart, a liver, a lung, a kidney, pancreas, intestine, middle ear, cornea, vascularized composite allografts, connective tissue, bone marrow, heart valves, bone, skin, etc., all in an FDA and medically approved manner (e.g., such as that which meets the requirements of the Commonwealth of Virginia on Apr. 12, 2020). In an exemplary embodiment, the containers are any container that meet the FDA requirements and/or the Code of Federal Regulations, Title 21 as a whole and/or specifically parts 800 to 898 thereof on Apr. 12, 2020 and/or are any one or more container models available for purchase and/or use in the United States as approved by the FDA, if so required, in the European Union and United Kingdom and/or Japan as approved by the comparable regulatory agency to the FDA, if so required, on Apr. 12, 2020. In an exemplary embodiment, the containers are any one or more container models available for purchase from United Therapeutics™, TransMedics™, Transplant Biomedicals™, OrganOx™, Organ Assist B.V.™, Organ Recovery Systems Inc.™, Organ Transport System Inc.™, Bridge to Life Ltd.™ and Paragonix Technologies Inc.™, on Apr. 12, 2020.

In an exemplary embodiment, the aircraft is structurally configured so that any one or more of the above-noted organs located in any one or more of the above-noted containers can survive a crash landing in at least some scenarios such that the organ can still be transplanted into a human under the rules and regulations that exist in the United States on Apr. 12, 2020, such as those rules that exist in the Commonwealth of Virginia on that date. By way of example only and not by way of limitation, the aircraft can be configured such that the structure of the aircraft provides a deformable/collapsible energy absorbing structure akin to the energy absorbing car body by way of example and/or can include speed reducing/limiting structure and features. Further, the aforementioned noted roll features can be utilized to achieve this requirement. In an exemplary embodiment, such as in embodiments where the aircraft is a drone, or in embodiments where there is ample room in the cockpit 1200 for both a pilot and the aforementioned container or modified container that meets the requirements detailed above, the detachable cockpit 1200 (or in the case of a drone, element 1200 could be a cargo pod) could be utilized to achieve the survivability regime just detailed. In this regard, by way of example only and not by way of limitation, the structure of the cockpit (or cargo pod/body in the case of a drone) 1200 can be configured so as to provide the aforementioned survivability. Such can be achieved by implementing the roll feature of the cockpit/cargo pod 1200 detailed above/and/or the jettison features thereabout detailed above and/or by implementing energy absorbing features into the cockpit/cargo pod (springs, suspensions, crumple zones, etc.). Further, parachutes or other high drag bodies (wings that can extend upon jettisoning, etc.) can be utilized to slow the speed of a jettisoned/ejected cockpit/cargo pod 1200. In this regard, in an exemplary embodiment, upon an automatic and/or remote determination that an aircraft crash is inevitable or otherwise statistically likely, the cockpit/cargo pod 1200 can be jettisoned prior to crash and the aforementioned high drag features can be utilized to slow the descent velocity of the cockpit/cargo pod 1200 to a speed that will result in the aforementioned survivability of the organ(s).

Figure 54:
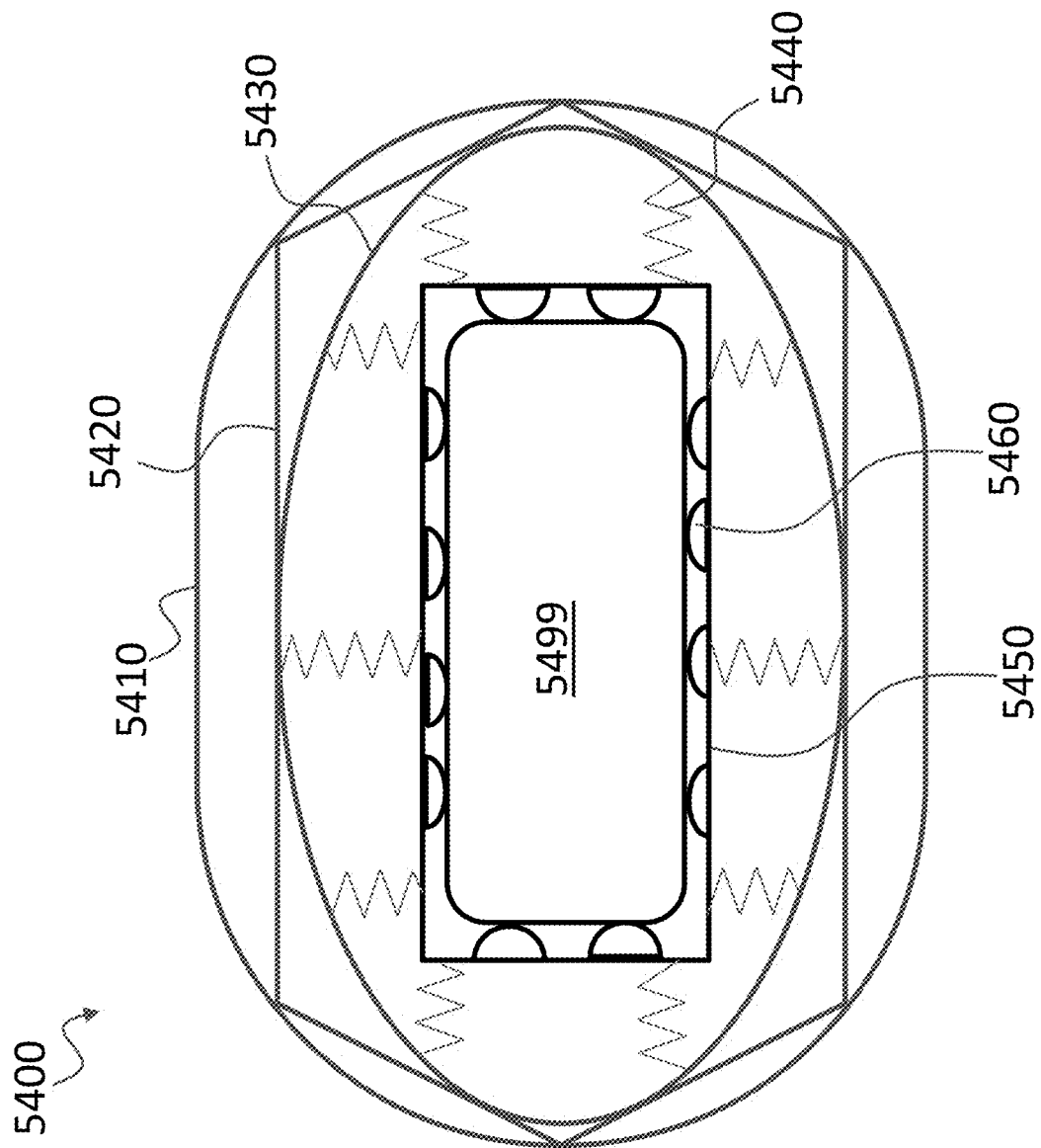
FIGS. 54-58 depict exemplary cargo handling features of some exemplary embodiments.

FIG. 54 provides an exemplary embodiment of a cargo pod 5400 which can take the place of cockpit 1200 detailed above, such as in the scenario where the aircraft detailed herein corresponds to a drone or remotely piloted aircraft. Located in the center is an exemplary container 5499 configured to transport organs. In an exemplary embodiment, the interior 5450 of the pod 5400 into which the container 5499 is placed can be reached via doors or the like or can be reached via a series of half shells corresponding to the components that will be described below which half shells can be attached to one another via mechanical couplings or the like.

The embodiment depicted in FIG. 54 provides a combination of shock absorbing and crumple zones along with the rolling features of the cockpit 1200 detailed above. Here, there is an outer skin 5410 which is constructed and arranged to enable the rolling detailed above. The outer skin is also configured to crumple and otherwise deflect so as to absorb energy in the event of a crash. Inside skin 5410 is a flexible frame 5420 which is also configured to both crumple and deflect in the event of a crash. The idea here is that the frame 5420 can partly reinforce the skin 5410 while also absorbing energy and providing a second barrier between ground and the interior compartment 5450.

Further, inside frame 5240 is a third frame 5430. As with frame 5420, 5430 is also configured to crumple and otherwise deflect so as to absorb energy in the event of a crash. Interior 5450, which can correspond to a more rigid structure, is supported inside frame 5430 via springs 5440. In this exemplary embodiment, springs 5440 are configured to provide the bulk of the resilient support for the interior compartment 5450, and otherwise permit the interior compartment 5450 to move a fair amount in the event of a deceleration associated with a crash. Interior compartment 5450 also includes brace elements 5460 which can also provide a crumple zone or otherwise provide a deflection zone to absorb additional energy. Still, the primary utility of brace elements 5460 is to secure the container 5499 in the interior compartment 5450 in the X, Y, and Z axes. It is also noted that while the embodiment shown in FIG. 54 presents a cross-section in the Y-Z plane, the components shown in the cross-section will also be applicable in the X-Y plane (i.e., the shock absorbing/crumple components are located all about the interior compartment and the container 5499).

Accordingly, in the event of a crash, deceleration experienced by the container 5499, and thus the organs contained therein, can be significantly reduced relative to that which would otherwise be the case.

In an exemplary embodiment, the aircraft is configured so as to enable the survivability of an organ contained in one or more of the aforementioned containers and/or equivalents upon an impact of the aircraft onto a ground surface that is flat and level and all grass (no trees) and is earth not paved or rolled and not compacted which impact occurs at a trajectory speed (the vector in the X and Y axis at impact, as opposed to the X component and the Y component) of greater than or equal to 50, 55, 60, 65, 70, 75, 80, 85, 90, 95, 100, 110, 120, 130, 140, 150, 160 or 170 MPH or any value or range of values therebetween in 1 MPH increments where the trajectory speed is angled from the horizontal by less than, greater than or equal to 5, 10, 15, 20, 25, 30, 35, 40, 45, 50, 55, 60 or 65 degrees or any value or range of values therebetween in 1 degree increments. In an exemplary embodiment, the aircraft is configured so as to enable the survivability of an organ contained in one or more of the aforementioned containers and/or equivalents upon an impact onto a concrete surface of an interstate highway in the Commonwealth of Virginia which impact occurs at a trajectory speed of greater than or equal to 40, 45, 50, 55, 60, 65, 70, 75, 80, 85, 90, 95, 100, 110 or 120 MPH or any value or range of values therebetween in 1 MPH increments where the trajectory speed is angled from the horizontal by less than, greater than or equal to 5, 10, 15, 20, 25, 30, 35, 40, 45 or 50 degrees or any value or range of values therebetween in 1 degree increments.

In an exemplary embodiment, the cockpit/cargo pod 1200 and/or variations thereof are configured so as to enable, subsequent to jettison/detachment from the remainder of the aircraft, the survivability of an organ contained in one or more of the aforementioned containers and/or equivalents upon an impact of the aircraft onto a ground surface that is flat and level and all grass (no trees) and is earth not paved or rolled and not compacted which impact occurs at a trajectory speed of less greater than or equal to 50, 55, 60, 65, 70, 75, 80, 85, 90, 95, 100, 110, 120, 130, 140, 150, 160 or 170 MPH or any value or range of values therebetween in 1 MPH increments where the trajectory speed is angled from the horizontal by less than, greater than or equal to 5, 10, 15, 20, 25, 30, 35, 40, 45, 50, 55, 60 or 65 degrees or any value or range of values therebetween in 1 degree increments. In an exemplary embodiment, the cockpit/cargo pod 1200 and variations thereof are configured so as to enable, subsequent to jettison/detachment from the remainder of the aircraft, the survivability of an organ contained in one or more of the aforementioned containers and/or equivalents upon an impact onto a concrete surface of an interstate highway in the Commonwealth of Virginia which impact occurs at a trajectory speed of greater than or equal to 40, 45, 50, 55, 60, 65, 70, 75, 80, 85, 90, 95, 100, 110 or 120 MPH or any value or range of values therebetween in 1 MPH increments where the trajectory speed is angled from the horizontal by less than, greater than or equal to 5, 10, 15, 20, 25, 30, 35, 40, 45 or 50 degrees or any value or range of values therebetween in 1 degree increments.

Figure 55:
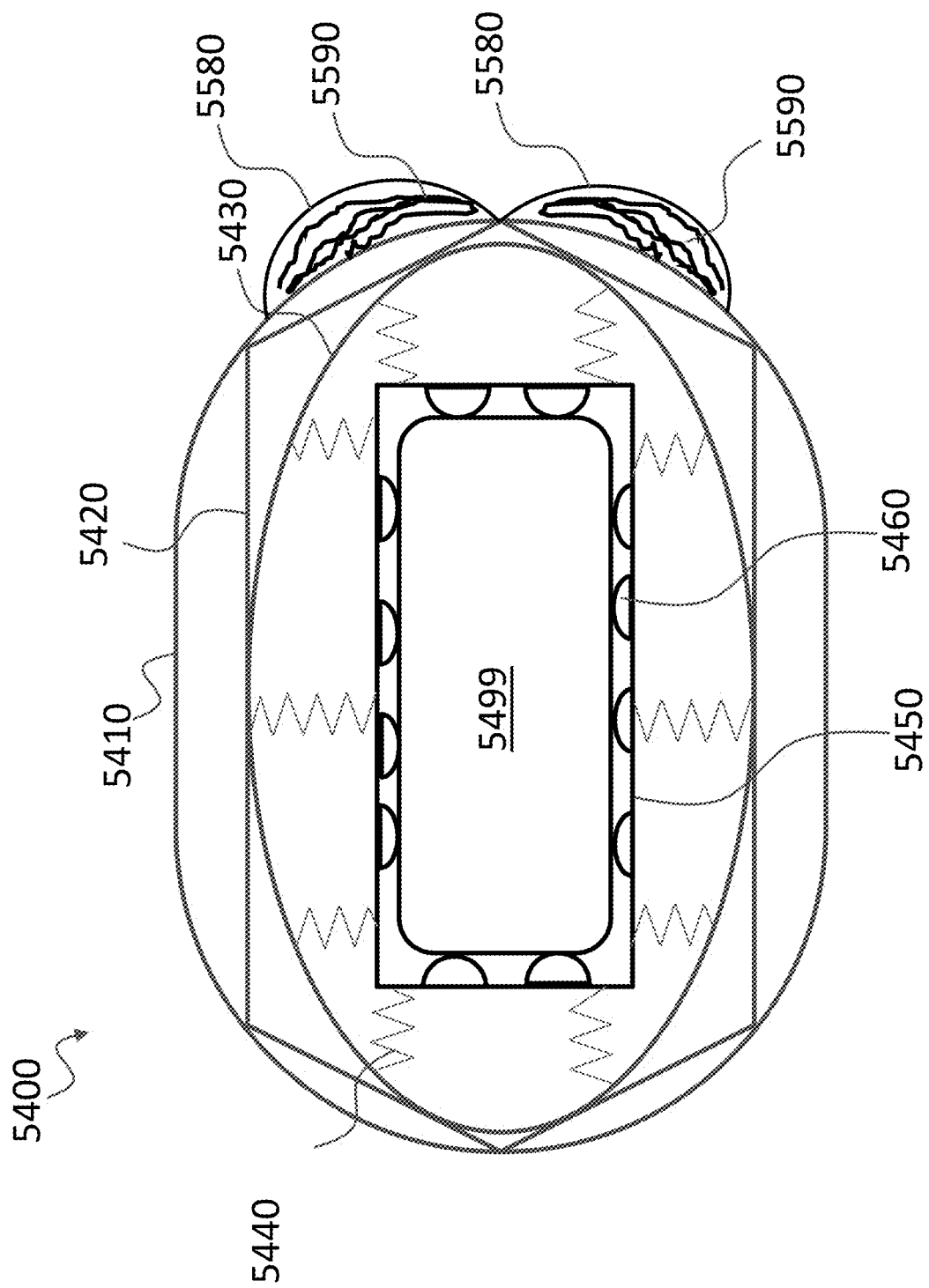

In an exemplary embodiment, the aforementioned cockpit/cargo pod is configured such that fall from 1000 feet above and onto grass ground flat and level and unrolled and uncompacted as noted above results in a maximum deceleration of the container containing the organ of no more than 5, 6, 7, 8, 9, 10, 11, 12, 13, 14, 15, 16, 17, 18, 19, 20, 21, 22, 23, 24 or 25 Gs. In an exemplary embodiment, the aforementioned cockpit/cargo pod is configured such that fall from 1000 feet above and onto an interstate highway flat and level as noted above results in a maximum deceleration of the container containing the organ of no more than 10, 11, 12, 13, 14, 15, 16, 17, 18, 19, 20, 21, 22, 23, 24, 25, 26, 27, 28, 29 or 30 Gs. In an exemplary embodiment, the aforementioned values can be achieved because the cockpit/cargo pod 1200 includes high drag components, such as a parachute and/or extendable solid drag components such as wings. By way of example only and not by way of limitation, FIG. 55 depicts the exemplary cargo pod 5400 detailed above, with the addition of parachute blisters 5580 which contain parachutes 5590. In the events of a scenario where it is believed that the aircraft will ultimately crash, upon jettisoning the cargo pod 5400, the parachutes 5580 can deploy. In an exemplary embodiment, the aforementioned values can be achieved because the cockpit/cargo pod 1200 is configured to crumple upon impact and/or is configured as an energy absorbing body and/or includes energy absorbing structure supporting the container. Still, as is with the embodiment of FIG. 55, the aforementioned values can be achieved via a combination of these features.

Figure 56:
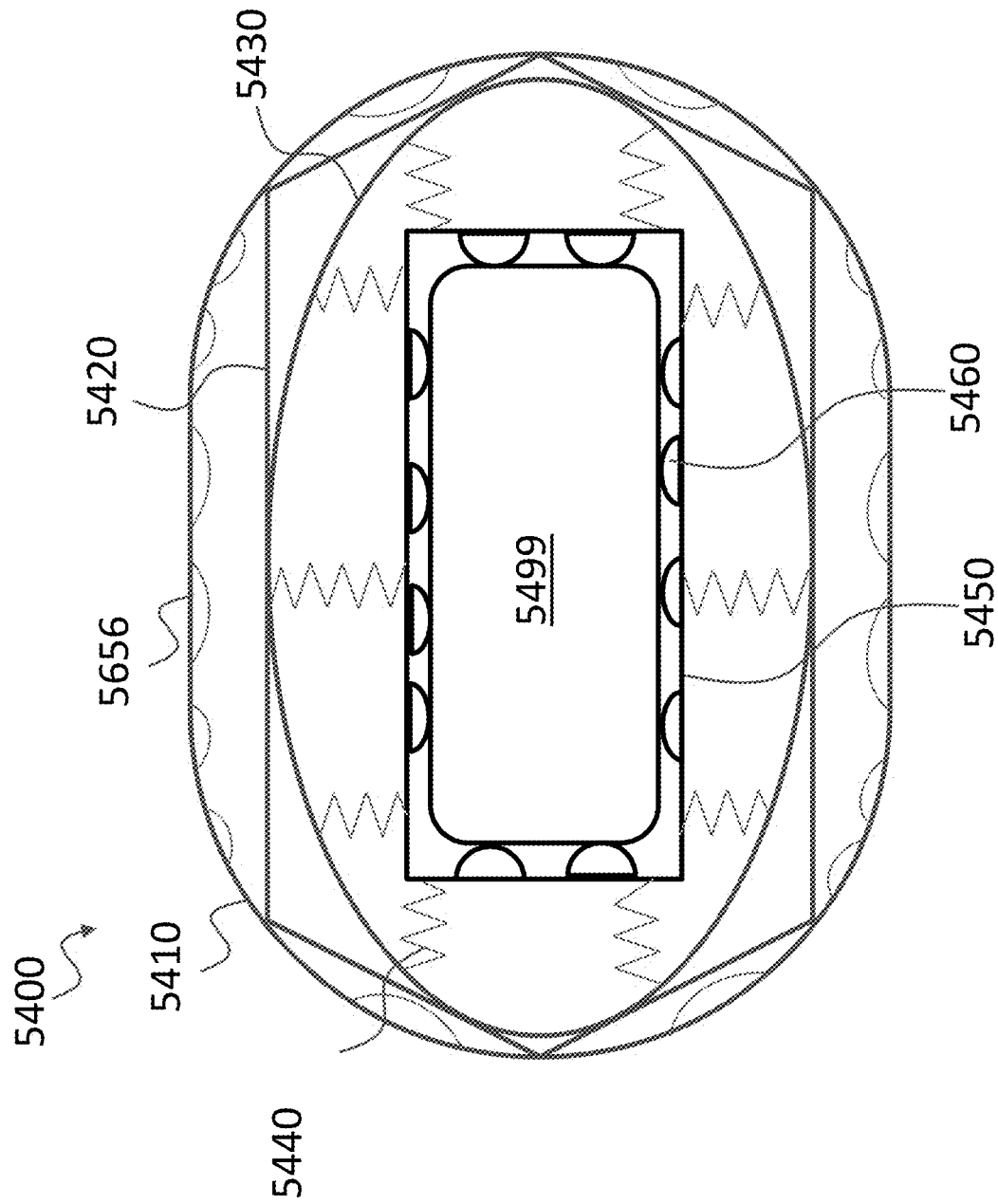
Figure 57:
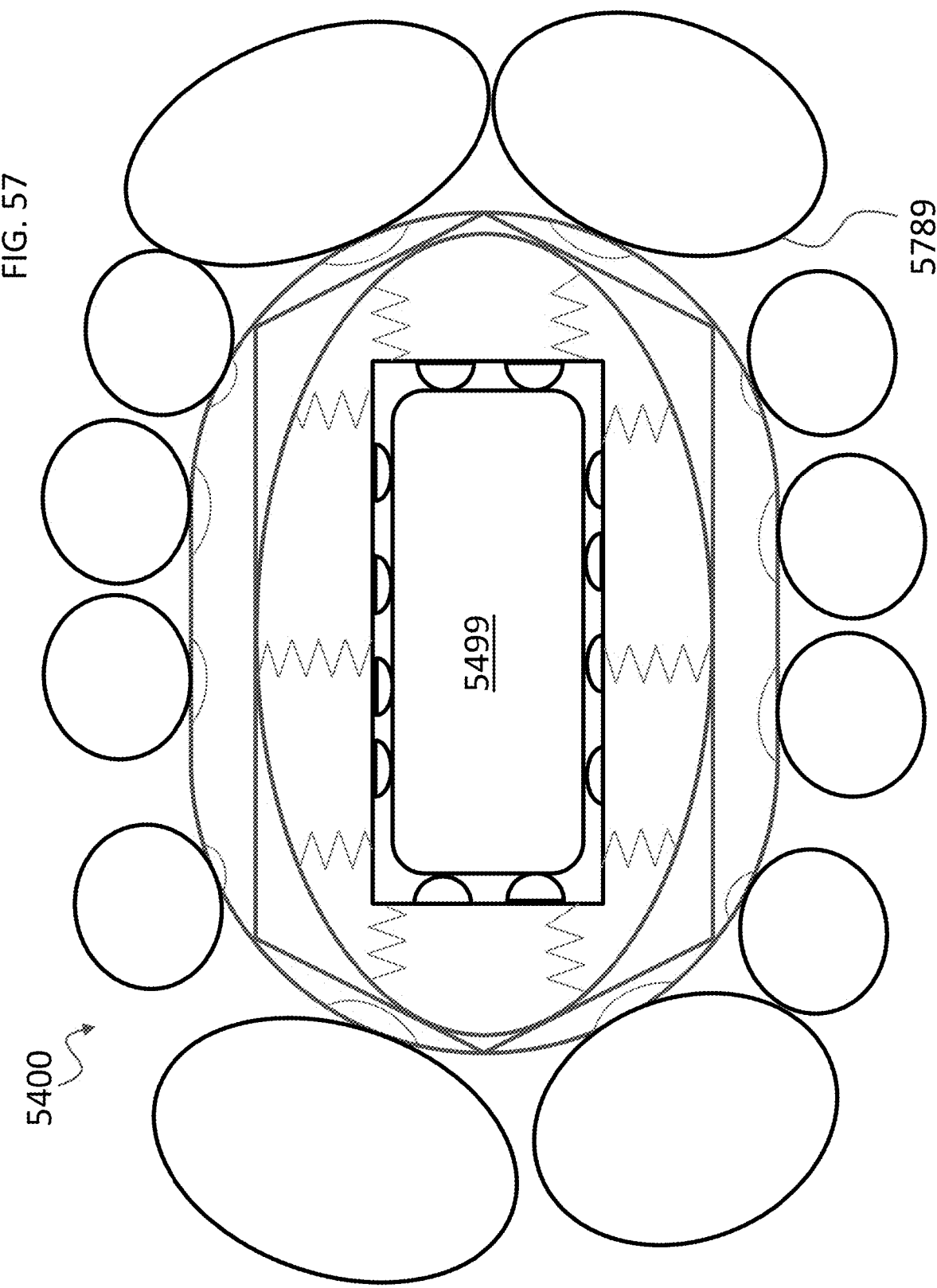

FIG. 56 presents another exemplary embodiment of a cargo pod 5400 that includes airbag components 5656 arrayed about the periphery of the outer shell 5410. In an exemplary embodiment, the cargo pod 5400 can be configured to land in a manner analogous to so called "tumbler" or "bouncer" Mars Landers. More specifically, the cargo pod 5400 can be configured to deploy in the airbags (made out of Vectran, for example, as was used on the Mars Exploration Rover) before impact on the ground to provide further cushioning of the container 5499. FIG. 57 depicts an exemplary embodiment of airbags 5789 deployed immediately before impact. The bags 5789 absorb additional energy and further slow the deceleration relative to that which would otherwise be the case, thus resulting in lower G forces applied to the organs located in container 5499.

Figure 58:
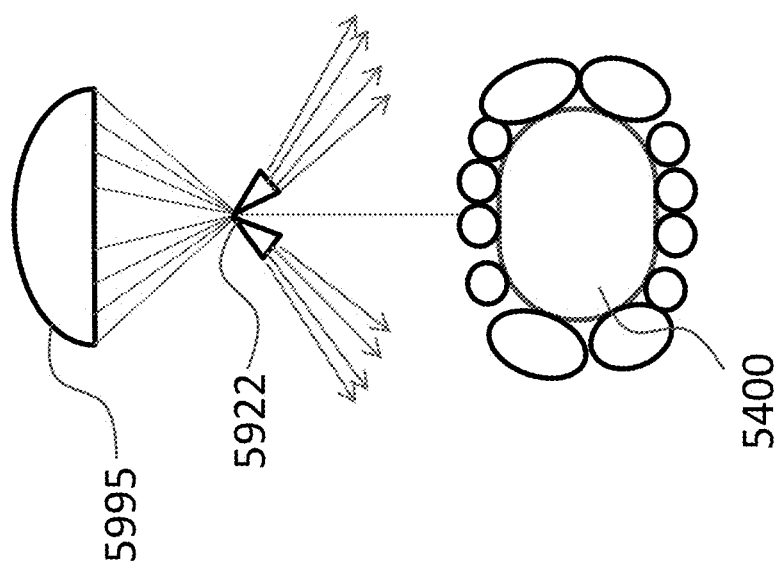

Still further in utilizing Mars Landing techniques, FIG. 58 depicts an exemplary embodiment where the cargo pod 5400 has jettison from the rest of the aircraft in the airbags have been deployed. Further, a parachute apparatus 5995 has been deployed as seen, which slows the overall dissent of the cargo pod 5400. In the embodiment depicted in FIG. 58, miniaturized retrorockets 5922 can be seen located between the parachute canopy and the cargo pod. In an exemplary embodiment, shortly before contact with the ground of the cargo pod 5400, the retrorockets 5922 are fired, as is schematically indicated by the arrows pointing downward and outward, further slowing the descent of the cargo pod 5400. The retrorockets 5922 can be of small size so as to be used in a safe and otherwise obtrusive manner as possible.

In an exemplary embodiment, the length of the aircraft is less than, equal to or greater than 10, 15, 20, 25 or 30 feet or any value or range of value therebetween in 1 foot increments. The weight of the aircraft can be less than, greater than or equal to 1000, 1500, 2000, 2500, 3000, 3500, 4000, 4500, 5000, 5500, 6000, 6500, 7000, 7500, 8000, 8500, 9000, 9500 or 10000 pounds or any value or range of values therebetween in 1 pound increments, and the empty weight can be less than, greater than or equal to 500, 1000, 1500, 2000, 2500, 3000, 3500, 4000, 4500, 5000, 5500, 6000, 6500, 7000, 7500, 8000, 8500 or 9000 pounds or any value or range of values therebetween in 1 pound increments. The maximum cruise speed can be 100, 125, 150, 175, 200, 250, 300, 350 knots or any value or range of values therebetween in 1 knot increments. The maximum range at max weight can be 50, 75, 100, 150, 200, 250, 300, 350, 400, 450, 500, 550 or 600 or more nautical miles or any value or range of values therebetween in 1 nm increments.

While the above embodiment has been directed towards a jettisonable cargo pod in place of cockpit 1200, it is noted that any or all of the teachings detailed above can be applicable to a cargo pod located elsewhere on the aircraft, providing that the art enable such. Also, at least some of the teachings detailed above associated with the jettisonable cargo pod can be applicable to a non-jettisonable cargo hold or the like. In this regard, the collapsible and/or resilient features detailed herein can be utilized in the cargo hold of the aircraft, by way of example. Further, the teachings of the parachute and/or the airbags and/or the retrorockets can be applicable to the entire aircraft. Indeed, as noted herein, any one or more embodiments disclosed herein can be combined with any one or more other embodiments detailed herein providing that the art enable such, at least in some exemplary embodiments.

Figure 59:
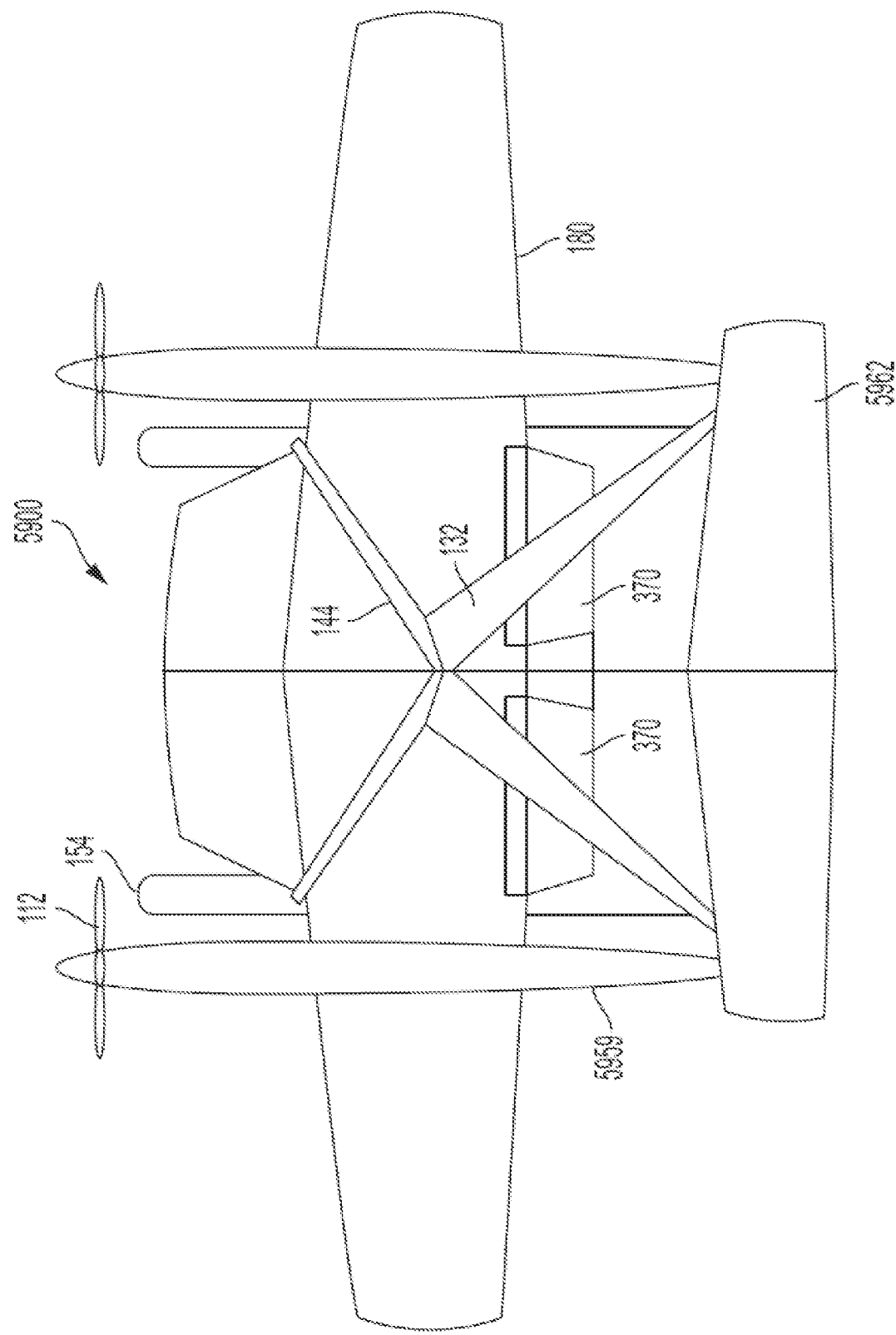

FIG. 59 presents an alternate exemplary embodiment of an aircraft 5900. Here, there are nacelle/booms 5959 that extend from the rotors 112 to the tail 5962/support the tail 5962. In this exemplary embodiment, this is not a tilt rotor, and instead, can take off and/or land in a traditional manner for an airplane/in a traditional non-VTOL (Vertical Take Off and Landing). That said, in an alternate embodiment, the ducted fans 370 can be utilized to achieve the vertical take-off and/or landing and/or to achieve a VSTOL (Vertical Short Take Off and Landing) functionality. Conversely, in at least some exemplary embodiments, as will be described below, the forward portions of the nacelles/booms 5959 can tilt to achieve the tilt rotor effect in a manner concomitant with the teachings detailed above. By way of example, the booms 5959 can tilt at a location midway between the wing 180 and the rotors 122, or at a location 5% to 95% or any value or range of values therebetween in 1% increments of the distance between the forward edge of the wing 180 and the rear portion of the rotor 122, and other embodiments, the pivot point can be located forward or aft of those locations. Any location that can enable the teachings detailed herein with respect to pivoting of the rotors can utilized in at least some exemplary embodiments.

Figure 60:
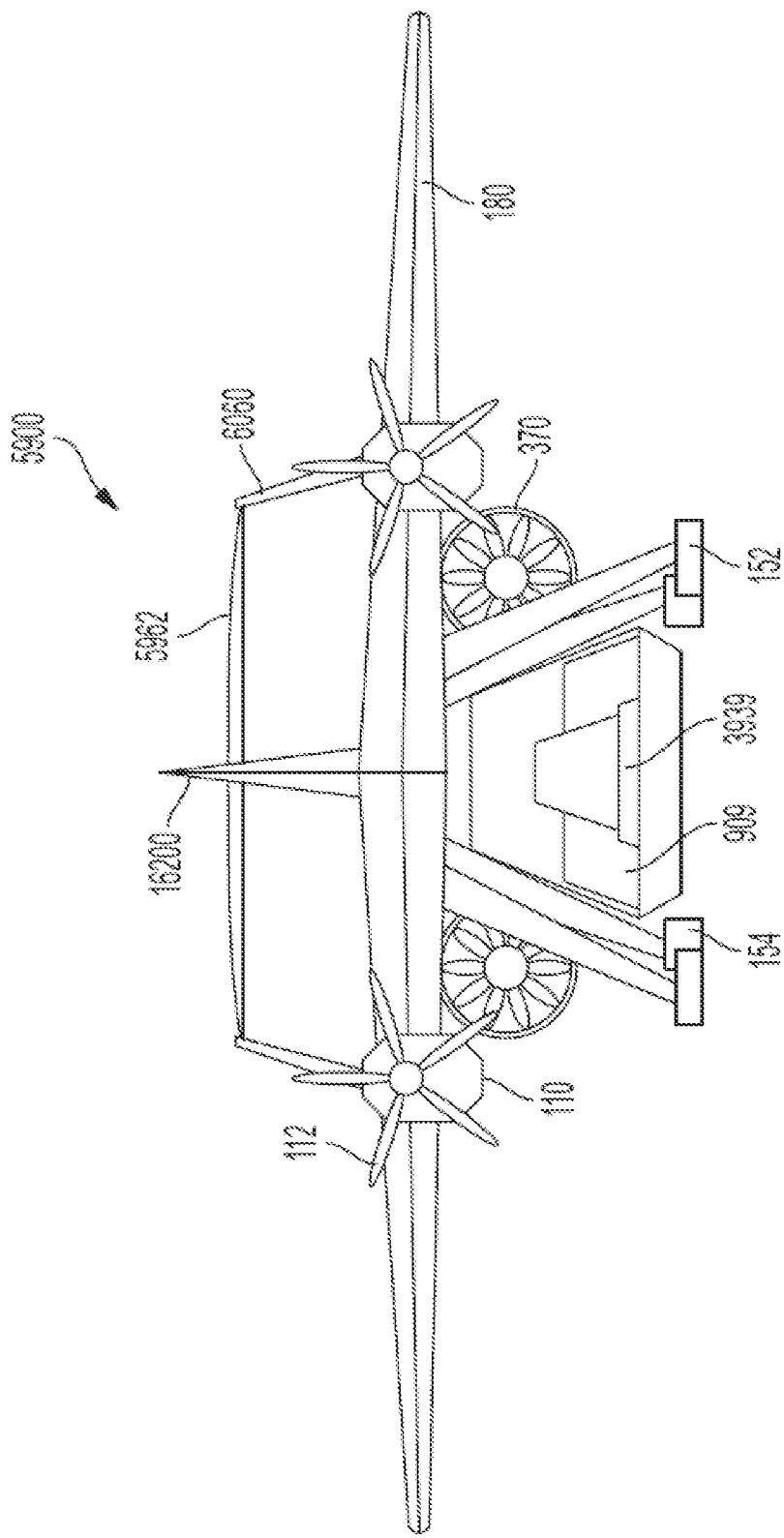

Also seen in FIG. 59 is a modified tail relative to the embodiments detailed above. Here, it can be seen that the horizontal stabilizer 5962 extends from the right boom 5959 to the left boom. Also, in this exemplary embodiment, the base portion 144 of the Y can also support a portion of the horizontal stabilizer. That said, in an alternate embodiment, the base portion 144 can instead only support the vertical stabilizer. That said, in an exemplary embodiment, the horizontal stabilizer in the vertical stabilizer can be entirely supported by the booms 5959. Still, in some embodiments, a combination of the booms 5959 and the base portion 144 can be utilized to support the horizontal and/or vertical stabilizers. And while FIG. 60 depicts the vertical stabilizer 16200 located in the center, in an alternate embodiment, the vertical stabilizer 16200 can be located at the sides/can be instead vertical stabilizer 6060. Still, in the exemplary embodiment shown, there are three vertical stabilizers. As seen, the vertical stabilizers on the outboard portions 6060 extend upward from the booms to support the horizontal stabilizer 5962 in combination with the central vertical stabilizer 16200. And in this exemplary embodiment, the vertical stabilizer 16200 extends from the base portion 144 of the Y to the horizontal stabilizer 5962. In an exemplary embodiment, the vertical stabilizer 16200 is a part of the base portion 14 that simply extends up to the horizontal stabilizer 5920.

FIG. 60 shows the cargo sections 909. In this exemplary embodiment, the cargo section extends all the way from one side of the pilot seat 3939 to the other side of the pilot seat and back of the pilot seat 3939. Conversely, in an exemplary embodiment, two separate cargo sections 909 can be located behind the pilot seat. That is, in an exemplary embodiment, the cargo sections can bifurcated. Such could be utilitarian with respect to the establishment of a structural component between the two cargo sections, that might, for example, support the pilot seat and the cockpit. Still further, in an exemplary embodiment, the two cargo sections can be located somewhat side-by-side with respect to the pilot seat 3939. In this exemplary embodiment, the cargo sections could be on either side and slightly to the rear of the pilot seat 3939. By way of example. This would be somewhat like a saddle pack arrangement for a horse or a motorcycle.

Figure 61:
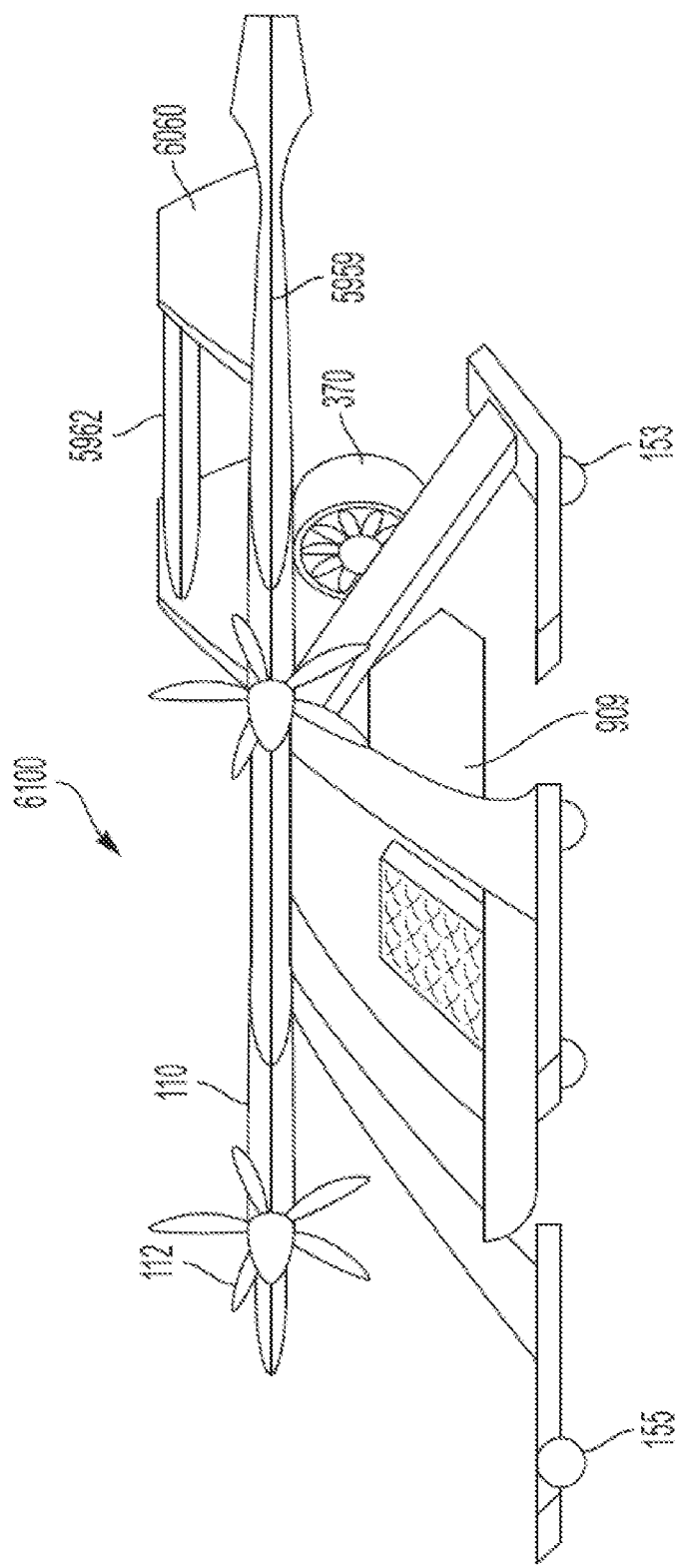

FIG. 61 depicts an exemplary embodiment of an aircraft 6100 where there is no central vertical stabilizer 16200. Still, consistent with any of the embodiments detailed herein, any feature disclosed herein can be combined with any other feature disclosed herein unless otherwise specified, providing that the art enable such. Accordingly, vertical stabilizer 61200 could be included in this embodiment.

Also as can be seen with the exemplary aircraft 6100 in the embodiment of FIG. 61, wheels 155 and 153 are located as generally shown that enables the aircraft to take off and land in a conventional manner. And in an exemplary embodiment, shock absorbing devices/suspension devices in a manner analogous to those of a conventional aircraft can be utilized. In an exemplary embodiment, the shock absorbing devices can be located in between the wheels and the X and Y frame structure. In an exemplary embodiment the structure of the X and/or Y frame can be configured to flex to provide the shock absorbing features. In an exemplary embodiment, a combination of the flexible X and Y frame structure and the dedicated shock absorbers can be utilized.

Still, it is noted that in an alternate embodiment, aircraft 6100 can be VTOL and/or VSTOL configured. In an exemplary embodiment, the rotors tilt in a manner as disclosed above or a variation thereof.

Figure 62:
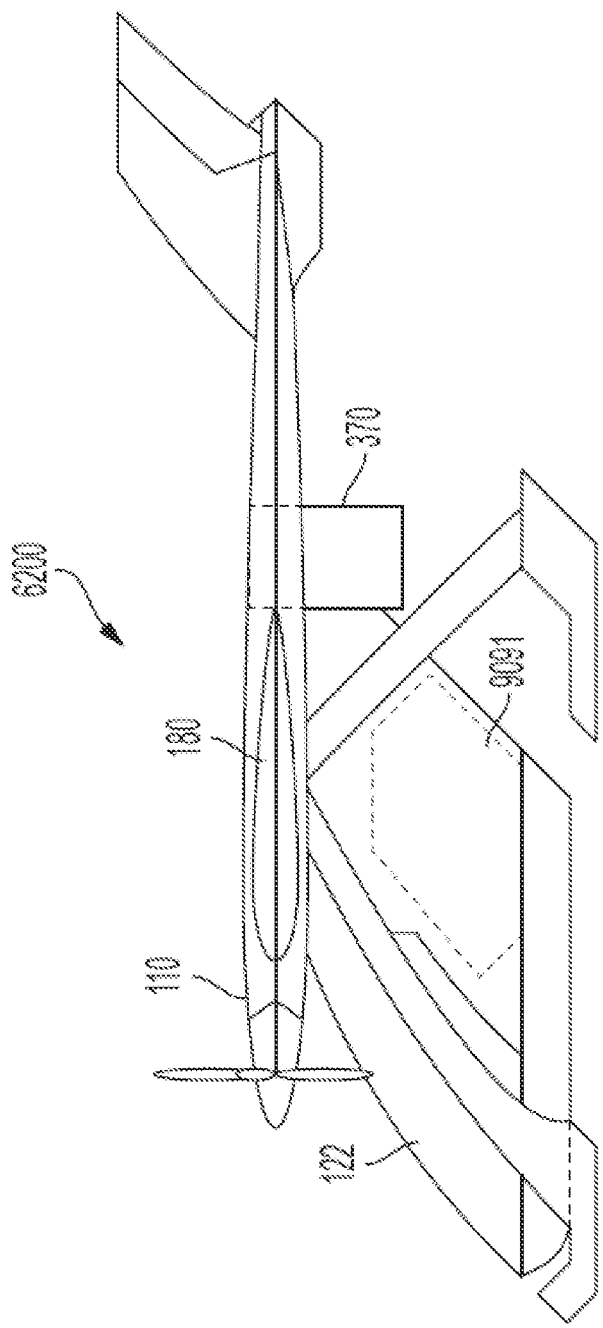

FIG. 62 depicts an exemplary aircraft 6200 according to an exemplary embodiment.

This arrangement is more compact relative to those detailed above as can be seen. In an exemplary embodiment, the ground interface components are arrayed at different heights so that upon fully landing, the aircraft 6200 is angled upward relative to the horizontal. This can have utilitarian value of respect to enabling the VTOL arrangements detailed herein. Here, it can be seen that the cargo 9091 is a container that is configured for quick placement in an quick removal from the aircraft 6200. In an exemplary embodiment, the aircraft 6200 is configured to enable the cargo to be captured and or released in an automated manner. In an exemplary embodiment, the cargo can be captured and/or released without support of ground crew by way of example. In an exemplary embodiment, capture and/or release is achieved totally under the control of the pilot from the cockpit 122. By way of example only and not by way limitation, in an exemplary scenario, the exemplary aircraft 6200 (or any other exemplary aircraft detailed herein), can be configured to land over or in front of a cargo container, and then can be configured to grip or otherwise capture the cargo container, and move the cargo container into the cargo hold or otherwise the action of landing enveloped the cargo container by the cargo hold. In an exemplary embodiment, upon landing, the cargo hold can open or otherwise the aircraft can release the cargo such that upon takeoff, the cargo remains at the landing location. In an alternative embodiment, the cargo can be "pushed" out of the aircraft or away from the aircraft. Any device system and/or method that will enable the action of cargo capture and/or cargo release in a manner that can be executed in an autonomous manner and/or under the control the pilot without any other person being involved can be utilized in at least some exemplary embodiments.

Figure 63:
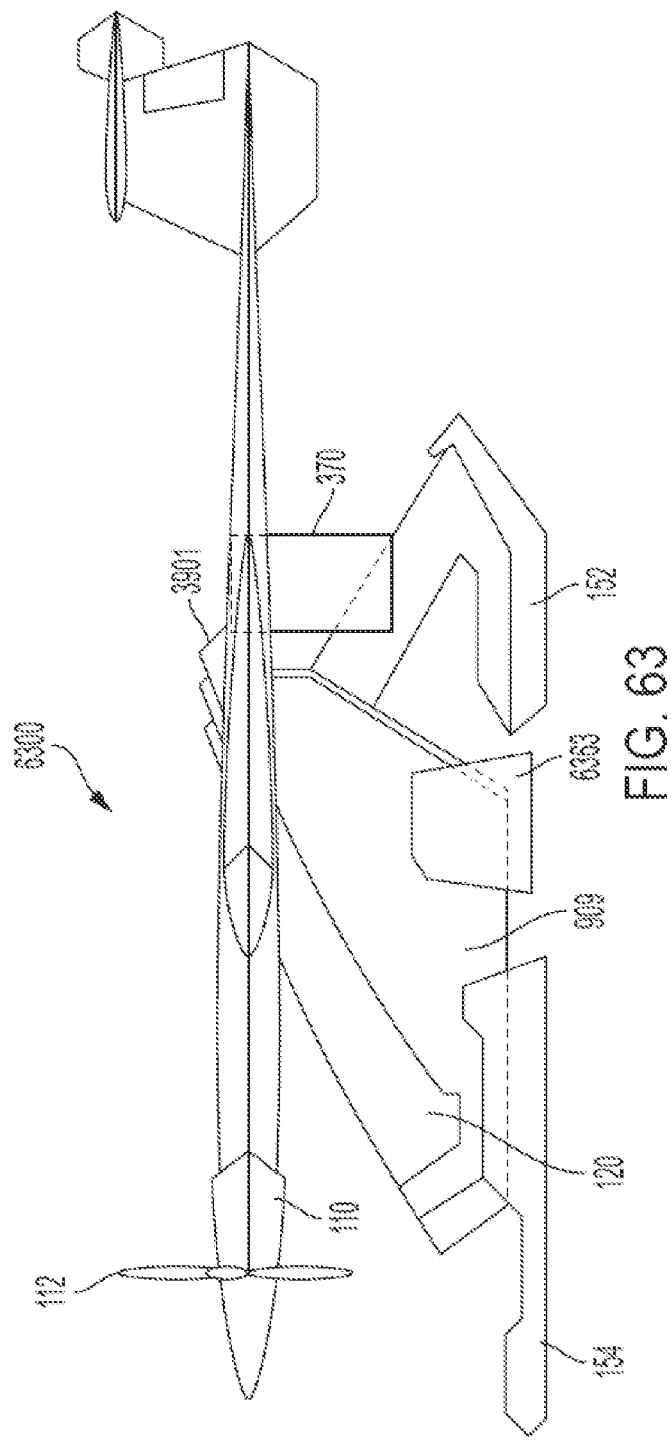

FIG. 63 presents another exemplary embodiment of an exemplary aircraft 6300. Here, this aircraft is powered by batterie(s) 6363. In a manner analogous to that detailed above with respect to the handling of the cargo, in this exemplary embodiment, the battery 6363 are located on the aircraft 6300 in a manner that permits quick install and removal of those batteries. In an exemplary embodiment, upon landing, the batteries can be switched out and replaced with other batteries that are now charged including fully charged. This as opposed to, for example, charging the batteries that are on board the aircraft/while the batteries are on board the aircraft, which may take time. In this regard, in an exemplary embodiment, there can be a plurality of batteries on the aircraft, one of which remains on the aircraft at all times, which would provide power during the limited period of time where the main battery is removed and replaced with a new fully charged main battery. In an exemplary embodiment, the main batteries could actually recharge the permanent/limited use battery. The idea is that in an exemplary embodiment, the aircraft can land, and, potentially, automatically or otherwise in a straightforward manner, release the battery 6363, and then could move under its own power to accept or otherwise take control of a new battery that would be located at another location at the landing site (or at another landing site within the range of the limited use battery), where the new battery within the utilized for the remaining flight operations. In an exemplary embodiment, this operation can be accomplished with a ground crew, or could be accomplished in a manner akin to the just detailed cargo handling. It is noted that this could be operated in a serial manner with respect to cargo handling. The battery can be dropped off, and then the aircraft could be moved for example, forward, and then the cargo could be dropped off, and then in some embodiments, new cargo could be captured (the aircraft could potentially be moved forward to capture the new cargo), and then a new battery could be captured, and then the aircraft could take off and complete the longer-term mission for example. The roles can be reversed in some embodiments as well, such as where the cargo was delivered first before the batteries are swapped out. And in some embodiments, the cargo hold can be utilized for additional batteries, where, for example, the battery located in the cargo hold could be removed at the destination where packages to be picked up, and then the remaining battery could be utilized to move the cargo to the destination. The battery could be later retrieved in some manner. The point is that such an embodiment enables a longer-range of travel to the location where the cargo is located that might otherwise not be the case. For example, in an exemplary embodiment where, for example, a lung or the like must be transported a short distance, but the aircraft is a long distance away from the short distance, the first battery can be utilized to travel the long distance, and then the remaining battery could be utilized to travel a short distance after the cargo is transported. Indeed, in some embodiments, it may not be a requirement that the aircraft actually be able to return or otherwise leave the location of its final destination immediately. The issues with the transplantable organs can have temporal limitations. Once the organ is successfully moved to its destination, be immediate need for the aircraft ceases to exist. Accordingly, the aircraft could potentially be "stranded" in the short term at the location that is the final destination, such as, until, a new battery can be brought to the aircraft or the on board battery can be charged, etc.

Also with reference to FIG. 63 depicts an embodiment where the engine/motor is located more after relative to other embodiments. In this exemplary embodiment, a longer driveshaft can be utilized to drive the five bladed propeller/rotor 112. In an exemplary embodiment, the motor can be located at the wing 180 location, such as at or close to the quarter chord location, or otherwise at a location where the center of gravity resulting there from is utilitarian. And, by way of example, the driveshaft could have a transmission or otherwise a gearbox to enable the rotor to tilt relative to the motors. In this regard, the motors do not tilt, but the rotors tilt. That said, in an exemplary embodiment, the driveshaft could be flexible where the resulting radius of curvature is such that only elastic yielding of the driveshaft occurs, and the driveshaft is designed or otherwise configured to experience the number of rotations that would be expected for the life of the aircraft or at least for the utilitarian life of the driveshaft plus a safety factor. Any device, system and/or method that can enable the total rotor regime can be utilized in at least some exemplary embodiments, whether the motors tilt with the rotor or whether the motors remain stationary, the motors tilt some but not all the way, and the flexible shaft takes up the remainder of the tilt.

Accordingly, in an exemplary embodiment, the center of gravity of one or more the motors detailed herein can be located anywhere less than and/or equal to zero to 60% or any value or range of is therebetween in 1% increments of the overall length of the aircraft in the longitudinal direction from the quarter chord point of the wing and/or from the center of gravity of the airframe that would exist without the motors, all other things being equal.

Figure 64:
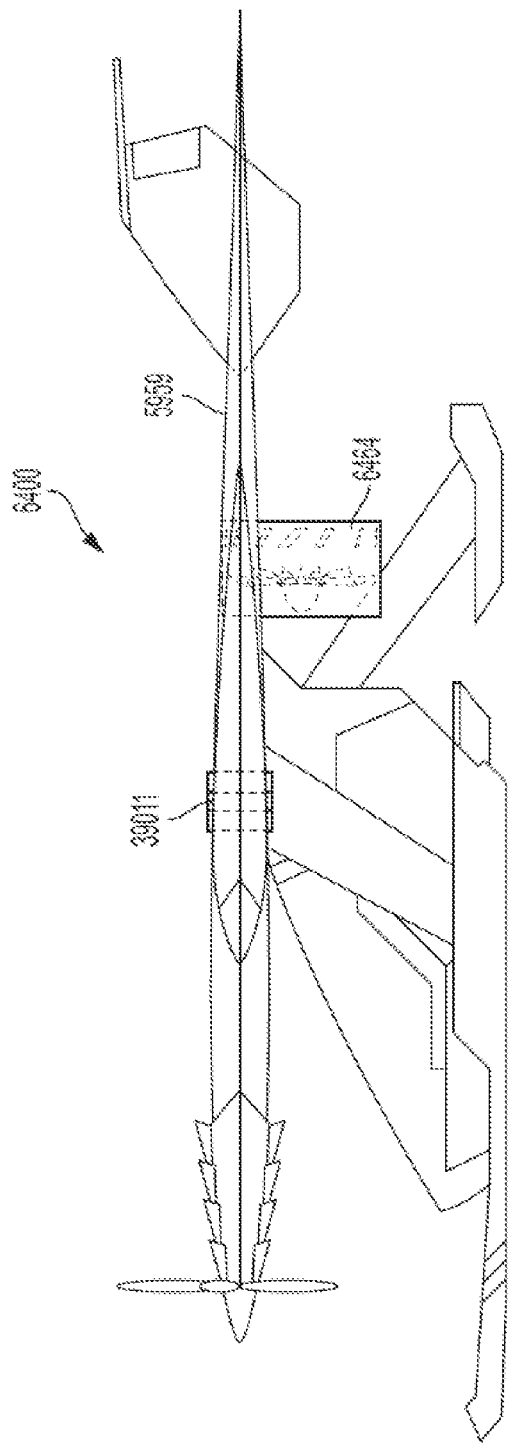

FIG. 64 presents another exemplary embodiment of an exemplary aircraft 6400 according to an exemplary embodiment. In this exemplary embodiment, the ducted fan(s) include fan deflectors 6464 as shown. In this exemplary embodiment, the deflectors can replace the tilting function/features of the ducted fan detailed above, and/or can augment such in a vectored thrust manner. By way of example only and not by way of limitation, it may not be feasible to rotate/tilt the ducted fan(s) the full amount that is utilitarian, and the deflectors can be utilized to achieve that the thrust direction that would otherwise be the case if the ducted fans could rotate/tilt the remainder amount. Alternatively and/or in addition to this, the deflectors can be utilized for thrust deflection/to implement a vectored thrust embodiment for maneuverability purposes.

Of course, it is noted that in at least some exemplary embodiments, the aforementioned tilt rotors can also be utilized for vectored thrust purposes for maneuverability (as opposed to pure VTOL/VSTOL reasons). In this regard, in some exemplary embodiments, the tilt rotors could tilt to the left and/or the right for vectored thrust purposes. Moreover, the ducted fans could tilt in such a manner as well. In this regard, the ducted fans and/or the tilt rotors can be configured to tilt in 4, 8, 16, 32 or 64 or more different directions or any number of directions therebetween in one increment with respect to the longitudinal axes of the tilt rotors and/or the ducted fans (as opposed to simply 2 directions in the scenario where the rotation is simply for VTOL purposes). In corollary to this is that the deflectors on the ducted fan can be utilized to deflect the thrust to the left and/or the right and/or in any utilitarian direction.

FIG. 65 presents another exemplary embodiment relating to the rotor/nacelles/powerplant arrangement that can be utilized in some embodiments. Here, shown is a six blade variable pitch proper rotor 11223 (embodiments can have 2, 3, 4, 5, 6, 7 or more or any value or range of values therebetween in one increment rotors on a given nacelle). Shown in FIG. 65 is a nacelle/rotor combination 65110 that can correspond to any of the nacelles/rotors detailed above and/or variations thereof. In this exemplary embodiment, there are two motors/drives 9784 that are utilized to tilt the nacelle and/or rotor motor combination as shown. These motors/drives are connected to spindled driveshafts 6511 as shown. The drives are rotationally connected to bearings 6567. Rotation of the spindled driveshafts 6511 by the motors 8784 will move the bearings 6567 along the longitudinal axis of the spindles, plus moving the bearings, and thus the connecting arms 65117 upwards and/or downwards (with respect to the frame of reference shown in FIG. 65). This imparts a torque onto wishbone tilt arm guide 6533, which causes such to pivot about the pivot points 1. This causes the motors 114, the driveshaft 65116, and thus the rotor 112 to rotate/tilt. Reversing the rotation of the driveshaft 6511 cause the rotor to rotate/tilt in the opposite direction.

It is noted that while the embodiment of FIG. 65 shows to drive motors 9784 and two driveshaft 6511, in some other embodiments, only one of these devices is utilized. Conversely, in an alternate embodiment, three or four more of these devices and the company components are utilized. While the pivot points 1 art identified as being located at the joints of the wishbone arm 6533 in some embodiments, the pivot point can be located forward or aft.

And while the motors 114 are shown as being tilted with the rotor, as noted above, in some embodiments, the rotors remain stationary.

And in this exemplary embodiment, the motors have a common driveshaft 65116. If one motor failed, the other motor would still produce torque, but would also drive the failed motor. In another exemplary embodiment, a concentric driveshaft arrangement can be utilized which feeds into a gearbox, which combines the torque from the concentric driveshafts each connected to the separate motor, and which utilizes a clutch regime, where in the event of failure of one motor, the clutch would disengage, and that motor could completely stop rotating while the other motor drives the rotor.

Thus, it can be seen that there is an assembly of one or more motors, one or more driveshafts, and one or more rotors that are completely supported by the wishbone tilt arm guide 6533 that are rotated based on the actuation of the drive motors 9784. The motors 9784 can be hydraulically driven and/or can be electric motors.

While the embodiment shown in FIG. 65 depicts the motors being rotated in the same direction as the rotor, in an alternate embodiment, the pivot point and/or the motor location could be such that the rotor is in front of the pivot point and the motors are in back of the pivot point, so that rotating the rotor upward would rotate the motors downward and vice versa. This can have utilitarian value with respect to balancing out the load that is moved when the rotor actuation system of FIG. 65 is actuated. Instead of lifting the motor and the rotor up, the weight of the motor could be utilized to help lift the rotor upward and vice versa. And in some embodiments, the motors 114 can be spaced about the pivot points. One motor can be in front of the pivot point 1 and one motor can be in back of the pivot point 1, or a portion of one of the motors could be in front of or in back of the pivot point 1, etc.

And while the spindled driveshafts and shown is an exemplary embodiment, in an alternate exemplary embodiment, a hydraulic ram can be utilized (or an electric ram). In this exemplary embodiment, the working end of the ram would push on the bearings 6567 (or these would instead be lugs attached to the bearing of the ram) and then pull the bearings 65672 tilt the rotor.

It is noted that any method detailed herein also corresponds to a disclosure of a device and/or system configured to execute one or more or all of the method actions associated there with detailed herein. In an exemplary embodiment, this device and/or system is configured to execute one or more or all of the method actions in an automated fashion. That said, in an alternate embodiment, the device and/or system is configured to execute one or more or all of the method actions after being prompted by a human being. It is further noted that any disclosure of a device and/or system detailed herein corresponds to a method of making and/or using that the device and/or system, including a method of using that device according to the functionality detailed herein.

It is further noted that any disclosure of a device and/or system detailed herein also corresponds to a disclosure of otherwise providing that device and/or system.

It is also noted that any disclosure herein of any process of manufacturing other providing a device corresponds to a device and/or system that results therefrom. It is also noted that any disclosure herein of any device and/or system corresponds to a disclosure of a method of producing or otherwise providing or otherwise making such.

Any embodiment or any feature disclosed herein can be combined with any one or more or other embodiments and/or other features disclosed herein, unless explicitly indicated and/or unless the art does not enable such. Any embodiment or any feature disclosed herein can be explicitly excluded from use with any one or more other embodiments and/or other features disclosed herein, unless explicitly indicated that such is combined and/or unless the art does not enable such exclusion.

While various embodiments of the present invention have been described above, it should be understood that they have been presented by way of example only, and not limitation. It will be apparent to persons skilled in the relevant art that various changes in form and detail can be made therein without departing from the spirit and scope of the invention.

What is claimed is:

1. An assembly, comprising:
an aircraft structure including:
a first sub-structure; and
a second sub-structure, wherein
when viewed from a top perspective, the first sub-structure is in the form of a general "Y" shaped configuration, and the second sub-structure is in the form of a general "X" shaped configuration,
the assembly is an aircraft,
the general "Y" shaped configuration has two legs and a base,
the general "X" shaped configuration has four legs,
the first sub-structure supports respective forward landing components on the legs of the general "Y" shaped configuration of the first sub-structure,
the second sub-structure supports respective back landing components on two of the legs of the general "X" shaped configuration of the second
the first sub-structure supports aircraft control components and/or aircraft stability components on the base of the general "Y" shaped configuration, and
the second sub-structure supports respective aircraft power plants on two legs of the four legs of the general "X" shaped configuration opposite the legs supporting the back landing components.

2. The assembly of claim 1, wherein:
when viewed from a side perspective, the first sub-structure and the second sub-structure form a general "X" shape configuration.

3. The assembly of claim 1, further comprising:
an aircraft cockpit, wherein
the first sub-structure and the second sub-structure collectively and entirely support the aircraft cockpit when the assembly is in a landed configuration, wherein
the first sub-structure and the second sub-structure collectively provide a frame-like safety assembly that protects the aircraft cockpit.

4. The assembly of claim 1, wherein:
the assembly includes an aircraft fuselage; and
respective forward portions of the respective aircraft power plants are at least about aligned with a pilot seat in the aircraft fuselage when the assembly is in a forward flight wing supported mode.

5. The assembly of claim 1, further comprising:
an aircraft fuselage, wherein
the first sub-structure supports the aircraft fuselage when the assembly is in a landed configuration.

6. The assembly of claim 5, wherein:
the first sub-structure and the second sub-structure collectively and entirely support the aircraft fuselage when the assembly is in the landed configuration.

7. The assembly of claim 5, wherein:
the first sub-structure and the second sub-structure collectively and entirely support the respective power plants when the assembly is in the landed configuration.

8. The assembly of claim 6, further comprising:
an aircraft tail apparatus, wherein
the first sub-structure also supports the aircraft tail apparatus.

9. The assembly of claim 1, further comprising: an aircraft tail apparatus, wherein the first sub-structure interfaces with the tail apparatus, wherein the tail apparatus is an extension of a fuselage of the aircraft structure.

10. The assembly of claim 1, wherein:
when viewed from above, legs of the general "X" shaped configuration of the second sub-structure are inclusively between 40 and 80 degrees from a longitudinal axis of the assembly.

11. The assembly of claim 10, wherein:
when viewed from above, rear legs of the general "X" shaped configuration of the second sub-structure are inclusively between 20 and 60 degrees from a longitudinal axis of the assembly.

12. The assembly of claim 2, wherein:
when viewed from the side perspective, the first sub-structure and the second sub-structure form a general "X" shape configuration.

13. The assembly of claim 1, further comprising:
the assembly includes an aircraft fuselage; and
the first sub-structure and the second sub-structure collectively only partially support the aircraft fuselage when the assembly is in a landed configuration.

14. The assembly of claim 6, further comprising:
an aircraft tail apparatus, wherein
the first sub-structure does not support the aircraft tail apparatus.

15. The assembly of claim 1, further comprising:
an aircraft fuselage that has a length, a width and a height, the length being the largest dimension, wherein with respect to location along a longitudinal direction of the aircraft fuselage, the second substructure extends a distance greater than a majority of the length of the aircraft fuselage.

16. The assembly of claim 1, further comprising:
an aircraft fuselage having a length, a width and a height, the length being the largest dimension, wherein
the second sub-structure has a length, a width and a height, the length being the largest dimension, and
the height and the width of the second sub-structure have respective dimensions that are both larger than the width and the height of the aircraft fuselage.

17. An assembly, comprising:
an aircraft structure including:
a first sub-structure; and
a second sub-structure, wherein
when viewed from a top perspective, the first sub-structure is in the form of a general "Y" shaped configuration, and the second sub-structure is in the form of a general "X" shaped configuration,
the general "Y" shape configuration has a first extension, a second extension and a third extension, the first and second extensions extending away from the third extension at equal and opposite angles relative to a plane lying on and extending in the direction of the third extension, the direction of the third extension being contained in the plane,
the first sub-structure supports aircraft control components and/or aircraft stability components on the third extension; and extension, and
the second sub-structure supports respective aircraft power plants and respective rotors on two legs of the general "X" shaped configuration such that bottommost sweeps of respective rotors are at least ten (10) feet above a planar and level landing surface when the assembly is supported on the planar and level landing surface without any lift being generated by the aircraft in a standard landed aircraft status.

18. The assembly of claim 17, wherein:
the first sub-structure supports respective forward landing components on legs of the general "Y" shaped configuration; and
the second sub-structure supports respective back landing components on two legs of the general "X" shaped configuration.

19. The assembly of claim 17, further comprising:
an aircraft fuselage, wherein
the aircraft fuselage is supported by the first sub-structure and the second sub-structure when the aircraft is in the standard landed aircraft status.

20. The assembly of claim 17, further comprising:
an aircraft fuselage, wherein
the first sub-structure and the second sub-structure collectively and entirely support the aircraft fuselage when in a landed configuration, and
the first sub-structure and the second sub-structure collectively provide a frame-like safety assembly that protects the aircraft fuselage.

21. The assembly of claim 17, further comprising:
an aircraft fuselage, wherein
the assembly is an aircraft, the first sub-structure and the second sub-structure collectively and entirely support the aircraft fuselage when the aircraft is in the standard landed aircraft status, and
the first sub-structure and the second sub-structure collectively provide a frame-like safety assembly that protects the aircraft fuselage.

22. The assembly of claim 17, wherein:
when viewed from a side perspective, the first sub-structure and the second sub-structure form an "X" shape configuration.

23. The assembly of claim 17, wherein:
when viewed from above, legs of the generally "Y" shaped configuration of the first sub-section are respectively at an angle of inclusively between 20 and 80 degrees offset from a longitudinal axis of a base of the generally "Y" shaped configuration.

24. The assembly of claim 17, further comprising:
an aircraft fuselage, wherein
the assembly is an aircraft,
the first sub-structure directly supports only in a partial manner the aircraft fuselage when the assembly is in a landed configuration.

25. The assembly of claim 24, wherein:
the first sub-structure and the second sub-structure collectively and entirely support at least two power plants of the aircraft power plants of the assembly when the assembly is in the standard landed aircraft status.

26. The assembly of claim 17, further comprising:
an aircraft fuselage, wherein
the aircraft fuselage is not supported by the second sub-structure when the aircraft is flying.

27. The assembly of claim 17, further comprising:
an aircraft fuselage, wherein
the general "X" shape configuration includes four legs, and
when the aircraft is in the standard landed aircraft status, the aircraft fuselage is supported by:
(i) the first sub-structure; and
(ii) with respect to the second-sub structure, only two legs of the four legs of the second sub-structure.

28. The assembly of claim 17, further comprising:
an aircraft tail apparatus, wherein
the first sub-structure and the second sub-structure collectively and entirely support the aircraft fuselage when the assembly is in the standard landed aircraft status, and
the first sub-structure interfaces with the aircraft tail apparatus, wherein the tail apparatus is not an extension of the fuselage of the aircraft structure.

29. The assembly of claim 17, further comprising:
an aircraft fuselage, wherein
a majority of the first sub-structure and a majority of the second sub-structure is located outside the aircraft fuselage.

30. The assembly of claim 17, further comprising:
an aircraft fuselage that has a length, a width and a height, the length being the largest dimension, wherein
the assembly is an aircraft, and
with respect to location along a longitudinal direction of the aircraft fuselage, the second substructure extends a distance greater than the length of the aircraft fuselage.

* * * * *